(12) United States Patent
Erblat et al.

(10) Patent No.: US 11,095,506 B1
(45) Date of Patent: Aug. 17, 2021

(54) DISCOVERY OF RESOURCES ASSOCIATED WITH CLOUD OPERATING SYSTEM

(71) Applicant: ServiceNow, Inc., Santa Clara, CA (US)

(72) Inventors: Boris Erblat, Petah Tikva (IL); Tom Bar Oz, Petah Tikva (IL); Hail Tal, Petah Tikva (IL); Shay Herzog, Petah Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/997,724

(22) Filed: Aug. 19, 2020

Related U.S. Application Data

(60) Provisional application No. 63/055,215, filed on Jul. 22, 2020.

(51) Int. Cl.
*H04L 12/24* (2006.01)
*H04L 29/06* (2006.01)
*H04L 29/08* (2006.01)

(52) U.S. Cl.
CPC .......... *H04L 41/0813* (2013.01); *H04L 63/08* (2013.01); *H04L 67/10* (2013.01)

(58) Field of Classification Search
CPC ...... H04L 41/0813; H04L 67/10; H04L 63/08
See application file for complete search history.

(56) References Cited

U.S. PATENT DOCUMENTS

| | | |
|---|---|---|
| 4,941,084 A | 7/1990 | Terada et al. |
| 5,185,860 A | 2/1993 | Wu |
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |

(Continued)

FOREIGN PATENT DOCUMENTS

| | | |
|---|---|---|
| EP | 0433979 | 6/1991 |
| EP | 1607824 | 12/2005 |

(Continued)

*Primary Examiner* — El Hadji M Sall
(74) *Attorney, Agent, or Firm* — McDonnell Boehnen Hulbert & Berghoff LLP

(57) ABSTRACT

A discovery application on a computing system is provided. The discovery application receives a user input, which is for discovery of resources associated with a cloud operating system of a cloud computing system. The user input includes an authentication credential and account information associated with the cloud operating system. Based on the received input, the discovery application executes a discovery pattern comprising operations for the discovery of resources. The cloud operating system includes a group of services to access such resources. At least one of the operations corresponds to an API call to an API endpoint associated with a service of the group of services. The discovery application receives a response to the API call from the cloud operating system. The response includes a payload of information associated with the resources. The discovery application updates, based on the received response, one or more configuration items in a configuration management database.

20 Claims, 31 Drawing Sheets

(56) References Cited

U.S. PATENT DOCUMENTS

| | | |
|---|---|---|
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 10,810,055 B1 * | 10/2020 | Walker ................. G06F 9/5005 |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2012/0311157 A1 * | 12/2012 | Erickson ................. G06F 9/541 709/226 |
| 2018/0322558 A1 * | 11/2018 | Padmanabh ............ G06F 9/547 |
| 2019/0052531 A1 * | 2/2019 | Sividia ................ H04L 41/0853 |
| 2020/0314191 A1 * | 10/2020 | Madhavan .............. H04L 67/16 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

* cited by examiner

DISCOVERY OF RESOURCES ASSOCIATED WITH CLOUD OPERATING SYSTEM

CROSS-REFERENCE TO RELATED APPLICATIONS/INCORPORATED BY REFERENCE

This application claims priority to U.S. Provisional Patent Application Ser. No. 63/055,215 filed on Jul. 22, 2020, the entire content of which is hereby incorporated herein by reference.

BACKGROUND

Advancements in resource discovery have allowed organizations and individuals to use applications for discovery of various disparate resources associated with a remote computing environment. Such resources may include hardware resources (such as computing devices, network switches, storage devices) and software resources (such as database applications or microservices). Typically, the remote computing environment provides a mechanism through which its resources can be discovered. For example, such a mechanism may include Representational State Transfer function (REST) calls, HTTP GET/POST requests, or Simple Object Access Protocol (SOAP) request, or other methods to invoke functions on the remote computing environment.

Without a reliable method to identify such resources associated with the remote computing environment in a dynamic enterprise, it may be impossible to keep track of changes occurring in on-premise, multi-cloud, and serverless infrastructure. This may pose a significant risk to service stability and can lead to financial waste, such as paying unnecessary hardware maintenance fees, incurring software compliance penalties, or an inability to pinpoint disruptions.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A cloud computing system may be a cloud server or a cluster of cloud servers (e.g., a server farm) with nodes spread in one or more geographic regions. The cloud computing system may facilitate delivery of a group of services related to cloud resources, such as servers, storage, databases, networking, software, analytics, and intelligence, over a public network (e.g., Internet) or private networks (such as, local area networks (LANs) or virtual LANs). The cloud computing system may provision various disparate resources that may be configured to perform predefined tasks associated with the cloud computing system. A cloud operating system may be installed on the cloud computing system and may include the group of services to access and discover the resources. For example, the cloud computing system may be managed by an OpenStack cloud operating system.

Each resource may be associated with a service of the cloud operating system. Each service may have an associated API endpoint through which the service may provide information on the associated resource, in response to an API call to the API endpoint. Examples of the resources associated with the cloud operating system may include, but are not limited to, a computing resource, a networking resource, and a storage resource. Examples of the group of services hosted on the cloud operating system may include, but are not limited to, an identity service, a compute service, an image service, a block storage service, a networking service, a load balancer service, or a dashboard service.

The cloud operating system may control a large pool of the resources (for example, the resources, such as, compute, networking, and storage resources) associated with the cloud computing system through a data center. The datacenter of the cloud operating system may be managed and provisioned via APIs that may use common authentication methods. The cloud operating system may be an Infrastructure-as-a-Service (IaaS) platform that may also include components for orchestration, fault tolerance, and service management for high availability of user applications that may run using the resources on the IaaS platform.

In some cases, the cloud operating system may correspond to multiple cloud networks, which may be suitable for both a public cloud, a hybrid cloud, or one or more private clouds. The private cloud networks may be operated by different organizations and may serve different goals and purposes. The cloud operating system may be capable of horizontally scaling up when new computing, networking, and storage resources over time are provided on the cloud computing system. The group of services of the cloud operating system may allow plug-and-play of individual components into the cloud as per needs of an organization. Further, deployment and management of services onto the cloud operating system may require additional configurational effort from operators of the cloud.

An organization or an individual may be required to manage and/or administer resources associated with the cloud operating system. To manage and/or administer the resources, the organization or the individual may use a computing system that may discover the resources, through a discovery application. The discovery application may communicate with the cloud operating system for the discovery of resources. Such communication may be performed through a discovery server associated with the discovery application.

Accordingly, a first example embodiment may involve a computing system which may include a discovery application. The computing system may be configured to receive a user input associated with discovery of resources associated with the cloud operating system. The user input may include an authentication credential and account information associated with a cloud operating system of the cloud computing system. Based on the received user input, the computing system may execute a discovery pattern comprising a sequence of operations for the discovery of the resources. The cloud operating system may include a group of services to access the resources. At least one of the sequence of operations may correspond to an API call to an API endpoint associated with a service of the group of services. The computing system may receive a response to the sent API call from the cloud operating system. The response may include a payload of information associated with the resources. The computing system may update, based on the received response, one or more configuration items associated with the resources in a configuration management database (CMDB) on the computing system.

DETAILED DESCRIPTION

Figure 1:
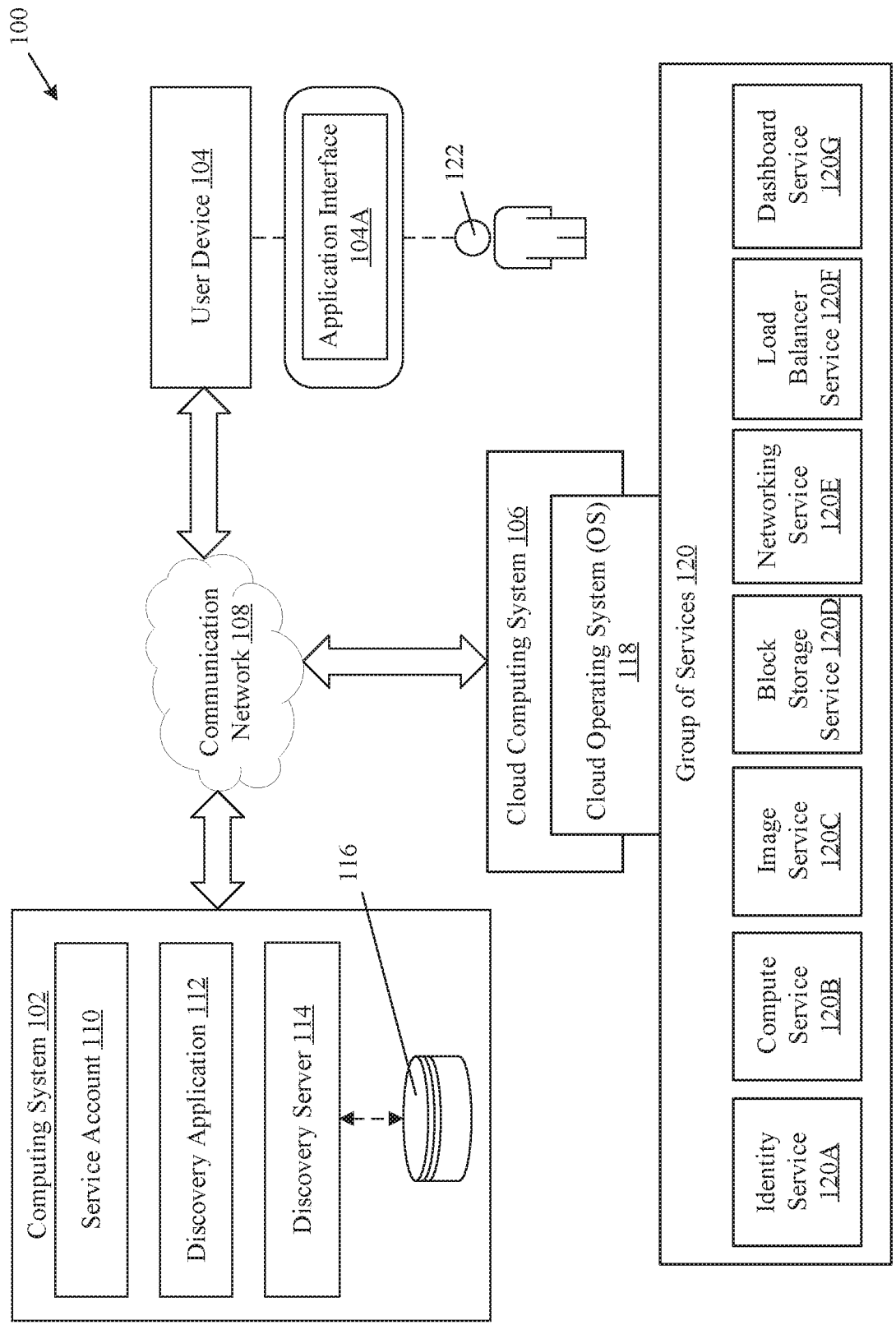
FIG. 1 illustrates an exemplary network environment for discovery of resources associated with a cloud operating system (cloud OS) of a cloud computing system, in accordance with example embodiments.

Detailed description for cloud Operating System (OS) discovery is provided herein. The following described implementations may be found in the disclosed system and method for implementing a discovery of resources associated with a cloud operating system of a cloud computing system, by use of a discovery application through a discovery server. The discovery application may be configured to receive a user input associated with the discovery of resources associated with a cloud operating system associated with the cloud computing system. The user input may include an authentication credential and account information associated with a cloud operating system of the cloud computing system. Based on the received user input, the discovery application, through the discovery server, may execute a discovery pattern comprising a sequence of operations for the discovery of the resources. At least one of the sequence of operations may correspond to an API call to an API endpoint associated with a service of a group of services of the cloud operating system to access the resource. The discovery application, through the discovery server, may receive a response to the sent API call from the cloud operating system. The response may include a payload of information associated with the resources. The discovery application (through the discovery server) may update, based on the received response, one or more configuration items associated with the resources in a configuration management database (CMDB).

The cloud computing system may be realized as a cloud server or a cluster of cloud servers (e.g. a server farm) with nodes that may lie in one or more geographic regions. The cloud computing system may host the cloud operating system that may include the group of services. Each service may provision resources associated with the cloud operating system, wherein the resources may be configured to perform pre-defined tasks of the cloud operating system. A data center of the cloud operating system may control large pools of the resources associated with the cloud operating system. The data center may be managed and provisioned via APIs that may use common authentication methods. The cloud operating system may be implemented as an Infrastructureas-a-Service (IaaS) platform that may also include components for orchestration, fault tolerance, and service management for high availability of user applications that may run using the resources on the IaaS platform. In some cases, the cloud operating system may correspond to multiple cloud networks, which may be suitable for both a public cloud, a hybrid cloud, or one or more private clouds. The private cloud networks may be operated by different organizations and may serve different goals and purposes. The cloud operating system may be capable of horizontally scaling up when new computing, networking, and storage resources over time are provided on the cloud computing system. The group of services of the cloud operating system may allow plug-and-play of individual components into the cloud as per needs of an organization. Further, deployment and management of services onto the cloud operating system may require additional configurational effort from operators of the cloud.

The discovery of the resources of the cloud operating system may provide statistics related to the resources being used behind the scene to run the various application or software of an organization by the IaaS platform. The statistics may be used to deploy additional application components or remove unneeded application components. The discovery of resources may also provide diagnostic information associated with the resources. The diagnostic information may be used to identify faulty application components and replace (or remove) the identified faulty application components from the IaaS platform. The support for discovery of resources of the cloud operating system may enable different organizations to manage their individual private cloud networks associated with the cloud operating system, irrespective of the cloud operating system being implemented as a hybrid cloud (i.e., as both public cloud and one or more private cloud networks).

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized, and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways. Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

FIG. 1 illustrates an exemplary network environment for discovery of resources associated with a cloud operating system (OS) of a cloud computing system, in accordance with example embodiments. With reference to FIG. 1, there is shown a block diagram of a network environment 100 that includes a computing system 102, a user device 104, and a cloud computing system 106, each of which may be communicatively coupled to one another, via a communication network 108. The computing system 102 may include a service account 110, a discovery application 112, and a discovery server 114. The computing system 102 may also maintain a configuration management database (CMDB) 116 on a storage media, such as a persistent storage device of the computing system 102. The cloud computing system 106 may include a cloud operating system 118. The cloud operating system 118 may host a group of services 120 that may include, but are not limited to, at least one of: an identity service 120A, a compute service 120B, an image service 120C, a block storage service 120D, a networking service 120E, a load balancer service 120F, or a dashboard service 120G. The user device 104 may include an application interface 104A that may be accessible to a user 122, such as an Information Technology (IT) admin.

The computing system 102 may include suitable code, logic, circuitry and/or interfaces that may be configured to discover resources associated with the cloud operating system 118 and maintain the CMDB 116. For example, based on credentials associated with the cloud operating system 118 in the service account 110, the computing system 102 may execute one or more discovery patterns to collect information associated with the discovery of resources associated with the cloud operating system 118. The one or more discovery patterns may be executed by the discovery application 112 on the computing system 102, through the discovery server 114. A discovery pattern may be referred to as a sequence of operations, which may allow the discovery application 112 (and the discovery server 114) to determine configuration items (CIs) to be updated based on collected information of the cloud operating system 118, credentials to use for accessing the cloud operating system 118, and tables to populate in the CMDB 116. The computing system 102 may be configured to store the collected information related to the resources, which may be received in response to the execution of the one or more patterns, in the CMDB 116. Example implementations of the computing system 102 may include, but are not limited to, an application server, a database server, a mainframe server, a cloud server (e.g., a hybrid, a private, or a public cloud), or a web server. In an embodiment, the computing system 102 may be implemented as server nodes of an on-premise server.

The service account 110 may include code, logic, circuitry, and/or interfaces that may be configured to store information of an account (e.g., a user account on the cloud operating system 118), including credentials necessary to access the account. A user may be required to create the service account 110 before a discovery pattern is executed to collect information on resources associated with the cloud operating system 118. The service account 110 may securely store the information to be later used to execute the discovery pattern.

The discovery application 112 may include code, logic, circuitry, and/or interfaces that may be configured to make use of the discovery server 114 (also referred to as Management, Instrumentation, and Discovery (MID) Server) to discover and collect information associated with the resources of the cloud operating system. For example, the discovery application 112 may receive a user input through an application interface 104A (i.e. an instance) on the user device 104. The user input may include an authentication credential and account information associated with the cloud operating system 118 of the cloud computing system 106. The authentication credential and the account information may be stored in the service account 110 for the cloud operating system 118 on the computing system 102.

In an embodiment, through the discovery server 114, the discovery application 112 may be configured to discover resources associated with the cloud operating system 118. The discovery application 112 may execute a discovery pattern including a sequence of operations based on the user input. At least one of the sequence of operations may correspond to an Application Programming Interface (API) call to an API endpoint associated with one of a group of services 120 associated with a cloud operating system 118 of the cloud computing system 106. The discovery application 112 may receive a response to the sent API call from the cloud operating system 118. The response may include a payload of information associated with the resources. The discovery application 112 may perform the communications (e.g., the transmission of the API call and the receipt the response) with the cloud operating system 118 through the discovery server 114. The discovery application 112 may update one or more configuration items (CIs) associated with the discovered resources in the CMDB 116 (stored on the computing system 102). Herein, the configuration items may correspond to, but are not limited to, physical devices, virtual devices, applications, and services associated with the cloud operating system 118. In an embodiment, the discovery application 112 may be implemented as an agent-less application, so that it may avoid the management complexity of having a permanent software installed on any computer, or device to be discovered.

The discovery server 114 may include code, logic, circuitry, and/or interfaces that may be configured to facilitate communication and movement of data between the application interface 104A (i.e., an instance) and external applications, data sources, and services. Multiple discovery servers, capable of handling thousands of devices each, may be deployed in different network segments to provide virtually unlimited scalability. The discovery server 114 may be configured to execute the one or more discovery patterns (i.e. a sequence of operations for discovery of resources) for the discovery application 112 and return results back to an associated instance (e.g., the application interface 104A) for processing. In an embodiment, the discovery server 114 may be configured to store the results including information associated with the discovered resources in the one or more CIs on the CMDB 116. In some instances, the discovery server 114 may use secure communication protocols (like HTTP-secure) to ensure all communications may be secure and initiated inside an enterprise's firewall. The discovery server 114 may be implemented as an application (such as a Java application), which may run as a service or daemon on a server or a cluster node of the computing system 102.

The CMDB 116 may include code, logic, circuitry, and/or interfaces that may be configured to store information about resources associated with the cloud operating system 118 of the cloud computing system 106. The CMDB 116 may be a database in which the information for each resource may be stored in a configuration item (CI) specific to that resource. The discovery application 112, through the discovery server 114, may collect the information associated with the resources and may update the respective CIs in the CMDB 116. Example implementations of the CMDB 116 may include, but are not limited to, a database server, a file server, a mainframe server, a cloud server, a storage device (e.g., a Redundant Array of Independent Disks (RAID) device), or any other computing device with data storage capability.

The CMDB 116, and data and instructions associated with the discovery application 112 may be stored in the persistent data storage included in the computing system 102. The persistent data storage may include computer-readable storage media for carrying or having computer-executable instructions or data structures stored thereon. Such computer-readable storage media may include any available media that may be accessed by a general-purpose or special-purpose computer, such as a processor.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor to perform a certain operation or group of operations associated with the computing system 102.

The user device 104 may host the application interface 104A (i.e. an instance) that may be configured to receive a user input (such as from a discover admin). The user device 104 may be configured to receive, from the user 122, the user input associated with the discovery of resources. After the discovery is performed, the user device 104 may be further configured to display a result of the discovery of the resources on a display device of the user device 104, through the application interface 104A. Examples of the user device 104 may include, but are not limited to, a workstation, a server, a cluster of servers with a management panel, a laptop, a tablet, an internet-enabled device, a desktop computer, or any portable or non-portable device with a networking and display capability.

The application interface 104A (also referred to as an Instance) may be implemented as an client-side application for a specific group of users who may access the application interface 104A through a web client (such as a web browser) and a URL which may be customizable for the group of users. The application interface 104A may host several applications and services, one or more of which may be associated with resource discovery. The application interface 104A may support role-based access to different applications or services on the application interface 104A. For example, one of the group of users may be a discovery admin who may be allowed to configure a discovery schedule for a discovery of resources associated with the cloud operating system 118 of the cloud computing system 106.

The cloud computing system 106 may be a cloud server or a cluster of cloud servers (e.g., a server farm) with nodes spread in one or more geographic regions. The cloud computing system 106 may facilitate delivery of the group of services 120 related to cloud resources, such as servers, storage, databases, networking, software, analytics, and intelligence, over a public network (e.g., Internet) or private networks (such as, local area networks (LANs) or virtual LANs). The cloud computing system 106 may provision various disparate resources that may be configured to perform predefined tasks associated with the cloud computing system 106.

The cloud operating system (OS) 118 may be installed on the cloud computing system 106 and may include the group of services 120 to access and discover the resources. For example, the cloud computing system 106 may be managed by an OpenStack cloud operating system. Each resource may be associated with a service of the cloud operating system 118. Each service may have an associated API endpoint through which the service may provide information related to a resource associated with the service, in response to an API call to the API endpoint. Examples of the resources associated with the cloud operating system 118 may include, but are not limited to, a computing resource, a networking resource, and a storage resource. Examples of the group of services 120 hosted on the cloud operating system 118 may include, but are not limited to, the identity service 120A, the compute service 120B, the image service 120C, the block storage service 120D, the networking service 120E, the load balancer service 120F, or the dashboard service 120G.

The cloud operating system 118 may control a large pool of the resources (for example, the resources, such as, compute, networking, and storage resources) associated with the cloud computing system 106 through a data center. The datacenter of the cloud operating system 118 may be managed and provisioned via APIs that may use common authentication methods. The cloud operating system 118 may be an Infrastructure-as-a-Service (IaaS) platform that may also include components for orchestration, fault tolerance, and service management for high availability of user applications that may run using the resources on the IaaS platform.

In some embodiments, the cloud operating system 118 may be suitable for both a public cloud, a hybrid cloud, or one or more private clouds. A private cloud network may be operated by different organizations and may serve different goals and purposes. The cloud operating system 118 may be capable of horizontally scaling up when new computing, networking, and storage resources over time are added on the cloud computing system 106. The group of services 120 of the cloud operating system 118 may allow plug-and-play of individual components into the cloud as per needs of an organization. Further, deployment and management of services onto the cloud operating system 118 may require additional configurational effort from operators of the cloud.

In an embodiment, the identity service 120A of the cloud operating system 118 may be configured to implement an identity API and provide an API client authentication, service discovery, and distributed multi-tenant authorization functionalities, through the implemented identity API. The identity service 120A may support one or more authentication and/or authorization protocols such as, but not limited to, a Light-weight Directory Access Protocol (LDAP), an Open Authentication (OAuth) protocol, an OpenID Connect protocol, a Security Assertion Markup Language (SAML) protocol, and a Structured Query Language (SQL)-based protocol. In an embodiment, the cloud operating system 118 may include various cloud regions, each of which may correspond to a separate set of endpoints in the identity service catalog.

In case of a shared identity service across the cloud computing system 106, a registered user may be allowed an access to any such cloud region that may start with a same authentication Uniform Resource Locator (URL). Examples of cloud regions may include a USA-East region, a USA-West region, a USA-North region, a USA-South region, a Europe-East region, a Europe-West region, and the like.

In an embodiment, the identity service 120A of the cloud operating system 118 may protect its identity API by use of role-based access control (RBAC). The cloud operating system 118 may enable a user (e.g., the user 122) access to the different APIs of the services of the cloud operating system 118 based on a role which the user may have on a project, a domain, or a system. As an example, the identity API may provide roles such as, but not limited to, an administrator role, a member role, and a reader role by default. An operator of the cloud operating system 118 may grant the roles to any user or a group of users on any target, such as, but not limited to, a project, a domain, or a system.

The identity service 120A may generate authentication tokens in exchange for authentication credentials to permit access to the APIs (e.g., REST APIs) of the cloud operating system 118. Clients, such as the discovery application 112 (through the discovery server 114) may obtain the token and URLs of endpoints for other service APIs by providing their valid credentials to the identity service 120A. In an embodiment, whenever a REST API request is sent to a service of the cloud operating system 118, the client such as, the discovery application 112 (through the discovery server 114) may be required to supply the authentication token of the user 122 in an X-Auth-Token request header of the REST API request. As an example, the identity API (e.g., a V2 Identity API of the cloud operating system 118) may implement HEAD for all GET requests such that each HEAD request may include same headers and HTTP status code as the corresponding GET API requests.

In an embodiment, the compute service 120B of the cloud operating system 118 may be configured to provision highly scalable, on-demand, self-service based access to the compute resources of the cloud computing system 106 by implementation of certain services and associated libraries. Examples of such compute resources may include, but are not limited to, bare metal servers, virtual machines (VMs), and containers. In some cases, the compute service 120B may depend on the identity service 120A, the networking service 120E, and the image service 120C of the cloud operating system 118.

In an embodiment, the image service 120C of the cloud operating system 118 may be configured to perform discovery, registration, and retrieval of VM images. The image service 120C may enable a query of metadata associated with a VM image and also a retrieval of the actual VM image through a Representational State Transfer (REST) API. The VM images that may be retrieved through the image service 120C may be stored in different types of storage locations such as, but not limited to, file systems or object-orientated storage systems. In some cases, the image service 120C may depend on the identity service 120A of the cloud operating system 118.

In an embodiment, the block storage service 120D of the cloud operating system 118 may be configured to virtualize block storage device management and provide a self-service API to users. Through the self-service API, block storage resources may be used by users transparently, i.e., without any knowledge of where the storage may be deployed or what type of underlying device is used for the storage deployment. The block storage service 120D may be transparently deployed either through a reference implementation (e.g., logical volume managers (LVMs)) or plug-in drivers. In some cases, the block storage service 120D may depend on the identity service 120A of the cloud operating system 118.

In an embodiment, the networking service 120E of the cloud operating system 118 may be configured to provide a software defined networking (SDN) framework for virtual computing resources of the cloud computing system 106. A Networking-as-a-Service (NaaS) platform may be provisioned by the SDN framework for use by the virtual computing resources. In some cases, the networking service 120E may depend on the identity service 120A of the cloud operating system 118.

In an embodiment, the load balancer service 120F of the cloud operating system 118 may be configured to provide a Load Balancer as a Service (LBaaS) platform to perform load balancing on a pool of computing resources (e.g., VMs, containers, or bare-metal servers, which may be collectively called amphorae) of the cloud computing system 106. The load balancer service 120F may spawn computing resources on-demand. In an embodiment, the load balancer service 120F may support an on-demand horizontal scaling feature, which may enable on-demand (based on resource demand on the cloud) spin up of computing resources for the pool of computing resources. In some cases, the load balancer service 120F may depend on the image service 120C, the identity service 120A, the networking service 120E, and the compute service 120B of the cloud operating system 118.

In an embodiment, the dashboard service 120G of the cloud operating system 118 may be configured to provide an extensible web-based user interface to a plurality of services of the cloud operating system 118. In some cases, the dashboard service 120G may depend on the identity service 120A of the cloud operating system 118.

The communication network 108 may represent a portion of the global Internet. However, the communication network 108 may alternatively represent different types of network, such as a private wide-area or local-area packet-switched networks. The communication network 108 may include a communication medium through which the computing system 102, the user device 104, and the cloud computing system 106 may communicate with each other. The communication network 108 may be one of a wired connection or a wireless connection Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the communication network 108 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT)® communication protocols.

In operation, the discovery application 112 on the computing system 102 may be configured to receive a user input from the application interface 104A on the user device 104. The user input may be associated with a discovery of resources associated with the cloud operating system 118. The user input may include an authentication credential and account information associated with the cloud operating system 118 of the cloud computing system 106. In an embodiment, the user input may also include a web address of an endpoint associated with the identity service 120A of the cloud operating system 118. For example, the user input may include an endpoint URL of the identity service 120A of the cloud operating system 118. In another embodiment, the discovery application 112 may retrieve the endpoint URL of the identity service 120A from a service catalog of the identity service 120A. The endpoint URL may be retrieved based on a user request. For example, the endpoint URL may be given by "https://<Cloud OS DNS>:<Port>". For the discovery, an operator of the cloud operating system 118 may pre-configure project permissions associated with the cloud operating system 118 as the project permissions may be required to collect information from the identity service 120A. In an embodiment, the discovery server 114 may have access and open ports for the identity service 120A. This may enable the generation of the token, and also provide access to other services of the cloud operating system 118. The discovery application 112, through the discovery server 114, may send API calls to these services to discover resources associated with these services.

Through the discovery server 114, the discovery application 112 may configure a service account 110 (i.e. a cloud service account) for the discovery of resources associated with the cloud operating system 118. The service account 110 may be configured based on the authentication credential and the account information in the received user input. The authentication credentials may include a username and a password of a user account associated with the cloud operating system 118. The account information may include, for example, information related to a Domain ID associated the user account on the cloud operating system 118. As an example, the dashboard service 120G may be accessed through a user-interface of the dashboard service 120G on the user device 104. Through the user-interface, the user 122 may login to the user account and may access project data, such as a Domain ID, a project ID, and a name for which a discovery of resources may be performed. The user 122 should have sufficient permissions to view resources associated with the project data. The discovery application 112 may receive, via the application interface 104A, the user input including the authentication credential and account information, which may include the project data.

In an embodiment, the user input may also include information associated with a discovery schedule for running a discovery pattern to discover the resources associated with the cloud operating system 118. Based on the information associated with the discovery schedule and the project data in the received user input, the discovery application 112 may run the discovery pattern through the discovery server 114. The discovery pattern may include a sequence of operations, at least one of which may correspond to an API call to an API endpoint associated with a service of the cloud operating system 118. In an embodiment, the discovery application 112 may perform the communications (e.g., the transmission of the API call and the receipt a response to the transmitted API call) with the cloud operating system 118 through discovery server 114.

In an embodiment, the sequence of operations of the discovery pattern may include a first set of operations to scan for the configuration items associated with the cloud operating system 118. As an example, the first set of operations may include probe and/or sensor-based instructions to determine open Internet Protocol (IP) address(es) and port(s) (e.g., Transmission Control Protocol (TCP) or User Datagram Protocol (UDP) ports) associated with the cloud computing system 106 to detect online devices and applications associated with the cloud computing system 106. As a result of the execution of the first set of operations, the discovery application 112 may detect devices and applications associated with the cloud computing system 106 and create configuration items (CIs) corresponding to such devices and applications. The sequence of operations may further include a second set of operations that may follow the first set of operations. The second set of operations may correspond to operations to classify the detected devices and applications based on a determination of an Operating System (OS) version of the detected devices. For example, the second set of operations may include instructions to initiate a Secure Shell (SSH) connection with the detected device and retrieve the OS version from a predetermined file location on the device. The sequence of operations may further include a third set of operations that may follow the second set of operations. The third set of operations may include instructions to identify specific information related to the classified detected devices. Examples of details that may be identified as the specific information may include, but is not limited to, basic input/output system (BIOS) information, serial numbers, network interface information, media access control address(es) assigned to the network interface(s), and IP address(es) associated with the device. The sequence of operations may further include a fourth set of operations that may follow the third set of operations. The fourth set of operations may include instructions to explore an operational state of the classified detected device. The operational state may include, but is not limited to, processor information, memory information, and information related to execution of processes or applications on the detected device.

The first set of operations may be referred to as operations of a scanning phase and the second set of operations may be referred to as operations of a classification phase of the discovery. The third set of operations may be referred to as operations of an identification phase and the fourth set of operations may be referred to as operations of an exploration phase of the discovery. In some cases, the sequence of operations may consist essentially of the identification phase and the exploration phase. In such cases, the discovery may be referred to as a serverless discovery. The resources (i.e., devices) may be pre-determined and the discovery application 112 may directly discover applications or services hosted on the devices, while the discovery of the devices (through the scanning phase and the classification phase) may be skipped. In an embodiment, the discovery schedule associated with the cloud operating system 118 may be a serverless discovery schedule and the resources associated with the cloud operating system 118 may be discovered through a serverless discovery process. For example, the discovery schedule may be configured for one or more discovery patterns such as, but not limited to, "Cloud OS Validate service account", "Cloud OS—Get Logical Datacenters", "Cloud OS—Get Compute Resources", "Cloud OS—Get Identity Resources", "Cloud OS—Get Network Resources", "Cloud OS—Get Load Balancer Resources", and "Cloud OS—Get Storage Resources". Each of the one or more discovery patterns may be associated with a corresponding cloud operating system 118 service.

In an embodiment, the discovery application 112 may be configured to execute, based on the configured discovery schedule, the discovery pattern including the sequence of operations for the discovery of the resources associated with the cloud operating system 118. The execution of the discovery pattern may correspond to performing an API call to an API endpoint associated with a respective service (whose associated resources are be discovered using the discovery schedule) of the cloud operating system 118. The service may be associated with a resource (e.g., a computing resource, a networking resource, or a storage resource) associated with the cloud operating system 118.

In an embodiment, the discovery pattern may be used to execute one or more ordered actions including, but not limited to, generation of a token, verification of the generated token, discovery of one or more cloud regions, discovery of resources associated with the cloud operating system 118 service through a service pattern, creation of relationships based on a cloud operating system 118 model, and execution of extension sections to collect resource tags (if any, in the cloud operating system 118). A method to retrieve data through the discovery pattern for the cloud computing system 106 is described herein, for example.

The discovery application 112 may perform resource discovery via REST API requests, which may require authentication. Herein, the REST API requests may be part of a discovery pattern. As discussed in the aforementioned, the identity service 120A of the cloud operating system 118 may protect its identity service 120A APIs by use of role-based access control (RBAC) policy rules. By use of the authentication credential in the user input, the discovery application 112 may create HTTP requests to further generate authentication tokens. The generated authentication tokens may enable access to the REST APIs of the services (of the cloud operating system 118).

Post the generation of the authentication token, the discovery pattern may be run to generate REST API requests to other services of the cloud operating system 118 (the ID of the authentication token may be required in the X-Auth-Token request header). The discovery pattern may be further executed to validate the authentication token and list the domains, projects, roles, and endpoints that the token may enable access to. The discovery pattern may be further executed to use the token to request another token (which may be scoped for a different domain or project), immediately revoke a token, and/or list revoked public key infrastructure (PKI) tokens. As an example, the following HTTP POST request may be used to generate the authentication token: "POST<Cloud OS Access URL>/v2/auth/tokens
body—{"auth": {"identity": {"methods":["password"], "password":{"user":{"name": "<user_name>", "domain": {"id": "<domain_id>"}, password":"<password>"}}}, "scope":{"project": {:"<project_id>" }}}}"

Examples of the one or more discovery patterns that the discovery application 112 may execute for the discovery of the resources for the cloud operating system 118 may include, but are not limited to, Cloud OS—Validate service account, Cloud OS—Get Logical Datacenters, Cloud OS—Get Identity Resources, Cloud OS—Get Network Resources, Cloud OS—Get Load Balancer Resources, Cloud OS—Get Storage Resources, Cloud OS—Get Compute Resources, and Event triggered patterns per resource. As an example, the following HTTP GET request may be used to list the cloud regions:

"GET<Identity Service Endpoint URL>/v2/regions"

As another example, the following HTTP GET request may be used to list the services of the cloud operating system 118:

"GET<Identity Service Endpoint URL>/v2/regions"

As another example, the following HTTP GET request may be used to list endpoints of various services of the cloud operating system 118:

"GET<Identity access URL>/v2/endpoints"

As another example, the following HTTP GET request may be used to list domains of the cloud operating system 118:

"GET<Identity access URL>/v2/domains"

Examples of HTTP GET requests that may use endpoint URLs of the other services of the cloud operating system 118 for the discovery may include, but are not limited to, the following requests:

1. An HTTP GET request that may call a Compute Service endpoint URL to list compute servers: "GET<Compute Service Endpoint URL>/<compute-service_current_version>/servers/detail"
2. An HTTP GET request that may call a Compute Service endpoint URL to list compute service key pairs: "GET<Compute Service Endpoint URL>/<compute-service_current_version>/os-keypairs"
3. An HTTP GET request that may call a Load Balancer Service endpoint URL to list load balancers: "GET<Load Balancer Service Endpoint URL>/<load-balancer-service_current_version>/lbaas/loadbalancers"
4. An HTTP GET request that may call a Load Balancer Service endpoint URL to list listeners: "GET<Load Balancer Service Endpoint URL>/<load-balancer-service_current_version>/lbaas/listeners"
5. An HTTP GET request that may call a Load Balancer Service endpoint URL to list pools: "GET<Load Balancer Service Endpoint URL>/<load-balancer-service_current_version>/lbaas/pools"
6. An HTTP GET request that may call a Load Balancer Service endpoint URL to list pool members: "GET<Load Balancer Service Endpoint URL>/<load-balancer-service_current_version>/lbaas/pools/<pool_id>/members"
7. An HTTP GET request that may call a Block Storage Service endpoint URL to list project volumes: "GET<Block Storage Service Endpoint URL>/<block-storage-service_current_version>/<project_id>/volumes/detail"
8. An HTTP GET request that may call a Block Storage Service endpoint URL to list project volume snapshots: "GET<Block Storage Service Endpoint URL>/<block-storage-service current_version>/<project_id>/snapshots/detail"
9. An HTTP GET request that may call an Image Service endpoint URL to list images: "GET<Image Service Endpoint URL>/<image-service-current_version>/images"
10. An HTTP GET request that may call a Networking Service endpoint URL to list networks: "GET<Networking Service Endpoint URL>/<networking-service_current_version>/networks"
11. An HTTP GET request that may call a Networking Service endpoint URL to list subnets: "GET<Networking Service Endpoint URL>/<networking-service_current_version>/subnets"
12. An HTTP GET request that may call a Networking Service endpoint URL to list security groups: "GET<Networking Service Endpoint URL>/<networking-service_current_version>/security-groups"
13. An HTTP GET request that may call a Networking Service endpoint URL to list security group rules: "GET<Networking Service Endpoint URL>/<networking-service_current_version>/security-group-rules"

In an embodiment, each of the one or more discovery patterns may include one or more EVALs associated with certain operations (in the sequence of operations) of each discovery pattern. An EVAL may be a script-based code (e.g., a code written in JavaScript), such as a function or method that may be executed to supplement or complement an operation of the discovery pattern. Examples of the one or more EVALs included in a discovery patterns may include, but are not limited to, the following:

1. An EVAL that may be used to generate the authentication token.
2. An EVAL that may be used to validate a provided Project as Cloud service account and its Datacenter URL, by checking if it exists and is active in the cloud operating system 118.
3. An EVAL that may use the authentication token to validate the information and get the Catalog Services info.
4. An EVAL that may use the authentication token and Datacenter URL to get the project regions.
5. An EVAL that may use the authentication token and any Service URL to check for the service current_version.
6. An EVAL that may use the authentication token and all service URLs to check for configured resources in all regions where the service may be available. The EVAL may be configured to obtain details of only one resource if a shared library is used in an event triggered pattern.
7. An EVAL that may be used to filter a specific resource based on the selected regions in the discovery. Filtering may happen in the EVAL, as regions of the cloud operating system 118 may not have strict names, which may allow regions with names, such as "example" and "example1" to exist. Thus, the EVAL may exclude the usage of contains and leaves only exact match.
8. Tag EVALs may use tags to enable grouping and organization of CIs. The tags may be set to any privacy level including, but not limited to, global (visible to all users), shared (visible to a specific group of users), or private (visible to a single individual/user). The tags may be collected as pattern extension sections and tags may be supported by certain resources and certain API versions of the cloud operating system 118. In an embodiment, to collect information associated with the tags, the patterns may parse either "tags" sections in the JSON response, if available, or "metadata" section. As tags may include complex structure, EVAL parsing may be used to extract the information associated with the tags. The following are example tag EVALs:
   8.1 A Tag EVAL that may extract the tags from the "metadata" section of an API response.
   8.2 A Tag EVAL that may extract the tags from the "tags" section of an API response.
   8.3 Tag EVALs that may be used to split the Tag json body into key-value sections based on a special character. (The special character may be either equal "=" for Tag json section or colon ":" for Metadata json section)

Based on the execution of the discovery pattern by the discovery application 112, the discovery application 112 may be configured to receive, through the discovery server 114, a response to the sent API call from the cloud operating system 118. The response may include a payload of information associated with the resources (associated with the cloud operating system 118). For example, the sent API call may include a REST API-based HTTP GET query to the API endpoint. The response from the cloud operating system 118 may include the payload of information associated with the resources in a context associated with an HTTP response to the REST API-based HTTP GET query. As an example, the payload of information associated with the response may be stored as a JSON key-value pair in a context field of the HTTP response.

In an embodiment, the discovery application 112 may be configured to parse the received response corresponding to the query to determine the information associated with the resources. In another embodiment, the discovery application 112 may parse the received response (e.g., an HTTP response) to extract the context associated with the HTTP response. For example, the discovery application 112 may parse the received response to extract JSON key-value pair values as the information associated with the resources.

By way of example, and not limitation, the information associated with the resources (associated with the cloud operating system 118) may include the following information:

1. Information related to resources associated with the Identity service 120A that may be extracted by the execution of the pattern "Cloud OS—Get Identity Resources". Such resources associated with the Identity service 120A may include, but are not limited to, services associated with the cloud operating system 118, endpoints associated with the cloud operating system 118, and domains associated with the cloud operating system 118.
2. Information related to resources associated with the Compute service 120B and the Image service 120C that may be extracted by the execution of the pattern "Cloud OS—Get Compute Resources". Such resources associated with Compute service 120B, may include, but are not limited to, compute servers and compute key pairs. The resources associated with the Image service 120C may include, but are not limited to, images.
3. Information related to resources associated with the Load balancer service 120F that may be extracted by the execution of the pattern "Cloud OS—Get Load Balancer Resources". Such resources associated with the Load balancer service 120F may include, but are not limited to, load balancers, listeners, pools, and pool members.
4. Information related to resources associated with the Block storage service 120D that may be extracted by the execution of the pattern "Cloud OS—Get Storage Resources". Such resources associated with the Block storage service 120D may include, but are not limited to, block storage volumes, and block storage snapshots.
5. Information related to resources associated with the Networking service 120E that may be extracted by the execution of the pattern "Cloud OS—Get Network Resources". Such resources associated with the Networking service 120E may include, but are not limited to, networks, subnets, security groups, and security group rules.

Based on the received (or parsed) response, the discovery application 112 may be configured to update one or more configuration items (CIs) associated with the discovered resources on the CMDB 116. Each configuration item may correspond to a logical representation of a resource associated with the cloud operating system 118. Each configuration item may represent a presence, a status, attributes of a respective resource and relationships with other resources. As an example, the discovery application 112 may store the extracted information (from the parsed response) in CI tables on the CMDB 116.

Following are example CI tables for resources associated with the cloud operating system 118. Table 1 illustrates exemplary fields of a CI table "cloud_os_service" associated with the Identity service 120A.

TABLE 1

Exemplary fields of the "cloud_os_service" CI table

| CI table fields | Field description |
| --- | --- |
| object_id | The ID for the service. |
| name | The name of the service. |

TABLE 1-continued

Exemplary fields of the "cloud_os_service" CI table

| CI table fields | Field description |
| --- | --- |
| short_description | The service description. |
| type | The service type, which may describe the API implemented by the service. Value may be compute, ec2, identity, image, network, or volume. |
| enabled | Defines whether the service and its endpoints appear in the service catalog. Values may be: false: The service and its endpoints may not appear in the service catalog. true: The service and its endpoints may appear in the service catalog. |

An API call to retrieve data for the "cloud_os_service" CI table may be given by "<identity entry point>/<current service version>/services". With reference to table 1, the "object_id" CI table field may be populated from an "id" attribute in a response to the API call. Further, the "name", "short_description", "type", and "enabled" CI table fields may be populated from "name", "description", "type", and "enabled" attributes in the response to the API call.

Table 2 illustrates fields of a CI table "cloud_os_endpoint" associated with an Identity endpoint of the cloud operating system 118.

TABLE 2

Exemplary fields of the "cloud_os_endpoint" CI table

| CI table fields | Field description |
| --- | --- |
| object_id | The ID for the endpoint. |
| name | The URL of the endpoint. |
| interface | The interface type, which may describe the visibility of the endpoint. Values may be: public: Visible by end users on a publicly available network interface. internal: Visible by end users on an unmetered internal network interface. admin: Visible by administrative users on a secure network interface. |
| enabled | Defines whether the service and its endpoints appear in the service catalog. Values may be: false: The service and its endpoints may not appear in the service catalog. true: The service and its endpoints may appear in the service catalog. |

An API call to retrieve data for the CI table "cloud_os_endpoint" may be given by "<identity entry point>/<current service version>/endpoints". With reference to table 2, the "object_id" CI table field may be populated from an "id" attribute in a response to the API call. Further, the "name", "interface", and "enabled" CI table fields may be populated from "url", "interface", and "enabled" attributes in the response to the API call.

Table 3 illustrates exemplary fields of a "cloud_os_domain" CI table associated with an Identity domain of the cloud operating system 118.

TABLE 3

Exemplary fields of the "cloud_os_domain" CI table

| CI table fields | Field description |
| --- | --- |
| object_id | The ID for the domain. |
| name | The name of the domain. |

TABLE 3-continued

Exemplary fields of the "cloud_os_domain" CI table

| CI table fields | Field description |
| --- | --- |
| short_description | The description of the domain. |
| enabled | Defines whether the domain is enabled or not. Values may be:<br>false: to disable the domain.<br>true: to enable the domain. |

An API call to retrieve data for the "cloud_os_domain" CI table may be given by "<identity entry point>/<current service version>/domains". With reference to table 3, the "object_id" CI table field may be populated from an "id" attribute in a response to the API call. Further, the "name", "short_description", and "enabled" CI table fields may be populated from "name", "description", and "enabled" attributes in the response to the API call.

Table 4 illustrates exemplary fields of a CI table "vm_instance" associated with compute servers of the cloud operating system 118.

TABLE 4

Exemplary fields of the "vm instance" CI table

| CI table fields | Field description |
| --- | --- |
| object_id | The UUID for the server. |
| name | The server name |
| status | The server status |
| short_description | An optional description of the server. |

An API call to retrieve data for the CI table "vm_instance" may be given by "<compute entry point>/<current service version>/servers/detail". With reference to table 4, the "object_id" CI table field may be populated from an "id" attribute in a response to the API call. Further, the "name", "status", and "short_description" CI table fields may be populated based on "id", "status", and "description" attributes of the response.

Table 5 illustrates exemplary fields of a CI table "cloud_key_pair" associated with compute key pairs of the cloud operating system 118.

TABLE 5

Exemplary fields of the CI table "cloud_key_pair"

| CI table fields | Field description |
| --- | --- |
| object_id | A name for the keypair which will be used to reference it later. |
| name | A name for the keypair which will be used to reference it later. |
| finger_print | The fingerprint for the keypair. |

An API call to retrieve data for the CI table "cloud_key_pair" may be given by "<compute entry point>/<current service version>/os-keypairs". With reference to table 5, the "object_id" CI table field may be populated from a "name" attribute in a response to the API call. Further, the "name" and "finger_print" CI table fields may be populated from "name" and "fingerprint" attributes in the response to the API call.

Table 6 illustrates exemplary fields of a CI table "cloud_load_balancer" associated with a load balancer of the cloud operating system 118.

TABLE 6

Exemplary fields of the "cloud_load_balancer" CI table

| CI table fields | Field description |
| --- | --- |
| object_id | The ID for the load balancer. |
| name | A human-readable name of the resource. |
| short_description | A human-readable description of the resource. |
| install_status | The provisioning status of the resource. |
| operational_status | The operational status of the resource. |

An API call to retrieve data for the CI table "cloud_load_balancer" may be given by "<load-balancer entry point>/<current service version>/lbaas/loadbalancers". With reference to table 6, the "object_id" CI table field may be populated based on an "id" attribute in a response to the API call. Further, the "name", "short_description", "install_status", and "operational_status" CI table fields may be populated based on "name", "description", "provisioning_status", and "operating_status" attributes in the response to the API call.

Table 7 illustrates exemplary fields of a CI table "lb_listener" associated with listeners of the cloud operating system 118.

TABLE 7

Exemplary fields of the "lb_listener" CI table

| CI table fields | Field description |
| --- | --- |
| object_id | The ID for the listener. |
| name | A human-readable name of the resource. |
| install_status | The provisioning status of the resource. |
| operational_status | The operational status of the resource. |
| listener_port | The protocol port number of the resource. |
| listener_protocol | The protocol for the resource.<br>Values may be one of: HTTP, HTTPS, TCP, TERMINATED_HTTPS, or UDP. |

An API call to retrieve data for the CI table "lb_listener" may be given by "<load-balancer entry point>/<current service version>/lbaas/listeners". With reference to table 7, the "object_id" CI table field may be populated from an "id" attribute in a response to the API call. Further, the "name", "install_status", "operational_status", "listener_port", and "listener_protocol" CI table fields may be populated from "name", "provisioning_status", "operating_status", "protocol_port", and "protocol" attributes in the response to the API call.

Table 8 illustrates exemplary fields of a CI table "lb_pool" associated with pools of the cloud operating system 118.

TABLE 8

Exemplary fields of the CI table "lb_pool"

| CI table fields | Field description |
| --- | --- |
| object_id | The ID for the pool. |
| name | A human-readable name of the resource. |
| install_status | The provisioning status of the resource. |
| operational_status | The operational status of the resource. |
| short_description | A human-readable description of the resource. |
| load_balancing_methed | The load balancing algorithm for the pool. Values may be one of:<br>LEAST_CONNECTIONS, ROUND_ROBIN, SOURCE_IP, or SOURCE_IP_PORT. |

An API call to retrieve data for the CI table "lb_pool" may be given by "<load-balancer entry point>/<current service version>/lbaas/pools". With reference to table 8, the "object_id" CI table field may be populated based on an "id" attribute in a response to the API call. Further, the "name", "install_status", "operational_status", "short_description", and "load_balancing_method" CI table fields may be populated based on "name", "providing_status", "operating_status", "description", and "lb_algorithm" attributes in the response to the API call.

Table 9 illustrates exemplary fields of a CI table "lb_pool_member" associated with pool members of the cloud operating system 118.

TABLE 9

Exemplary fields of the CI table "lb_pool_member"

| CI table fields | Field description |
| --- | --- |
| object_id | The ID for the member. |
| name | A human-readable name of the resource |
| install_status | The provisioning status of the resource. |
| ip_address | The IP address of the backend member server. |

An API call to retrieve data for the CI table "lb_pool member" may be given by: "<load-balancer entry point/<current service version>/lbaas/pools/<pool_id>/members". With reference to table 9, the "object_id" CI table field may be populated based on an "id" attribute in a response to the API call. Further, the "name", "install_status", and "ip_address" CI table fields may be populated based on "Pool<pool name> member<id>", "provisioning_status", and "address" attributes in the response to the API call.

Table 10 illustrates exemplary fields of a CI table "storage_volume" associated with block storage volumes of the cloud operating system 118.

TABLE 10

Exemplary fields of the CI table "storage_volume"

| CI table fields | Field description |
| --- | --- |
| object_id | The UUID of the storage volume. |
| name | The storage volume name. |
| status | The storage volume status. |
| short_description | The storage volume description. |
| storage_type | The associated type of the storage volume. |

An API call to retrieve data for the CI table "storage_volume" may be given by "<block-storage entry point>/<current service version>/{project_id}/volumes/detail". As an example, with reference to table 10, the "object_id" CI table field may be populated from an "id" attribute in a response to the API call. Further, the "name", "status", "short_description", and "storage_type" CI table fields may be populated from "name", "status", "description", and "volume_type" attributes in the response to the API call.

Table 11 illustrates exemplary fields of a CI table "storage_vol_snapshot" associated with block storage volume snapshots of the cloud operating system 118.

TABLE 11

Exemplary fields of the CI table "storage_vol_snapshot"

| CI table fields | Field description |
| --- | --- |
| object_id | The UUID of the storage volume snapshot. |
| name | The storage volume snapshot name. |

TABLE 11-continued

Exemplary fields of the CI table "storage_vol_snapshot"

| CI table fields | Field description |
| --- | --- |
| status | The storage volume snapshot status. |
| short_description | The storage volume snapshot description. |

An API call to retrieve data for the CI table "storage_vol_snapshot" may be given by "<block storage entry point>/<current service version>/{project_id}/snapshots/detail". With reference to table 11, the "object_id" CI table field may be populated based on an "id" attribute in a response to the API call. Further, the "name", "status", and "short_description" CI table fields may be populated based on "name", "status", and "description" attributes in the response to the API call.

Table 12 illustrates exemplary fields of a CI table "os_template" associated with images of the cloud operating system 118.

TABLE 12

Exemplary fields of the CI table "os_template"

| CI table fields | Field description |
| --- | --- |
| object_id | A unique user-defined image UUID. |
| name | The name of the image. Value may be null (JSON null data type). |
| status | The image status. |

An API call to retrieve data for the CI table "os_template" may be given by "<image entry point>/<current service version>/images". With reference to table 12, the "object_id" CI table field may be populated based on an "id" attribute in a response to the API call. Further, the "name" and "status" CI table fields may be populated based on "name" and "status" attributes in the response to the API call.

Table 13 illustrates exemplary fields of a CI table "network" associated with networks of the cloud operating system 118.

TABLE 13

Exemplary fields of the "network" CI table

| CI table fields | Field description |
| --- | --- |
| object_id | The ID for the network. |
| name | A human-readable name of the network. |
| operational_status | The network status. Values are ACTIVE, DOWN, BUILD or ERROR. |
| short_description | A human-readable description of the resource. |

An API call to retrieve data for the CI table "network" may be given by "<networking entry point>/<current service version>/networks". With reference to table 13, the "object_id" CI table field may be populated based on an "id" attribute in a response to the API call. Further, the "name", "operational_status", and "short_description" CI table fields may be populated based on "name", "status", and "description" attributes in the response to the API call.

Table 14 illustrates exemplary fields of a CI table "cloud_subnet" associated with subnets of the cloud operating system 118.

TABLE 14

Exemplary fields of the "cloud_subnet" CI table

| CI table fields | Field description |
| --- | --- |
| object_id | The ID for the subnet. |
| name | A human-readable name of the resource. |
| Is_dhcp_enabled | Indicates whether DHCP is enabled or disabled for the subnet. |
| short_description | A human-readable description of the resource. |

An API call to retrieve data for the "cloud_subnet" CI table may be given by "<networking entry point>/<current service version>/subnets". With reference to table 14, the "object_id" CI table field may be populated based on an "id" attribute in a response to the API call. Further, the "name", "is_dhcp_enabled", and "short_description" CI table fields may be populated based on "name", "enable_dhcp", and "description" attributes in the response to the API call.

Table 15 illustrates exemplary fields of a CI table "compute_security_group" associated with security groups of the cloud operating system 118.

TABLE 15

Exemplary fields of the CI table "compute_security_group"

| CI table fields | Field description |
| --- | --- |
| object_id | The ID for the security group. |
| name | A human-readable name of the resource. |
| short_description | A human-readable description of the resource. |

An API call to retrieve data for the CI table "compute_security_group" may be given by "<networking entry point>/<current service version>/security-groups". With reference to table 15, the "object_id" CI table field may be populated based on an "id" attribute in a response to the API call. Further, the "name", and "short_description" CI table fields may be populated based on "name" and "description" attributes in the response to the API call.

Table 16 illustrates exemplary fields of a CI table "compute_security_group_rule" associated with security group rules of the cloud operating system 118.

TABLE 16

Exemplary fields of the CI table "compute_security_group_rule"

| CI table fields | Field description |
| --- | --- |
| object_id | The ID for the security group rule. |
| name | The ID for the security group rule. |
| short_description | A human-readable description of the resource. |
| ethertype | May be one of: IPv4 or IPv6, and addresses represented in CIDR may be required to match the ingress or egress rules. |
| port_range_max | The maximum port number in the range that may be matched by the security group rule. If the protocol is TCP, UDP, DCCP, SCTP or UDP-Lite this value may be greater than or equal to the port_range_min attribute value. If the protocol is ICMP, this value may be an ICMP code. |
| port_range_min | The minimum port number in the range that may be matched by the security group rule. If the protocol is TCP, UDP, DCCP, SCTP or UDP-Lite this value may be less than or equal to the port_range_max attribute value. If the protocol is ICMP, this value may be an ICMP type. |

An API call to retrieve data for the CI table "compute_security_group_rule" may be given by "<networking entry point>/<current service version>/security-group-rules". With reference to table 16, the "object_id" CI table field may be populated based on an "id" attribute in a response to the API call. Further, the "name", "short_description", "ethertype", "port_range_max", and "port_range_min" CI table fields may be populated based on "description", "ethertype", "port_range_max", and "port_range_min" attributes in the response to the API call.

The discovery application 112 may be further configured to generate a class model associated with the discovered resources (associated with the cloud operating system 118). The class model may be generated based on the updated one or more CIs. An example of the class model is explained further, for example, in FIG. 3.

Figure 2:
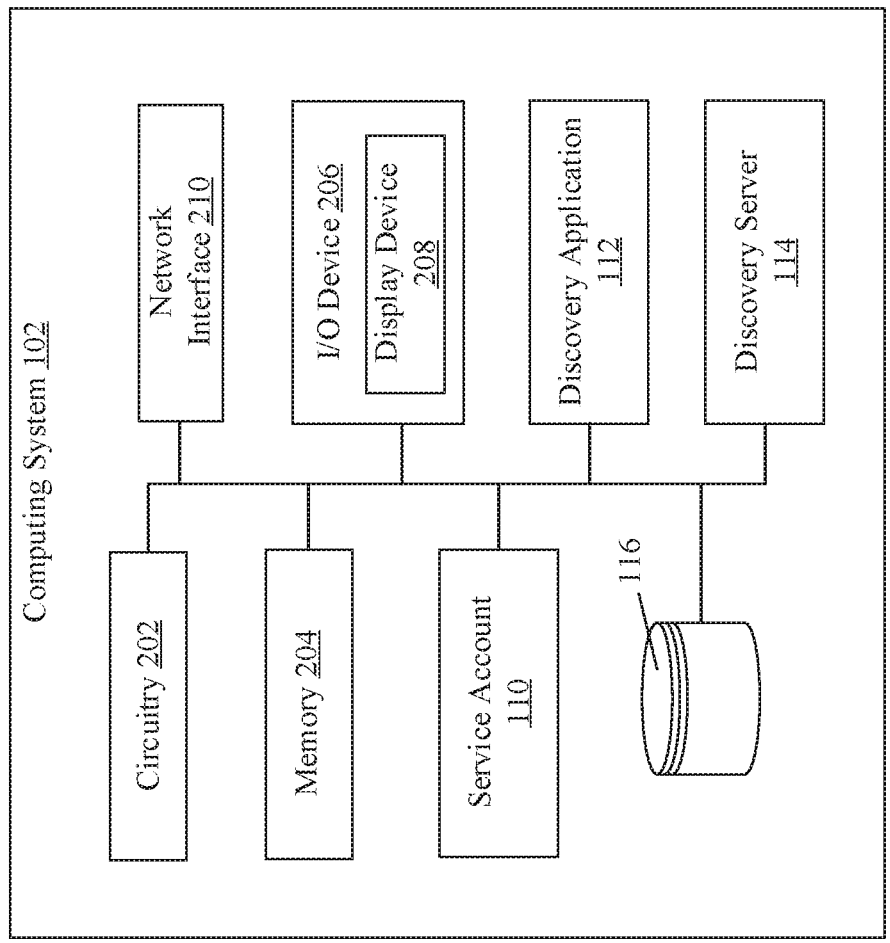
FIG. 2 is a block diagram of a computing system for implementing a discovery of resources associated with a cloud operating system, in accordance with an embodiment of the disclosure.

FIG. 2 is a block diagram of a computing system for implementing a discovery of resources associated with a cloud operating system, in accordance with an embodiment of the disclosure. FIG. 2 is explained in conjunction with elements from FIG. 1. With reference to FIG. 2, there is shown a block diagram 200 of the computing system 102. The computing system 102 may include the service account 110, the discovery application 112, the discovery server 114, and the CMDB 116. The discovery server 114 may be communicate with the discovery application 112 and the CMDB 116. The discovery application 112 may be associated with the service account 110.

The computing system 102 may also include circuitry 202, a memory 204, an input/output (I/O) device 206, a display device 208, and a network interface 210. In some embodiments, the CMDB 116 may be separate from the discovery server 114 and may communicate with the discovery server 114 via the network interface 210. In some other embodiments, the memory 204 may include the CMDB 116.

The circuitry 202 may include suitable logic, circuitry, interfaces, and/or code that may be configured to execute instructions for operations to be executed by the computing system 102. Examples of implementation of the circuitry 202 may include a Central Processing Unit (CPU), x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), co-processors, other processors, and/or a combination thereof.

The memory 204 may include suitable logic, circuitry, code, and/or interfaces that may be configured to store the instructions executable by the circuitry 202. In some embodiments, the memory 204 may store the configuration items associated with the resources of the cloud operating system 118. In such a case, the CMDB 116 may be implemented as a database stored on the memory 204. Examples of implementation of the memory 204 may include, but are not limited to, Random Access Memory (RAM), Read Only Memory (ROM), Hard Disk Drive (HDD), Solid State Drive (SSD), and/or a Secure Digital (SD) card.

The I/O device 206 may include suitable logic, circuitry, and/or interfaces that may be configured to receive an input and provide an output based on the received input. The I/O device 206 may include various input and output devices, which may be configured to communicate with the circuitry 202. Examples of the I/O device 206 may include, but are not limited to, a touch screen, a keyboard, a mouse, a joystick, a display device (e.g., the display device 208), a microphone, or a speaker.

The display device 208 may include suitable logic, circuitry, and interfaces that may be configured to display output associated with the discovery server 114. The display device 208 may be a touch screen which may enable a user of the discovery server 114 to provide a user-input via the display device 208. The display device 208 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 208 may refer to a display screen of a head mounted device (HMD), a smart-glass device, a see-through display, a projection-based display, an electro-chromic display, or a transparent display.

The network interface 210 may include suitable logic, circuitry, interfaces, and/or code that may be configured to enable communication among the cloud computing system 106 and different operational components, such as the discovery server 114, the CMDB 116, and the discovery application 112 of computing system 102, via one or more communication networks. The network interface 210 may implement known technologies to support wired or wireless communication with the one or more communication networks.

The network interface 210 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

Similar to the computing system 102, the user device 104 (though not shown in FIG. 2) may include one or more components, including, but not limited to, circuitry, a memory, a I/O device, a display device, and a network interface with similar functions. The functions or operations executed by the discovery application 112 and the discovery server 114, as described in FIGS. 1, 3, 4A, 4B, 4C, 4D, 4E, and 4F, and 5, may be performed by the circuitry 202. Operations executed by the circuitry 202 are described in detail, for example, in FIGS. 1, 3, 4A-4F, and 5.

Figure 3:
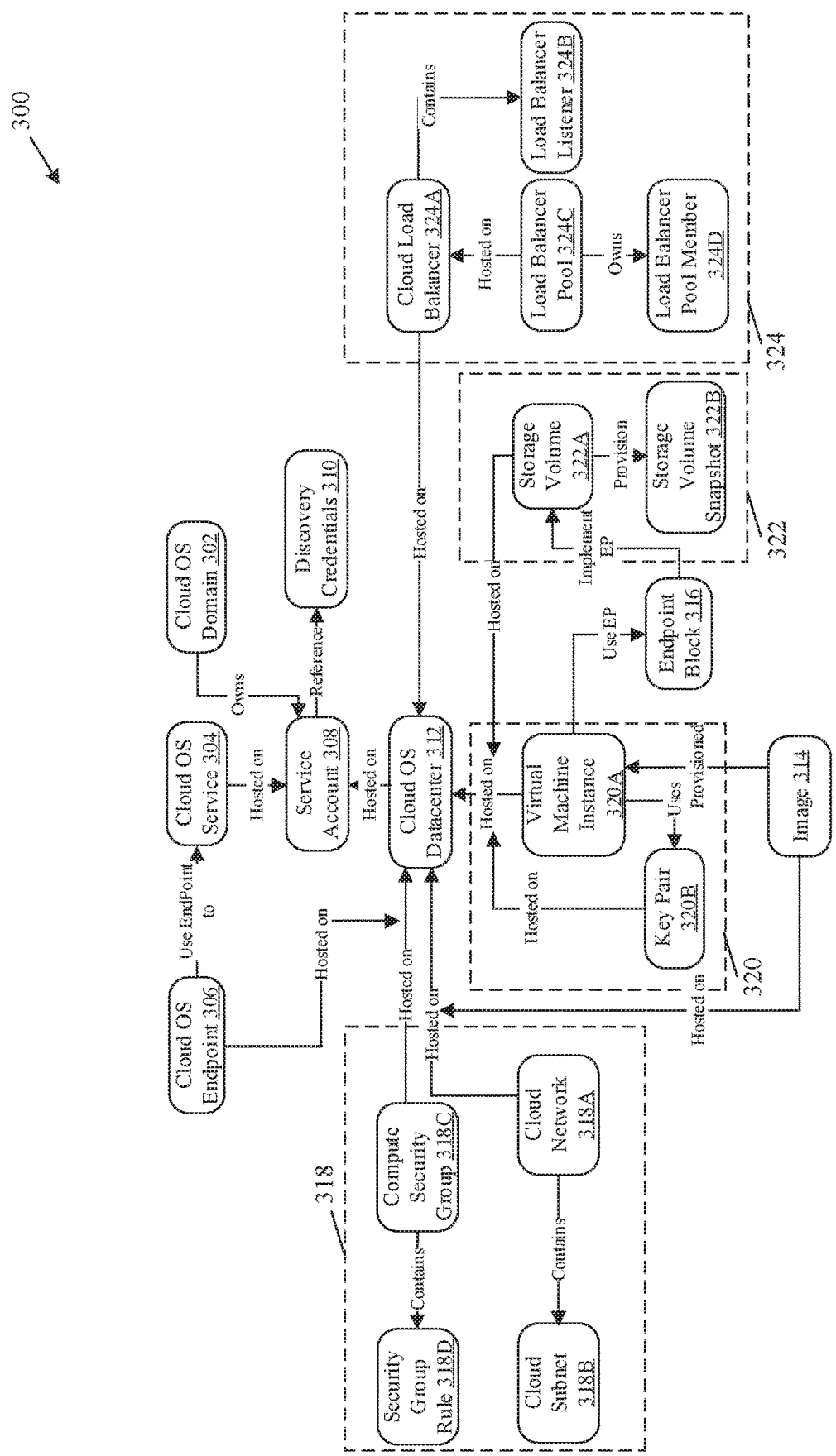
FIG. 3 illustrates a class model for resources associated with a cloud operating system, in accordance with example embodiments.

FIG. 3 illustrates a class model for resources associated with a cloud operating system, in accordance with example embodiments. FIG. 3 is explained in conjunction with elements from FIG. 1 and FIG. 2. With reference to FIG. 3, there is shown a class model 300 for resources (as described in FIG. 1) associated with the cloud operating system 118. The class model 300 includes a plurality of classes and relationships among two or more of the plurality of classes. The class model 300 is merely shown as an example and should not be construed as limiting for the disclosure.

The class model 300 may include at least one of a first class associated with a domain of the cloud operating system 118, a second class associated with a service of the cloud operating system 118, and a third class associated with an endpoint of the cloud operating system 118. As shown, the first class may be a Cloud OS Domain class 302, the second class may be a Cloud OS Service class 304, and the third class may be a Cloud OS Endpoint class 306.

With reference to FIG. 3, the class model may further include a service account class 308, a Discovery Credentials class 310, a Cloud OS Datacenter class 312, an Image class 314, an Endpoint Block class 316, a first set of classes 318 associated with the networking service 120E, a second set of classes 320 associated with the compute service 120B, a third set of classes 322 associated with the block storage service 120D, and a fourth set of classes 324 associated with the load balancer service 120F.

The first set of classes 318 associated with the networking service 120E may include a Cloud Network class 318A, a Cloud Subnet class 318B, a Compute Security Group class 318C, and a Security Group Rule class 318D. The second set of classes 320 associated with the compute service 120B may include a Virtual Machine Instance class 320A and a Key Pair class 320B. The third set of classes 322 associated with the block storage service 120D may include a Storage Volume class 322A and a Storage Volume Snapshot class 322B. The fourth set of classes 324 associated with the load balancer service 120F may include a Cloud Load Balancer class 324A, a Load Balancer Listener class 324B, a Load Balancer Pool class 324C, and a Load Balancer Pool Member class 324D.

As shown in FIG. 3, the first class (i.e., the Cloud OS Domain class 302) may own the service account class 308, and the second class (i.e., the Cloud OS Service class 304) may be hosted on the service account class 308. Further, the third class (i.e., the Cloud OS Endpoint class 306) may use an endpoint to the second class (i.e., the Cloud OS Service class 304) and may be hosted on the Cloud OS Datacenter class 312. The service account class 308 may refer to the Discovery Credentials class 310, and the Cloud OS Datacenter class 312 may be hosted on the service account class 308. The Compute Security Group class 318C, the Cloud Network class 318A, the Image class 314, the Key Pair class 320B, the Virtual Machine Instance class 320A, Storage Volume class 322A, and the Cloud Load Balancer class 324A may be hosted on the Cloud OS Datacenter class 312.

In case of the networking service 120E, the Compute Security Group class 318C may contain the Security Group Rule class 318D, and the Cloud Network class 318A may contain the Cloud Subnet class 318B. The Image class 314 may provision the Virtual Machine Instance class 320A. In case of the compute service 120B, the Virtual Machine Instance class 320A may use the Key Pair class 320B and further use an endpoint associated with the Endpoint Block class 316. The Endpoint Block class 316 may implement an endpoint of the Storage Volume class 322A of the block storage service 120D. The Storage Volume class 322A may provision the Storage Volume Snapshot class 322B. In case of the load balancer service 120F, the Cloud Load Balancer class 324A may contain the Load Balancer Listener class 324B. Further, the Load Balancer Pool class 324C may be hosted on the Cloud Load Balancer class 324A and may own the Load Balancer Pool Member class 324D.

Each of the classes of the class model 300 may have an associated CI table in the CMDB 116 to store data associated with objects of the class. The information associated with the discovered resources may be stored in various CI tables on the CMDB 116. An example of various CI tables and their corresponding classes (as depicted in the class model 300) is mentioned in Table 17, as follows:

TABLE 17

Example of CI Tables and their corresponding classes

| CI Tables | Classes |
|---|---|
| cloud_os_datacenter | Cloud OS Datacenter class 312 |
| cloud_os_service | Cloud OS Service class 304 |
| cloud_os_endpoint | Cloud OS Endpoint class 306 |
| cloud_os_domain | Cloud OS Domain class 302 |
| cloud_service_account | service account class 308 |
| network | Cloud Network class 318A |
| cloud_subnet | Cloud Subnet class 318B |
| compute_security_group | Compute Security Group class 318C |
| compute_security_group_rule | Security Group Rule class 318D |
| cloud_load_balancer | Cloud Load Balancer class 324A |
| lb_listener | Load Balancer Listener class 324B |
| lb_pool | Load Balancer Pool class 324C |
| lb_pool_member | Load Balancer Pool Member class 324D |
| storage_volume | Storage Volume class 322A |
| storage_vol_snapshot | Storage Volume Snapshot class 322B |
| vm_instance | Virtual Machine Instance class 320A |
| cloud_key_pair | Key Pair class 320B |
| os_template | Image class 314 |

An example of the relationships between the CI tables of Table 17 based on the class model is presented in Table 18, as follows:

TABLE 18

Example of relationships between CI Tables associated with classes of the class model

| CI Table | Relationship | CI Table |
|---|---|---|
| cloud_os_datacenter | Hosted on::Hosts | cloud_service_account |
| cloud_os_service | Hosted on::Hosts | cloud_service_account |
| cloud_os_endpoint | Use_End_Point To::Use End Point From | cloud_os_service |
| cloud_os_endpoint | Hosted on::Hosts | cloud_os_datacenter |
| cloud_os_domain | Owns::Owned by | cloud_service_account |
| network | Hosted on::Hosts | cloud_os_datacenter |
| network | Contains::Contained by | cloud_subnet |
| compute_security_group | Hosted on::Hosts | cloud_os_datacenter |
| compute_security_group | Contains::Contained by | compute_security_group_rule |
| cloud_load_balancer | Hosted on::Hosts | cloud_os_datacenter |
| cloud_load_balancer | Contains::Contained by | lb_listener |
| lb_pool | Hosted on::Hosts | cloud_load_balancer |
| lb_pool | Owns::Owned by | lb_pool_member |
| storage_volume | Hosted on::Hosts | cloud_os_datacenter |
| vm_instance | Uses::Used by | storage_volume |
| storage_vol_snapshot | Hosted on::Hosts | cloud_os_datacenter |
| storage_vol_snapshot | Provisiond From::Provisioned | storage_volume |
| vm_instance | Hosted on::Hosts | cloud_os_datacenter |
| cloud_key_pair | Hosted on::Hosts | cloud_os_datacenter |
| os_template | Hosted on::Hosts | cloud_os_datacenter |
| vm_instance | Provisiond From::Provisioned | os_template |

Figure 4A:
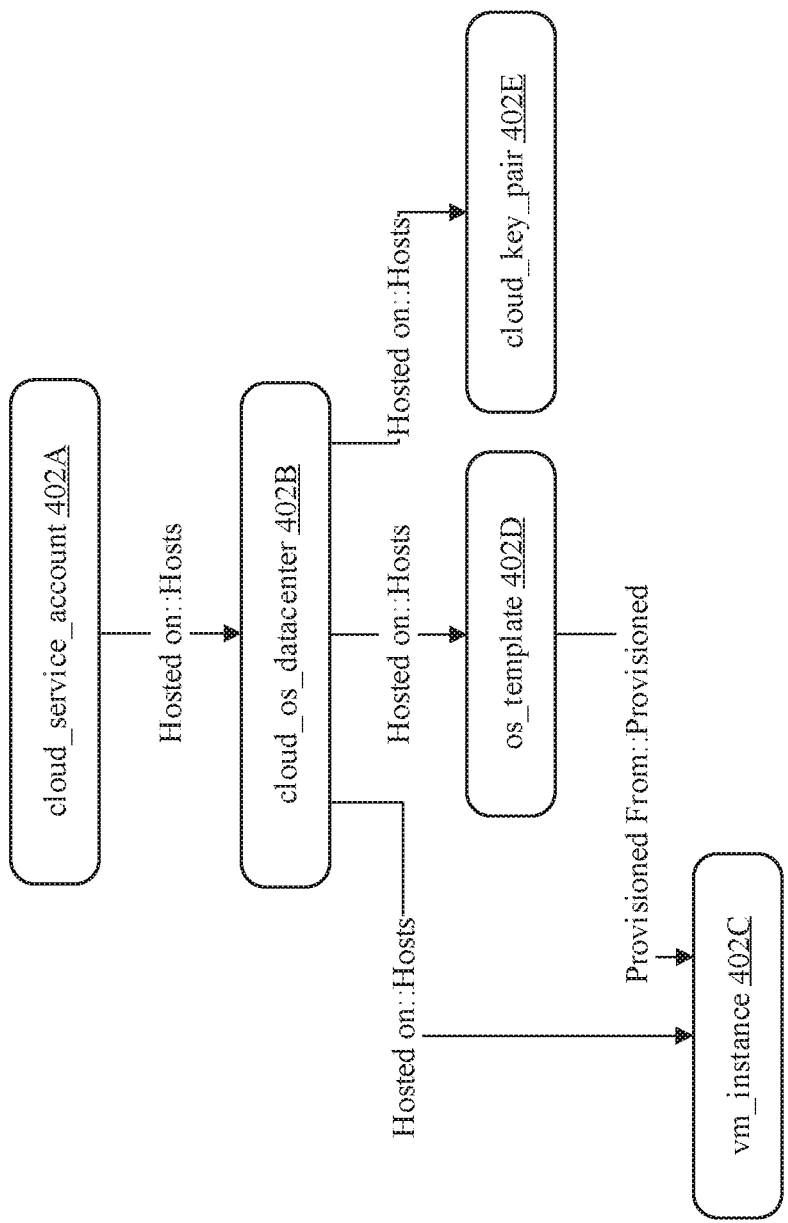
FIGS. 4A, 4B, 4C, 4D, 4E, and 4F illustrate CI models associated with a discovery of resources associated with a cloud operating system, in accordance with example embodiments.

FIGS. 4A, 4B, 4C, 4D, 4E, and 4F, collectively, illustrate CI models associated with a discovery of resources associated with a cloud operating system, in accordance with example embodiments. FIGS. 4A, 4B, 4C, 4D, 4E, and 4F are explained in conjunction with elements from FIGS. 1, 2, and 3. With reference to FIG. 4A, there is shown a CI model 400A associated with a discovery pattern for compute resources (such as Cloud OS—Get Compute Resources). Such a pattern may be executed by the discovery application 112 to discover resources associated with the cloud operating system 118.

In FIG. 4A, there is shown a CI "cloud_service_account" 402A, a CI "cloud_os_datacenter" 402B, a CI "vm_instance" 402C, a CI "os_template" 402D, and a CI "cloud_key_pair" 402E. The CI "cloud_service_account" 402A may be hosted on the CI "cloud_os_datacenter" 402B. Further, the CI "cloud_os_datacenter" 402B may be hosted on each of the CIs "vm_instance" 402C, "os_template" 402D, and "cloud_key_pair" 402E. The CI "os_template" 402D may be provisioned from the CI "vm_instance" 402C.

Figure 4B:
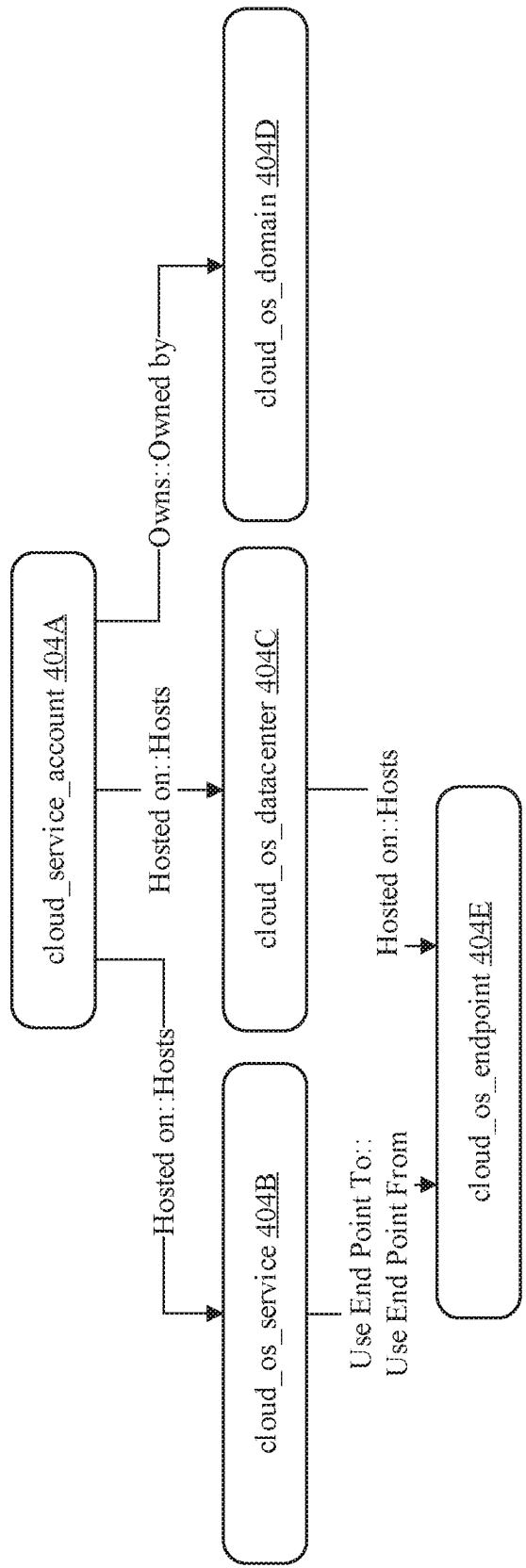

With reference to FIG. 4B, there is shown a CI model 400B associated with a discovery pattern for identity resources (such as Cloud OS—Get Identity Resources). Such a pattern may be executed by the discovery application 112 to discover resources associated with the cloud operating system 118. In FIG. 4B, there is shown a CI "cloud_service_account" 404A, a CI "cloud_os_service" 404B, a CI "cloud_os_datacenter" 404C, a CI "cloud_os_domain" 404D, and a CI "cloud_os_endpoint" 404E. The CI "cloud_service_account" 404A may be hosted on the CI "cloud_os_service" 404B and also on the CI "cloud_os_datacenter" 404C. The CI "cloud_service_account" 404A may own the CI "cloud_os_domain" 404D. Further, the CI "cloud_os_service" may use an endpoint to the CI "cloud_os_endpoint". The CI "cloud_os_datacenter" 404C may be hosted on the CI "cloud_os_endpoint" 404E.

Figure 4C:
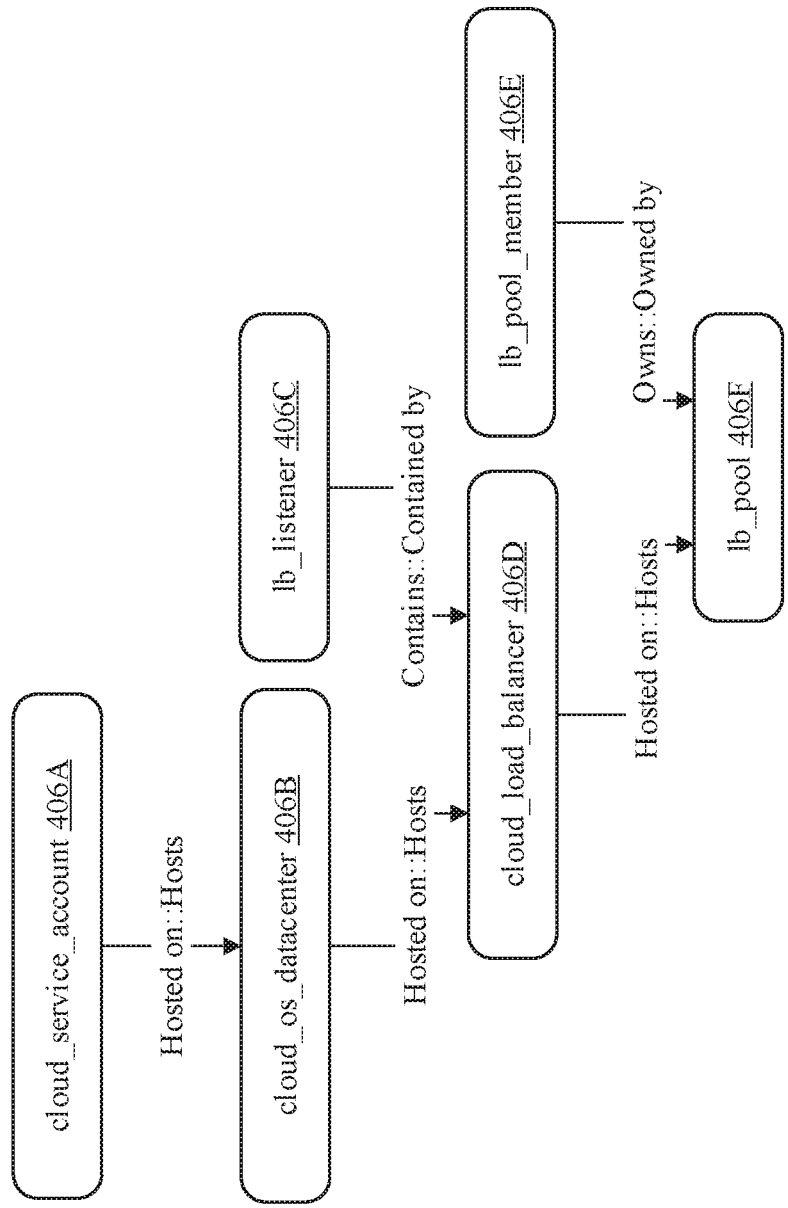

With reference to FIG. 4C, there is shown a CI model 400C associated with a discovery pattern for load balancer resources (such as Cloud OS—Get Load Balancer Resources). Such a pattern may be executed by the discovery application 112 to discover resources associated with the cloud operating system 118. In FIG. 4C, there is shown a CI "cloud_service_account" 406A, a CI "cloud_os_datacenter" 406B, a CI "lb_listener" 406C, a CI "cloud_load_balancer" 406D, a CI "lb_pool_member" 406E, and a CI "lb_pool" 406F. The CI "cloud_service_account" 406A may be hosted on the CI "cloud_os_datacenter" 406B, which may be hosted on the CI "cloud_load_balancer" 406D. The CI "lb_listener" 406C may contain the CI "cloud_load_balancer" 406D, which may be hosted on the CI "lb_pool" 406F. The CI "lb_pool_member" 406E may own the CI "lb_pool" 406F.

Figure 4D:
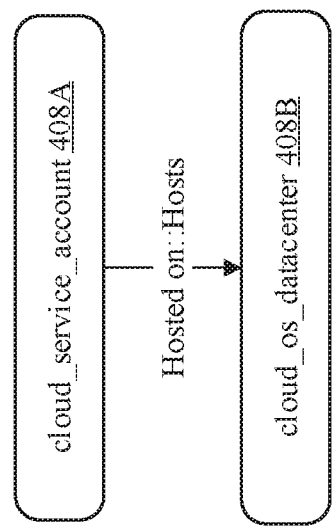

With reference to FIG. 4D, there is shown a CI model 400D associated with a discovery pattern for logical datacenter resources (such as Cloud OS—Get Logical Datacenter), which may be executed by the discovery application 112 to discover resources associated with the cloud operating system 118. In FIG. 4D, there is shown a CI "cloud_service_account" 408A and a CI "cloud_os_datacenter" 408B. The CI "cloud_service_account" 408A may be hosted on the CI "cloud_os_datacenter" 408B.

Figure 4E:
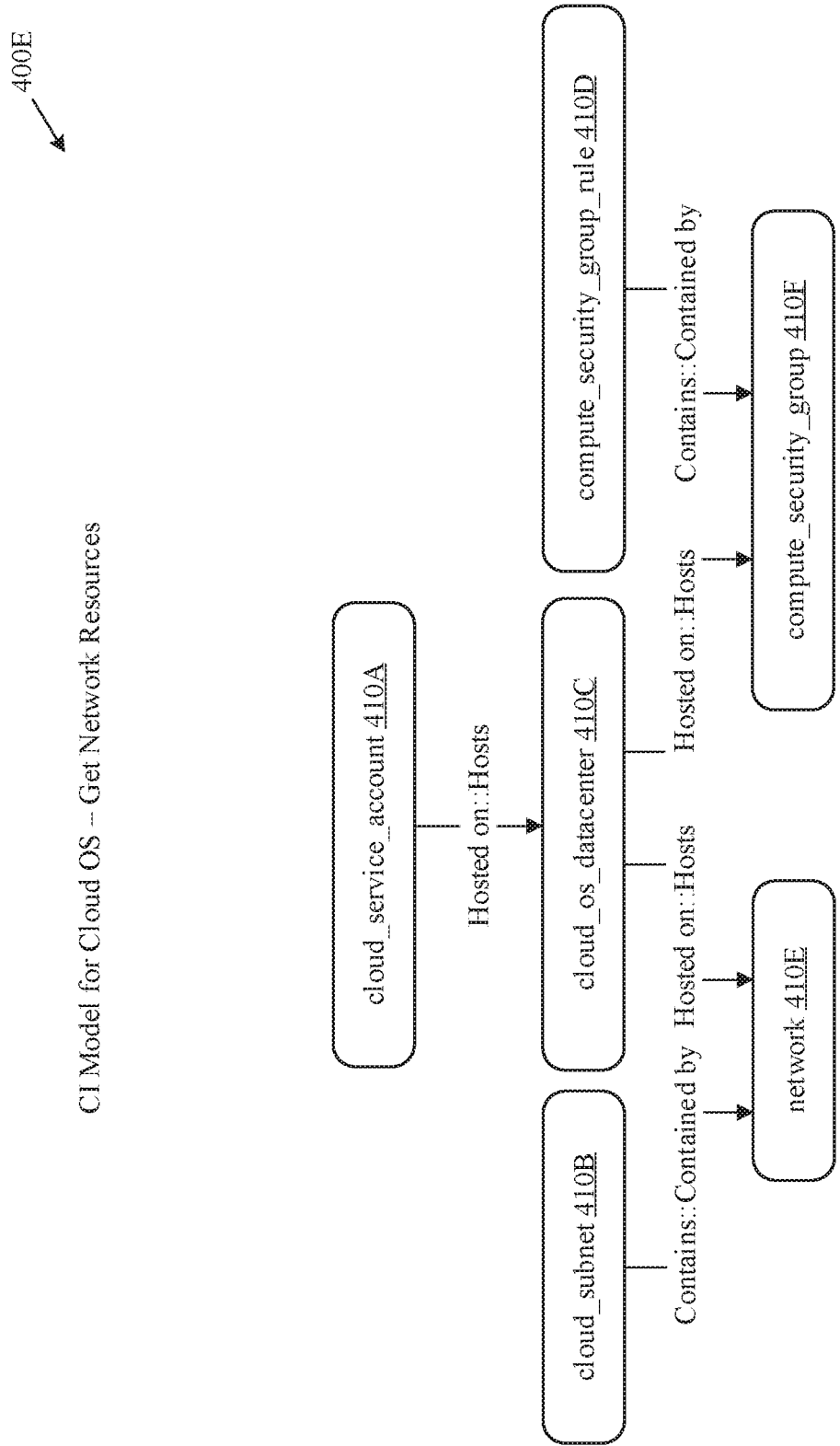

With reference to FIG. 4E, there is shown a CI model 400E associated with a discovery pattern for networking resources (such as Cloud OS—Get Network Resources), which may be executed by the discovery application 112 to discover resources associated with the cloud operating system 118. In FIG. 4E, there is shown a CI "cloud_service_account" 410A, a CI "cloud_subnet" 410B, a CI "cloud_os_datacenter" 410C, a CI "compute_security_group_rule" 410D, a CI "network" 410E, and a CI "compute_security_group" 410F. The CI "cloud_service_account" 410A may be hosted on the CI "cloud_os_datacenter" 410C, which may be hosted on each of the CIs "network" 410E and "compute_security_group" 410F. The CI "cloud_subnet" 410B may contain the CI "network" 410E, and the CI "compute_security_group_rule" 410D may contain the CI "compute_security_group" 410F.

Figure 4F:
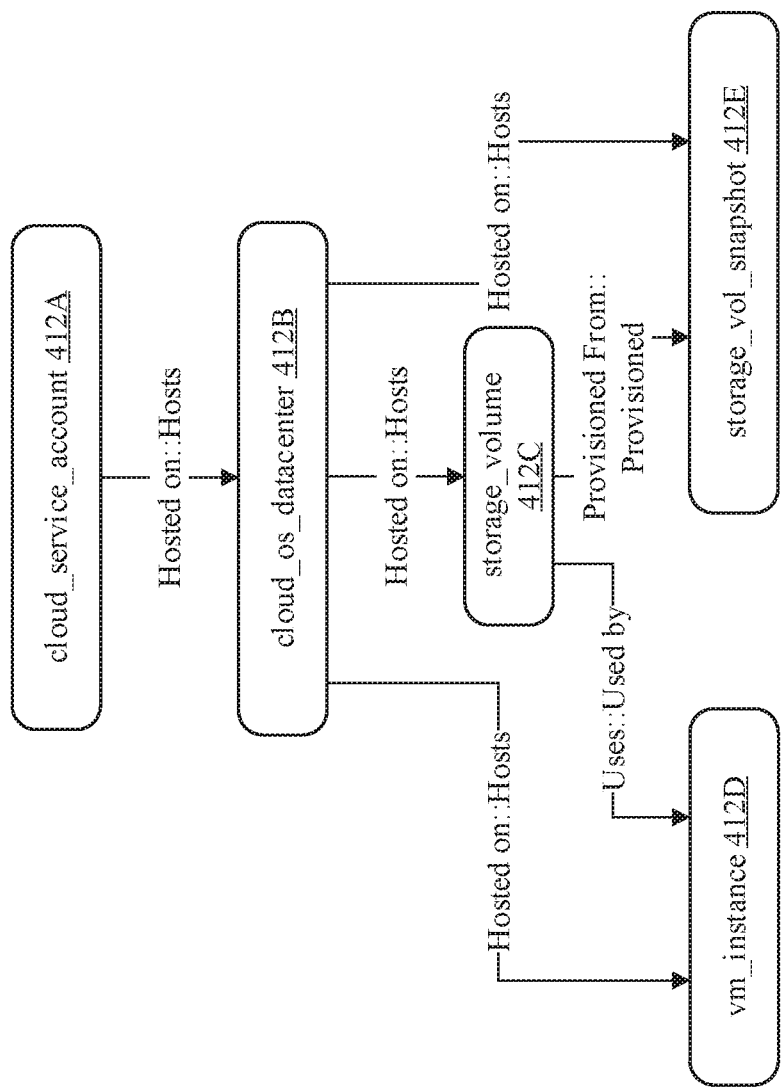

With reference to FIG. 4F, there is shown a CI model 400F associated with a discovery pattern for block storage resources (such as Cloud OS—Get Storage Resources), which may be executed by the discovery application 112 to discover resources associated with the cloud operating system 118. In FIG. 4F, there is shown a CI "cloud_service_ account" 412A, a CI "cloud_os_datacenter" 412B, a CI "storage_volume" 412C, a CI "vm_instance" 412D, and a CI "storage_vol_snapshot" 412E. The CI "cloud_service_ account" 412A may be hosted on the CI "cloud_os_data- center" 412B. The CI "cloud_os_datacenter" 412B may be hosted on each of the CIs "storage_volume" 412C, "vm_in- stance" 412D, and "storage_vol_snapshot" 412E. Further, the CI "storage_volume" 412C may use the CI "vm_in- stance" 412D and may be provisioned from the CI "stora- ge_vol_snapshot" 412E.

The class models 400A, 400B, 400C, 400D, 400E, and 400F in FIGS. 4A, 4B, 4C, 4D, 4E, and 4F, respectively, are exemplary class models for the OpenStack cloud operating system. The class models 400A-400F are merely shown as examples and should not be construed as limiting for the disclosure.

Figure 5:
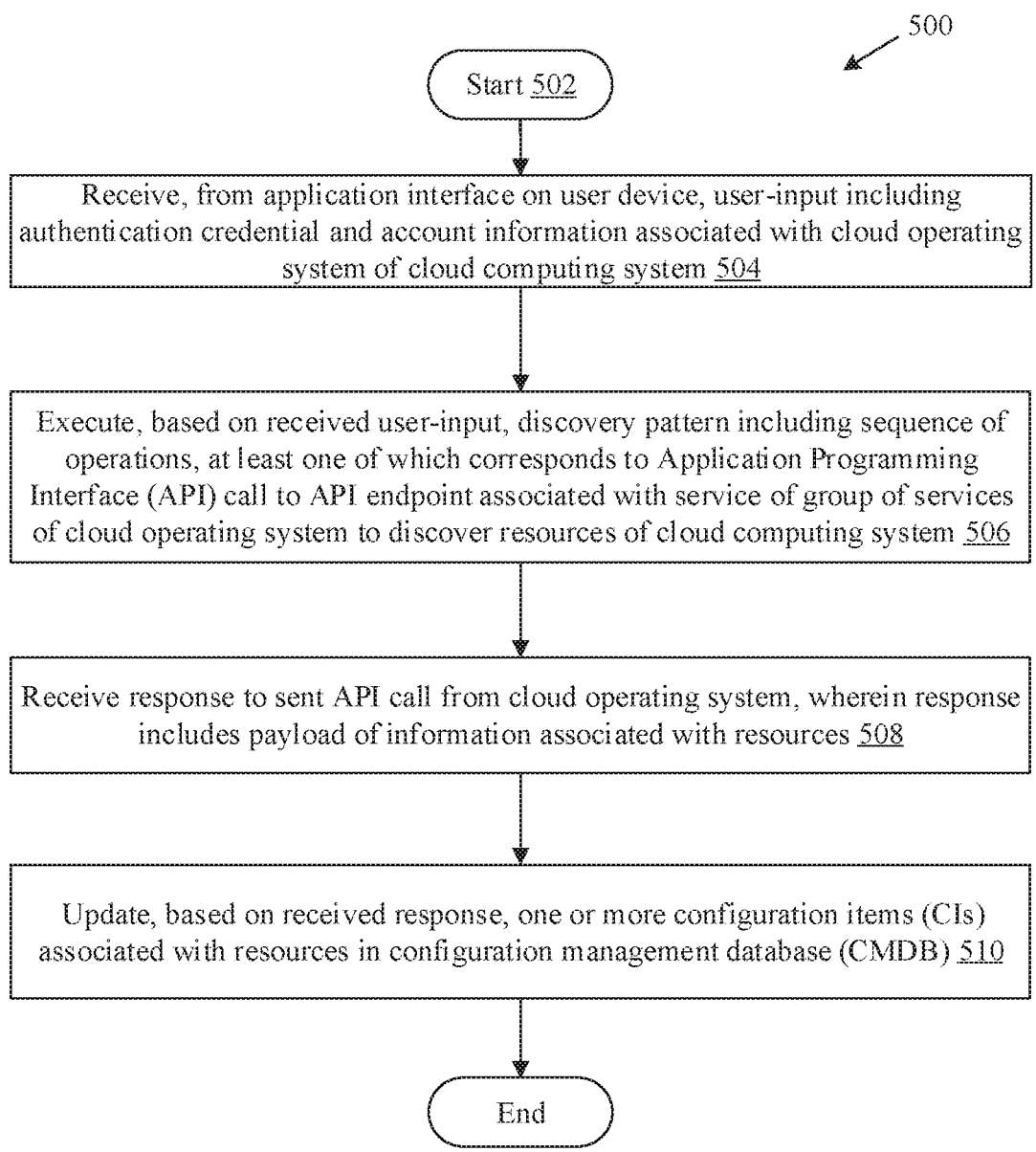
FIG. 5 is a flow chart that illustrates a method of discovery of resources associated with a cloud operating system, in accordance with example embodiments.

FIG. 5 is a flow chart that illustrates a method of discovery of resources associated with a cloud operating system, in accordance with example embodiments. FIG. 5 is explained in conjunction with elements from FIGS. 1, 2, 3, 4A, 4B, 4C, 4D, 4E, and 4F. With reference to FIG. 5, there is shown a flowchart 500. The exemplary method of flowchart 500 may be executed by any computing system, for example, the computing system 102 of FIG. 1 or FIG. 2. The exemplary method of the flowchart 500 may start at 502 and proceed to 504.

At 504, a user input may be received from the application interface 104A on the user device 104. In an embodiment, the discovery application 112 on the computing system 102 may be configured to receive the user input. The user input may be associated with a discovery of resources associated with the cloud operating system 118. The user input may include an authentication credential and account information associated with the cloud operating system 118 of the cloud computing system 106. The reception of the user input is explained further, for example, in FIG. 1.

At 506, a discovery pattern, including a sequence of operations for the discovery of resources may be executed based on the received user input. In an embodiment, the discovery application 112 may be configured to execute the discovery pattern through the discovery server 114. At least one of the sequence of operations may correspond to an API call to an endpoint associated with a service (of the group of services 120) of the cloud operating system 118. The execu- tion of the discovery pattern is explained further, for example, in FIG. 1.

At 508, a response to the sent API call may be received from the cloud operating system 118. In an embodiment, the discovery application 112 may be configured to receive the response to the sent API call. The response may include a payload of information associated with the discovered resources. In an embodiment, the discovery application 112 may be configured to parse the received response to deter- mine the information associated with the resources of the cloud operating system 118. The reception and parsing of the response are explained further, for example, in FIG. 1.

At 510, one or more CIs associated with the resources may be updated on the CMDB 116 based on the received response. In an embodiment, based on the received (or parsed) response, the discovery application 112 may be configured to update the one or more CIs associated with the discovered resources on the CMDB 116. Each configuration item may correspond to a logical representation of a resource associated with the cloud operating system 118. Each configuration item may represent a presence, a status, attributes of a respective resource and relationships with other resources. As an example, the discovery application 112 may store the extracted information (from the parsed response) in CI tables on the CMDB 116. Examples of the CI tables are explained, for example, in FIG. 1. Control may pass to end.

Although the flowchart 500 is illustrated as discrete operations, such as 504, 506, 508, and 510, the disclosure is not so limited. Accordingly, in certain embodiments, such discrete operations may be further divided into additional operations, combined into fewer operations, or eliminated, depending on the particular implementation without detract- ing from the essence of the disclosed embodiments.

Various embodiments of the disclosure may provide a non-transitory computer-readable medium and/or storage medium having stored thereon, computer-executable instructions executable by a machine and/or a computer to operate a computing system (e.g., the computing system 102). The computer-executable instructions may cause the machine and/or computer to perform operations that may include receiving, from an application interface (such as, the application interface 104A) on a user device (such as, the user device 104), a user input including an authentication credential and account information associated with a cloud operating system (such as, the cloud operating system 118) of a cloud computing system (e.g., the cloud computing system 106). The operations may further include executing, based on the received user input, a discovery pattern com- prising a sequence of operations for a discovery of resources associated with the cloud operating system 118. The cloud operating system 118 may include a group of services (such as, the group of services 120) to access the resources. At least one of the sequence of operations may correspond to an Application Programming Interface (API) call to an API endpoint associated with a service of the group of services 120. The operations may further include receiving a response to the sent API call from the cloud operating system 118. The response may include a payload of infor- mation associated with the resources. The operations may further include updating, based on the received response, one or more configuration items (CIs) associated with the resources in a configuration management database (CMDB) (such as, the CMDB 116).

Exemplary aspects of the disclosure may include a system (such as, the computing system 102). The computing system 102 may be configured to receive a user input including an authentication credential and account information associated with a cloud operating system (such as, the cloud operating system 118) of a cloud computing system (e.g., the cloud computing system 106). The user input be received from an application interface (such as, the application interface 104A) on a user device (such as, the user device 104). The computing system 102 may be further configured to execute, based on the received user input, a discovery pattern com- prising a sequence of operations for a discovery of resources associated with the cloud operating system 118. The cloud operating system 118 may include a group of services (such as, the group of services 120) to access the resources. At least one of the sequence of operations may correspond to an Application Programming Interface (API) call to an API endpoint associated with a service of the group of services 120. The computing system 102 may be further configured to receive a response to the sent API call from the cloud operating system 118. The response may include a payload of information associated with the resources. The computing system 102 may be further configured to update, based on the received response, one or more configuration items (CIs) associated with the resources in a configuration management database (CMDB) (such as, the CMDB 116).

In an embodiment, the computing system 102 may be further configured to generate a class model (such as, the class model 300) associated with the resources based on the updated one or more CIs. The class model may include at least one of: a first class (such as, the "Cloud OS Domain" class 302) associated with a domain associated with the cloud operating system 118, a second class (such as, the "Cloud OS Service" class 304) associated a service associated with the cloud operating system 118, or a third class (such as, the "Cloud OS Endpoint" class 306) associated with an endpoint associated with the cloud operating system 118.

In an embodiment, the resources may include at least one of: a computing resource, a networking resource, and a storage resource. In an embodiment, the group of services 120 may include at least one of: an identity service (such as, the identity service 120A), a compute service (such as, the compute service 120B), an image service (such as, the image service 120C), a block storage service (such as, the block storage service 120D), a networking service (such as, the networking service 120E), a load balancer service (such as, the load balancer service 120F), or a dashboard service (such as, the dashboard service 120G). In an embodiment, the user input may further include a web address (e.g., a URL) of an endpoint associated with the identity service 120A of the cloud operating system 118.

In an embodiment, the computing system 102 may be further configured to parse the received response to determine the information associated with the resources. The one or more CIs associated with the resources may be updated based on the parsing of the received response.

Detailed description for a remote virtualization system (RVS) discovery is provided herein. The remote virtualization system may host a set of resources that may be configured to perform predefined tasks associated with the remote virtualization system. The remote virtualization system may also include a manager instance associated with the remote virtualization system that may be used to manage, administer, and/or facilitate a discovery of the set of resources associated with the remote virtualization system. The manager instance may expose an Application Programming Interface (API) with a predefined Uniform Resource Locator (URL) to allow the discovery of the set of resources associated with the remote virtualization system. Examples of the set of resources associated with the remote virtualization system may include, but are not limited to, a logical data center, a virtualization cluster, a host, a virtual machine (VM), a VM pool, a logical network interface card (NIC), a physical NIC, and a VM template.

The following described implementations may be found in the disclosed system and method for implementing a discovery of the set of resources associated with the remote virtualization system, by use of a discovery application and a discovery server. The discovery application may be configured to receive a user input associated with the discovery of the set of resources associated with the remote virtualization system. The user input may include an API URL of the manager instance of the remote virtualization system. Also, in some instances, the user input may include authentication credentials associated with the remote virtualization system and configuration of a cloud service account on the discovery server. The cloud service account may securely store such credentials and may later on provide such credentials for running a discovery pattern on the discovery server. The discovery server may be further configured to set a discovery schedule for the discovery based on the received user input and execute, based on the set discovery schedule, a discovery pattern comprising a sequence of operations for the discovery of the set of resources of the remote virtualization system. By executing the discovery pattern, the discovery server may be querying the manager instance through a set of API calls to the API URL of the manager instance. The discovery server may be further configured to receive a response to the set of API calls from the manager instance. The response may include payload information associated with the set of resources. The discovery server may be configured to update, based on the received response, one or more configuration items (CIs) associated with the set of resources in a configuration management database (CMDB).

The discovery of the resources of the remote virtualization system may provide statistics related to the resources being used behind the scene to run the various virtualized application or software of an organization. The statistics may be used to deploy additional virtualized application components or remove unneeded virtualized application components. The discovery of resources may also provide diagnostic information associated with the resources. The diagnostic information may be used to identify faulty virtualized application components and replace (or remove) the identified faulty virtualized application components from the remote virtualization system.

Figure 6:
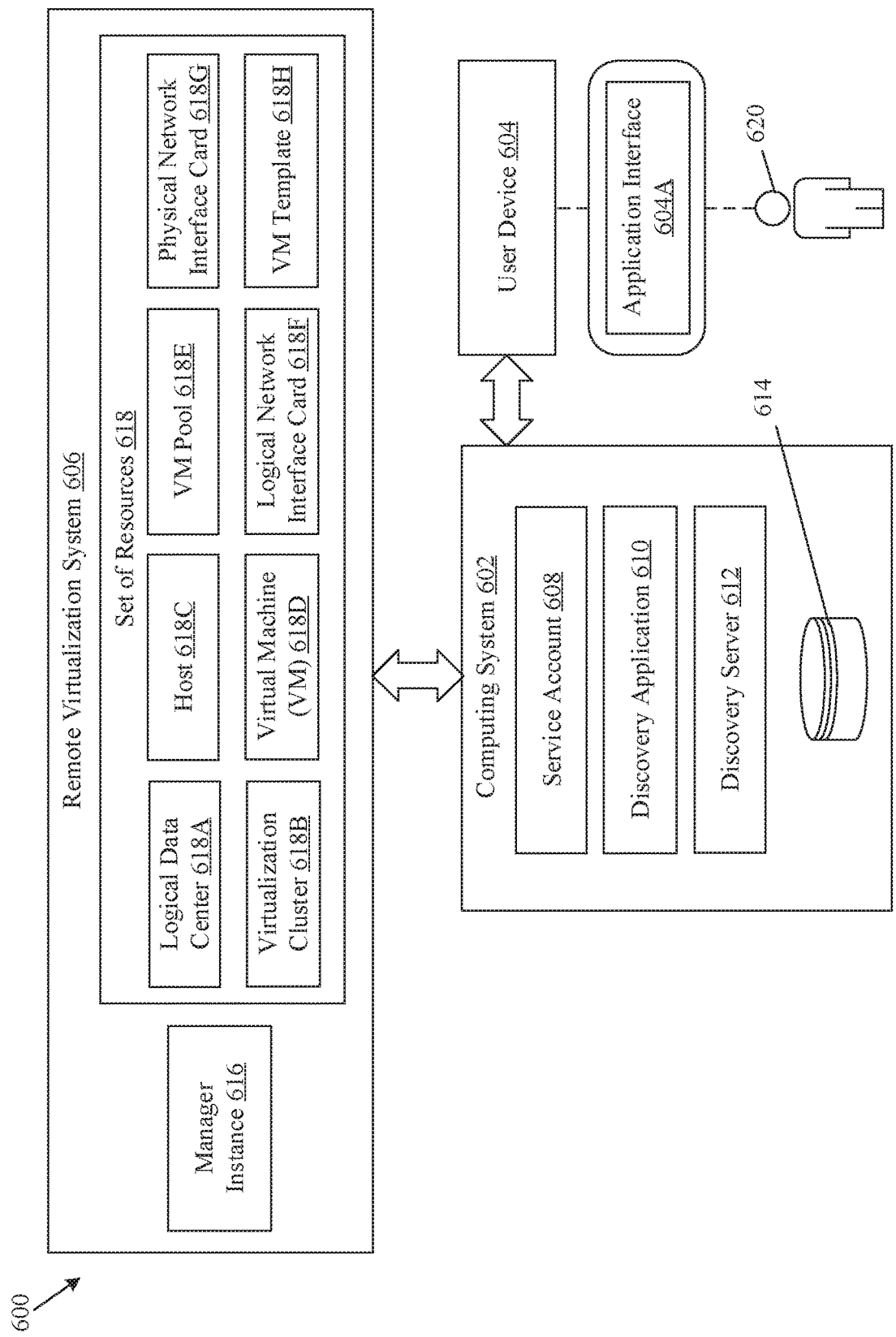
FIG. 6 illustrates an exemplary network environment for discovery of a set of resources of a remote virtualization system, in accordance with example embodiments.

FIG. 6 illustrates an exemplary network environment for discovery of a set of resources of a remote virtualization system, in accordance with example embodiments. With reference to FIG. 6, there is shown a computing system 602, a user device 604, and a remote virtualization system 606. The computing system 602 may be communicatively coupled to the user device 604 and the remote virtualization system 606, via one or more communication networks. The computing system 602 may include a service account 608, a discovery application 610, a discovery server 612, and a configuration management database (CMDB) 614 which may be managed by the discovery application 610, through the discovery server 612. The user device 604 may include an application interface 604A that may be accessible to a user 620. The remote virtualization system 606 may include a manager instance 616 and a set of resources 618. Examples of the set of resources 618 may include, but are not limited to, a logical data center 618A, a virtualization cluster 618B, a host 618C, a virtual machine (VM) 618D, a VM pool 618E, a logical network interface card 618F, a physical network interface card 618G, or a VM template 618H.

The computing system 602 may include suitable code, logic, circuitry and/or interfaces that may be configured to discover the set of resources 618 of the remote virtualization system 606 and maintain the CMDB 614. The computing system 602 may host the discovery application 610 and the discovery server 612. Further, the computing system 602 may maintain the service account 608. For example, based on credentials for the remote virtualization system 606 in the service account 608, the computing system 602 may execute one or more discovery patterns to collect information associated with the set of resources 618 of the remote virtualization system 606. The one or more discovery patterns may be executed by the discovery application 610 on the computing system 602, through the discovery server 612. A discovery pattern may be referred to as a sequence of operations, which may allow the discovery application 610 (and the discovery server 612) to determine configuration items (CIs) to be updated based on collected information of the remote virtualization system 606, credentials to use for accessing the remote virtualization system 606, and tables to populate in the CMDB 614. The computing system 602 may be configured to store the collected information related to the set of resources 618 in the CMDB 614. Example implementations of the computing system 602 may include, but are not limited to, an application server, a database server, a mainframe server, a cloud server (e.g., a hybrid, a private, or a public cloud), or a web server.

The service account 608 may include code, logic, circuitry, and/or interfaces that may be configured to store information of an account (e.g., a user account on the remote virtualization system 606), including credentials necessary to access the account. A user (e.g., the user 620) may be required to create the service account 608 for the remote virtualization system 606 before execution of a discovery pattern on the remote virtualization system 606.

The discovery application 610 may include code, logic, circuitry, and/or interfaces that may be configured to make use of the discovery server 612 (also referred to as Management, Instrumentation, and Discovery (MID) Server) to discover and collect information associated with the set of resources 618 of the remote virtualization system 606. For example, the discovery application 610 may be configured to discover, through the discovery server 612, the set of resources 618 associated with the remote virtualization system 606. The set of resources 618 may be discovered by an execution of a discovery pattern that may include a sequence of operations. By executing the discovery pattern, the discovery application 610 may query the manager instance 616 of the remote virtualization system 606 through a set of Application Programming Interface (API) calls to an API Uniform Resources Locator (URL) of the manager instance 616.

The discovery application 610, through the discovery server 612, may perform a discovery of the set of resources 618 associated with the remote virtualization system 606 by collecting a response to the set of API calls from the manager instance 616. The discovery application 610 may update one or more configuration items (CIs) associated with the discovered resources in the CMDB 614. Herein, the CIs may correspond to physical devices, virtual devices, applications, services, or databases associated with the remote virtualization system 606. In an embodiment, each CI may correspond to a logical representation of a resource on the remote virtualization system 606, such that a presence, status, attributes of the resource and relationships with other resources may be represented by the CIs. The discovery application 610 may be implemented as an agentless application, so that it may avoid the management complexity of having a permanent software installed on any computer, or device to be discovered.

The discovery server 612 may include code, logic, circuitry, and/or interfaces that may be configured to facilitate communication and movement of data between the application interface 604A (i.e., an instance) and external applications, data sources, and services. Multiple discovery servers, capable of handling thousands of devices each, may be deployed in different network segments to provide virtually unlimited scalability. The discovery server 612 may be configured to execute the discovery pattern (i.e. a sequence of operations for discovery of the set of resources 618) for the discovery application 610 and return results back to an associated instance (e.g., the application interface 604A) for processing. In an embodiment, the discovery server 612 may be configured to store the results including information associated with the discovered resources in the one or more CIs on the CMDB 614. In some instances, the discovery server 612 may use secure communication protocols (like HTTP-secure) to ensure all communications may be secure and initiated inside an enterprise's firewall. The discovery server 612 may be implemented as an application (such as a Java application), which may run as a service or daemon on a server or a cluster node of the computing system 602.

The CMDB 614 may include code, logic, circuitry, and/or interfaces that may be configured to store information about the set of resources 618 associated with the remote virtualization system 606. The CMDB 614 may be a database in which the information for each resource may be stored in a configuration item (CI) specific to that resource. The discovery application 610, through the discovery server 612, may collect the information associated with the set of resources 618 and may update the respective CIs in the CMDB 116. Example implementations of the CMDB 614 may include, but are not limited to, a database server, a file server, a mainframe server, a cloud server, a storage device (e.g., a Redundant Array of Independent Disks (RAID) device), or any other computing device with data storage capability.

The CMDB 614, and data and instructions associated with the discovery application 610 may be stored in the persistent data storage of the computing system 602. For example, the persistent data storage may be installed on the same node or cluster on which the discovery server 612 may be hosted. The persistent data storage may include computer-readable storage media for carrying or having computer-executable instructions or data structures stored thereon. Such computer-readable storage media may include any available media that may be accessed by a general-purpose or special-purpose computer, such as a processor.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor to perform a certain operation or a group of operations associated with the discovery server 612.

The user device 604 may host the application interface 604A that may be configured to receive a user input (such as from a discover admin). The user device 604 may be configured to receive, from the user 620, the user input associated with the discovery of resources. After the discovery is performed, the user device 604 may be further configured to display a result of the discovery of the set of resources 618 on a display device of the user device 604, through the application interface 604A. Examples of the user device 604 may include, but are not limited to, a workstation, a server, a cluster of servers with a management panel, a laptop, a tablet, an internet-enabled device, a desktop computer, or any portable or non-portable device with a networking and display capability.

The application interface 604A (also referred to as an Instance) may be implemented as an client-side application for a specific group of users who may access the application interface 604A through a web client (such as a web browser) and a URL which may be customizable for the group of users. The application interface 604A may host several applications and services, one or more of which may be associated with resource discovery. The application interface 604A may support role-based access to different applications or services on the application interface 604A. For example, one of the group of users may be a discovery admin who may be allowed to configure a discovery schedule for a discovery of the set of resources 618 associated with the remote virtualization system 606.

The remote virtualization system 606 may be associated with the set of resources 618 that may be configured to perform predefined tasks associated with the remote virtualization system 606. The remote virtualization system 606 may also include the manager instance 616 associated with the remote virtualization system 606 that may be used to manage, administer, and/or discover the set of resources 618 associated with the remote virtualization system 606. In an embodiment, the manager instance 616 may expose an API Uniform Resource Locator (URL) to allow the discovery of the set of resources 618 associated with the remote virtualization system 606. Examples of the set of resources 618 associated with the remote virtualization system 606 may include, but are not limited to, the logical data center 618A, the virtualization cluster 618B, the host 618C, the virtual machine (VM) 618D, the VM pool 618E, the logical network interface card (NIC) 618F, a physical NIC 618G, and the VM template 618H. An example implementation of the remote virtualization system 606 may be a RED HAT VIRTUALIZATION® (RHV) system.

The one or more communication networks may represent a portion of the global Internet. However, the one or more communication networks may alternatively represent different types of network, such as a private wide-area or a local-area packet-switched network. The one or more communication networks may include a communication medium through which the computing system 602, the user device 604, and the remote virtualization system 606 may communicate with each other. The one or more communication networks may be one of a wired connection or a wireless connection. Examples of the one or more communication networks may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 600 may be configured to connect to the one or more communication networks in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT)® communication protocols.

In operation, the discovery application 610 may receive a user input via the application interface 604A on the user device 604. The user input may be associated with a discovery of the set of resources 618 of the remote virtualization system 606. As an example, the user input may include credential information of an account (i.e. a user account) on the remote virtualization system 606. Examples of values in the credential information may be as illustrated in table 19:

TABLE 19

Example credentials of an account on the remote virtualization system 606

| Credential Attributes | Exemplary values |
| --- | --- |
| Name of the credential | Remote_Virt_System |
| User-name | my_user |
| Password | password_123 |
| Active (Yes/No?) | Yes |
| Bearer Token (Yes/No?) | Yes |

With reference to Table 19, the credential information in the user input may include values of various credential attributes, such as a credential name (e.g., "Remote_Virt_System"), a user-name (e.g., "my_user") associated with the account, and a password (e.g., "password_123") for the account. The user input may further include a credential attribute "Active" to enable the discovery when set as "Yes" or marked as "True", and a credential "Bearer Token" to enable bearer token-based authentication for the discovery when set as "Yes" or marked as "True". The bearer token may be obtained from the remote virtualization system 606.

In an embodiment, the user input may further include service account information for creation and configuration of the service account 608 (i.e. a cloud service account) on the computing system 602. Based on the service account information in the user input, the computing system 602 may create a new service account (e.g., the service account 608, shown in FIG. 5) and configure the created service account 608 to include attributes, such as the credentials (as represented by Remote Virt System) of Table 19 and a web address (e.g., URL) of the API associated with the manager instance 616 of the remote virtualization system 606. An example of values that may be included in the service account information is presented in Table 20:

TABLE 20

Exemplary values of the service account 608 attributes for discovery of the remote virtualization system 606

| Service account Attributes | Exemplary values |
| --- | --- |
| Name of the service account 608 | Remote_Virt_System_Stage |
| Account identifier (ID) | https://my-manager-instance.com:443 |
| Discovery credentials | Remote_Virt_System |
| Datacenter type | Remote_Virt_System LDC (virt_ldc) |
| Datacenter discovery status | 2019-11-11 04:57:54: Completed. Reload this form to see an updated datacenter list |

With reference to Table 20, the service account information may include various attributes of the service account 608, such as a name of the service account 608 (e.g., "Remote_Virt_System_Stage"), an account ID that may be the web address (e.g., a URL, such as, "https://my-manager-instance.com") of the API of the manager instance 616 along with a communication port (e.g., a port 443). In addition, the attribute of the service account 608 may include discovery credentials (e.g., "Remote_Virt_System"), which may be provided in the user input (as shown in Table 19). The attributes of the service account 608 may also include a datacenter type and a datacenter discovery status. The datacenter type may indicate a table (in the CMDB 614) which may represent the type of datacenter to be discovered through the discovery process. As an example, the datacenter type may be "Remote_Virt_System LDC" and the associated CMDB 614 table may be a "virt_ldc" table. The datacenter discovery status may include date-time information (e.g., 2019-11-11 04:57:54) of a past discovery of the datacenter.

In one or more embodiments, the user input may also include a selection of an option, via the user device 604, to create a discovery schedule for discovery of the set of resources 618 associated with the remote virtualization system 606. For example, such an option may be presented after the service account 608 is created.

Through the discovery server 612, the discovery application 610 may be configured to set a discovery schedule for the discovery of resources associated with the remote virtualization system 606. The discovery schedule may be set based on the received user input. Information associated with discovery schedule may specify one or more resources or resource types to be searched (i.e. CIs to be updated in the CMDB 614) and a time schedule during which the discovery may be executed. In some cases, the discovery schedule may also select one discovery server or multiple discovery servers for the discovery. Based on the user input, the discovery may be scheduled to execute on a regular basis, a recurring basis, or on an on-demand basis.

In an embodiment, the discovery application 610, through the discovery server 612, may be further configured to execute a discovery pattern based on the set discovery schedule. The discovery pattern may include a sequence of operations for the discovery of the set of resources 618 associated with the remote virtualization system 606. By executing the discovery pattern, the discovery application 610 may be querying the manager instance 616 of the remote virtualization system 606 through a set of API calls to the web address of the API or the API URL of the manager instance 616. The discovery application 610, through the discovery server 612, may receive a response to the set of API calls from the manager instance 616. The response may include a payload of information associated with the set of resources 618.

In an embodiment, the set of API calls to the API URL may include a REST API-based HTTP Get request (REST "Representational State Transfer"). As an example, the sequence of operations may include a custom operation, which when executed on the discovery server 612, may generate a "HTTP Get Call" that may send REST queries to the manager instance 616 for the discovery of the set of resources 618 associated with the remote virtualization system 606. The manager instance 616 may respond to the received REST queries by sending an HTTP response to the discovery server 612. The HTTP response may be added to a context. As an example, the response may be stored in a Java Array List Variable or as a Java Script Object Notation (JSON) object.

Such REST queries may include reference to REST APIs for discovery of different types of resources. Examples of such REST APIs may include, but are not limited to, "/ovirt-engine/apir, /ovirt-engine/api/datacenters", "/ovirt-engine/api/clusters", "/ovirt-engine/api/hosts", "/ovirt-engine/api/vms", and "/ovirt-engine/sso/oauth/token" (which may be accessed if OAuth access token is used).

Prior to the execution of the custom operation (such as "HTTP Get Call") based on the set discovery schedule, the custom operation may be created based on a user input. For example, the discovery application 610 may receive a user input. Based on the user input, the custom operation may be created by customizing one or more of the sequence of operations for the discovery of resources associated with the remote virtualization system 606. An example of the user input is presented in Table 21:

TABLE 21

Example of the user input to generate a custom operation

| Customization Attributes | Exemplary values |
|---|---|
| Base URL | $service account[1].account_id |
| Sub-resources | "data_center" |
| Variable Name | "rest_resp" |
| Resource | "/ovirt-engine/api/clusters" |
| Filter Criteria | "" |
| Parsing Strategy | None |

With reference to Table 21, the user input may include customization attributes, such as a base URL to which API calls may be sent by the discovery application 610 (through the discovery server 612). As an example, the base URL may be a URL associated with the service account 608 (i.e., the account ID associated with the service account 608). From Table 20, it can be determined that the base URL is the API URL of the manager instance 616. As an example, the base URL may be determined from the service account information as "$service_account[1].account_id" (i.e., the base URL may be the account ID of the service account 608).

The customization attributes may further include sub-resources (e.g., a data center) to run commands on. The customization attributes may further include a variable name, which may be a name of a variable in which the response from the manager instance 616 may be stored. Further, the customization attributes may include a resource that the custom operation may query upon. Herein, the value of the resource attribute may indicate the API that may be called to query a corresponding resource of the remote virtualization system 606. As an example, the resource attribute may have a value "/ovirt-engine/api/clusters" for a discovery of cluster resources associated with the remote virtualization system 606.

The customization attributes may further include a filter criterion that may be used to filter search results of the REST queries at the manager instance 616 end. For instance, the search results of the discovery may be filtered based on a datacenter name at the manager instance 616. As an example, if the filter criterion is "datacenter=MyDcName", resources of the "MyDcName" datacenter may be discovered. Filtering of the search results at the manager instance 616 may create overheads (such as computing and/or memory related overheads) on the remote virtualization system 606. Therefore, in some cases, the filter criterion may be left as blank (as shown in Table 21).

The customization attributes may also include a parsing strategy based on which the discovery pattern may be used to parse a response received from the manager instance 616. By parsing, the information associated with the discovered resources may be extracted from the response. As an example, if the parsing strategy is set to "JSON", the response may be parsed as a JSON file with key-value pairs. As another example, if the parsing strategy is set to "None", a default parsing strategy may be used to extract the information associated with the discovered resources from the response.

The sequence of operations may include a first set of operations to scan for the configuration items associated with the remote virtualization system 606. In an example, the first set of operations may include probe and/or sensor-based instructions to determine open Internet Protocol (IP) address(es) and port(s) (e.g., Transmission Control Protocol (TCP) or User Datagram Protocol (UDP) ports) associated with the remote virtualization system 606 to detect online devices and applications associated with the remote virtualization system 606. As a result of the execution of the first set of operations, the discovery application 610 may detect devices and applications associated with the remote virtualization system 606 and create configuration items corresponding to such devices and applications. The sequence of operations may further include a second set of operations that may follow the first set of operations. The second set of operations may include classification of the detected devices and applications based on a determination of an Operating System (OS) version of the detected devices. For example, the second set of operations may include instructions to initiate a Secure Shell (SSH) connection with the detected device and retrieve the OS version from a predetermined file location on the device. The sequence of operations may further include a third set of operations that may follow the second set of operations. The third set of operations may include instructions to identify information related to the classified detected devices. Examples of such identified information may include, but is not limited to, basic input/output system (BIOS) information, serial numbers, network interface information, media access control address(es) assigned to the network interface(s), and IP address(es) associated with the device. The sequence of operations may further include a fourth set of operations that may follow the third set of operations. The fourth set of operations may include instructions to explore an operational state of the classified detected device. The operational state may include, but is not limited to, processor information, memory information, and information related to execution of processes or applications on the detected device.

The first set of operations may be referred to as operations of a scanning phase and the second set of operations may be referred to as operations of a classification phase of the discovery. The third set of operations may be referred to as operations of an identification phase and the fourth set of operations may be referred to as operations of an exploration phase of the discovery. The scenario where the discovery includes only the identification phase and the exploration phase may be referred to as a serverless discovery in which the set of resources 618 (i.e., devices) may be pre-determined and the discovery application 610 may directly discover applications hosted on the devices, while the discovery of the devices themselves through a scanning phase and a classification phase may be skipped. In an embodiment, the discovery of the set of resources 618 of the remote virtualization system 606 (e.g., RED HAT VIRTUALIZATION® system) may be based on the serverless discovery process.

In an embodiment, based on the execution of the discovery pattern (includes the custom operation, such as "HTTP GET CALL"), the discovery application 610 may receive, through the discovery server 612, the response to the set of API calls from the manager instance 616 of the remote virtualization system 606. The response may include a payload of information associated with the set of resources 618 of the remote virtualization system 606. In an embodiment, the response from the manager instance 616 may include the payload of the information associated with the set of resources 618 in a "context" field of the HTTP response. In an example, the payload of information associated with the response may be stored as a JSON key-value pair.

Based on the received response, the discovery application 610 may be further configured to update one or more CIs associated with the discovered resources in the CMDB 614. For example, information associated with a "data center" resource may be stored in a CI table "virt_ldc". Information related to other resources may be stored in other CI tables, as described further, for example, in FIG. 8. With reference to Table 20, The CI table "virt_ldc" may be associated with a logical data center (LDC) of the remote virtualization system 606.

The discovery application 610 may be further configured to generate a class model associated with the discovered resources of the remote virtualization system 606. The class model may be generated based on the updated one or more CIs. An example of the class model is explained further, for example, in FIG. 8.

The discovery application 610 may host an Integrated Development Environment (IDE) to run pre-scripts and post-scripts associated with the discovery pattern. For example, the pre-scripts and postscripts may be JavaScript-based scripts. In an embodiment, the discovery application 610, through the discovery server 612, may be configured to execute a postscript "Handle Stale Relations" after the first set of operations of the identification phase are executed. The post-script may use a payload from the IDE and may handle a deletion of relations that may no longer exist (such as, a relation between a VM and its host after the VM migrates to another host). As the post-script may run against the IDE payload, a "relations" table may only need to be queried as this may be relatively quick with a low resource usage. It should be noted that an unhandled case of the postscript "Handle Stale Relations" is a case in which a VM of the remote virtualization system 606 is shut down. Accordingly, such VM may be no longer assigned to a host. If deletion of stale relations is not desired, an 'active' checkbox may be deselected to prevent the post-script from running.

In an embodiment, the discovery application 610 on the discovery server 612 may be configured to execute a pre-script "Virtual Machine to OS Server Relations" prior to the classification phase but after the scanning phase of the discovery is executed. The pre-script may create relations between a VM and an Operating System (OS) server that may run on it. A prior IP-based discovery (e.g., in the scanning phase) may be performed for the pre-script to run. In an embodiment, the pre-script (OS-VM relations pre-script) supports two methods of identifying CIs, such as, identification of servers based on serial number (for vendors like IBM cloud, Nutanix, etc.), and identification of servers based on IP addresses and Fully Qualified Domain Names (FQDNs) combo.

Figure 7:
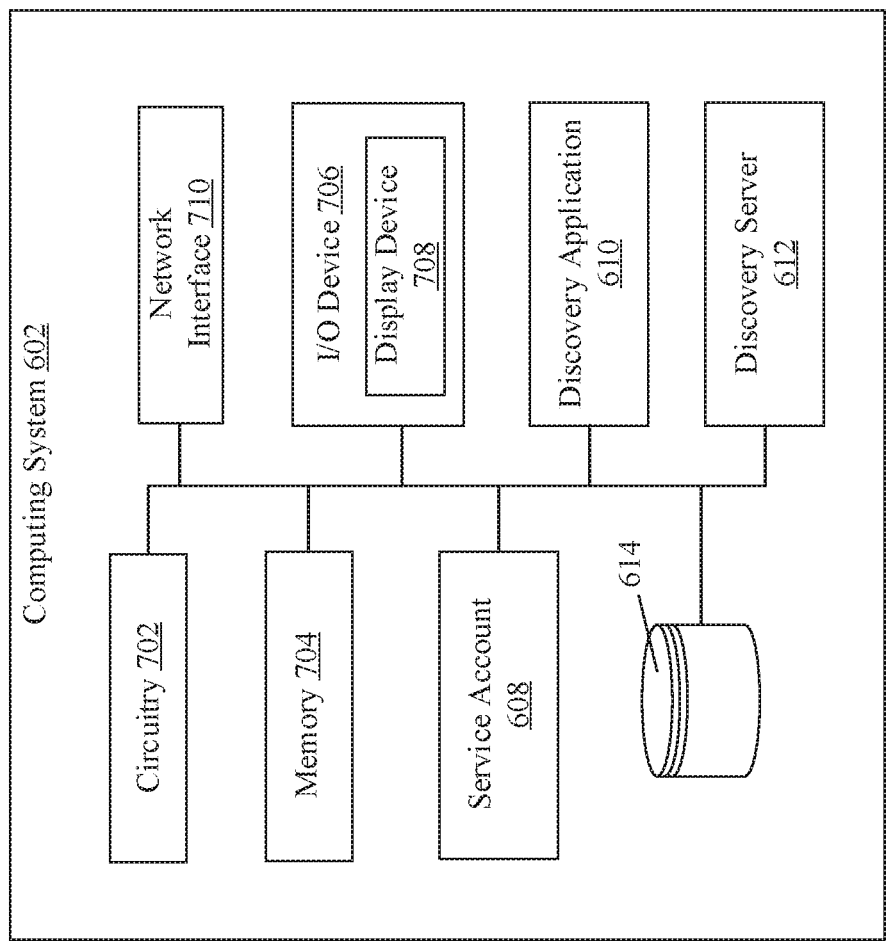
FIG. 7 is a block diagram of a system for implementing a discovery server for discovery of a set of resources of a remote virtualization system, in accordance with an embodiment of the disclosure.

FIG. 7 is a block diagram of a system for implementing a discovery server for discovery of a set of resources associated with a remote virtualization system, in accordance with an embodiment of the disclosure. FIG. 7 is explained in conjunction with elements from FIG. 6. With reference to FIG. 7, there is shown a block diagram 700 of the computing system 602. The computing system 602 may include the discovery server 612, the CMDB 614, the discovery application 610, and the service account 608. The discovery server 612 may communicate with the CMDB 614 and the discovery application 610. The discovery application 610 may be associated with the service account 608.

The computing system 602 may further include circuitry 702, a memory 704, an input/output (I/O) device 706, a display device 708, and a network interface 710. In some embodiments, the CMDB 614 may be separate from the discovery server 612 and may communicate with the discovery server 612, via the network interface 710. In some other embodiments, the memory 704 may include the CMDB 614.

The circuitry 702 may include suitable logic, circuitry, interfaces, and/or code that may be configured to execute instructions for operations to be executed by the computing system 602. Examples of implementation of the circuitry 702 may include a Central Processing Unit (CPU), x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), co-processors, other processors, and/or a combination thereof.

The memory 704 may include suitable logic, circuitry, code, and/or interfaces that may be configured to store the instructions executable by the circuitry 702. In some embodiments, the memory 704 may store the configuration items associated with the set of resources 618 of the remote virtualization system 606. In such case, the CMDB 614 may be implemented within the memory 704. Examples of implementation of the memory 704 may include, but are not limited to, Random Access Memory (RAM), Read Only Memory (ROM), Hard Disk Drive (HDD), Solid State Drive (SSD), and/or a Secure Digital (SD) card.

The I/O device 706 may include suitable logic, circuitry, and/or interfaces that may be configured to receive an input and provide an output based on the received input. The I/O device 706 may include various input and output devices, which may be configured to communicate with the circuitry 702. Examples of the I/O device 706 may include, but are not limited to, a touch screen, a keyboard, a mouse, a joystick, a display device (e.g., the display device 708), a microphone, or a speaker.

The display device 708 may include suitable logic, circuitry, and interfaces that may be configured to display output associated with the discovery server 612. The display device 708 may be a touch screen which may enable a user of the discovery server 612 to provide a user-input via the display device 708. The display device 708 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 708 may refer to a display screen of a head mounted device (HMD), a smart-glass device, a see-through display, a projection-based display, an electro-chromic display, or a transparent display.

The network interface 710 may include suitable logic, circuitry, interfaces, and/or code that may be configured to enable communication among the remote virtualization system 606 and different components, such as the discovery server 612, the CMDB 614, and the discovery application 610 of computing system 102, via one or more communication networks. The network interface 710 may implement known technologies to support wired or wireless communication with the one or more communication networks.

The network interface 710 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 710 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

Similar to the computing system 602, the user device 604 may also include one or more components including, but not limited to, circuitry, a memory, a I/O device, a display device, and a network interface with similar functions. The functions or operations executed by the discovery server 612 and the discovery application 610, as described in FIGS. 6, 8, 9, and 10, may be performed by the circuitry 702. Operations executed by the circuitry 702 are described in detail, for example, in FIGS. 6, 8, 9, and 10.

Figure 8:
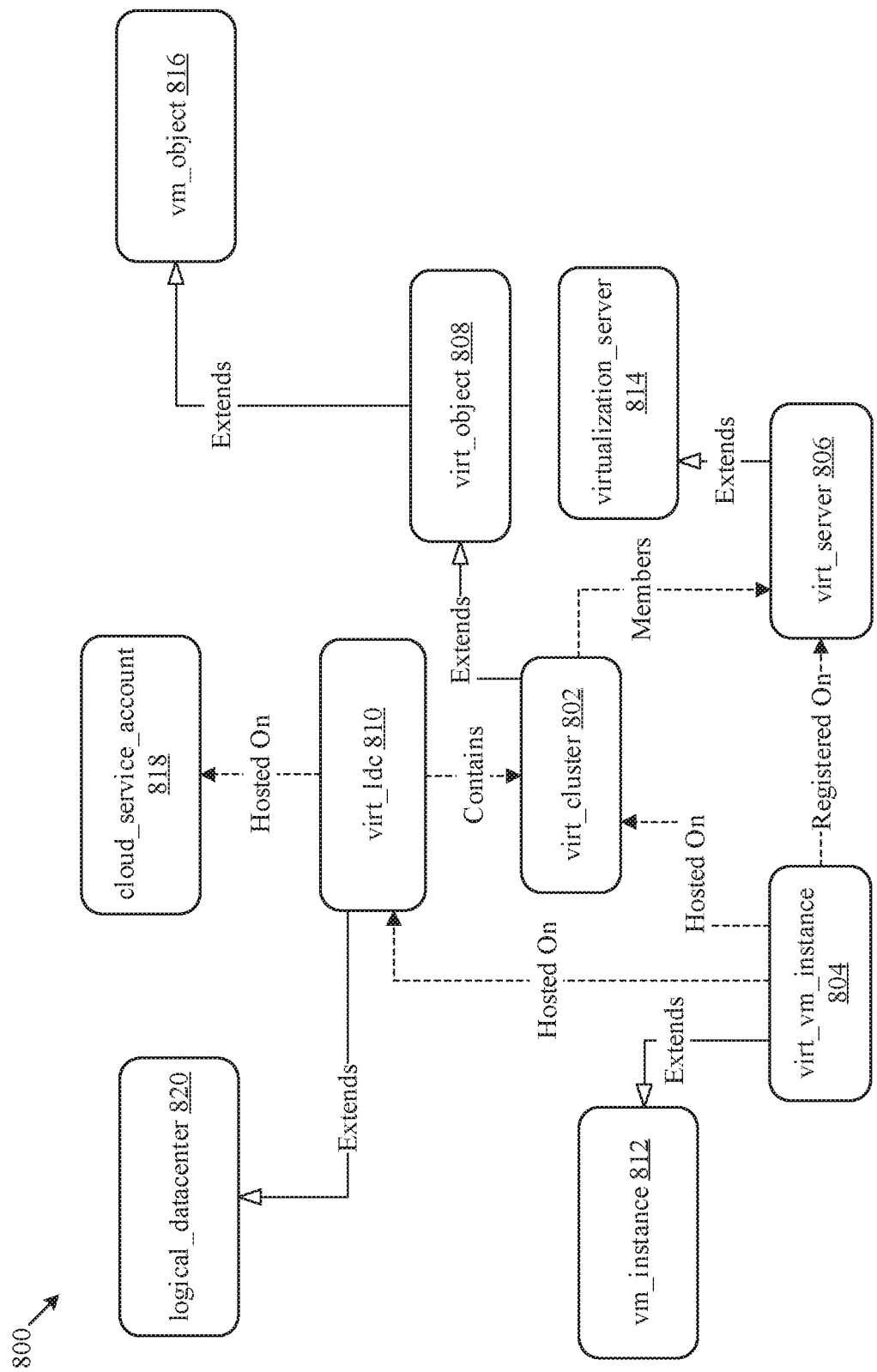
FIG. 8 illustrates a diagram that illustrates a class model associated with discovered resources of the remote virtualization system of FIG. 6, in accordance with example embodiments.

FIG. 8 illustrates a diagram that illustrates a class model associated with discovered resources of the remote virtualization system 606 of FIG. 6, in accordance with example embodiments. FIG. 8 is explained in conjunction with elements from FIG. 6 and FIG. 7. With reference to FIG. 8, there is shown a plurality of classes of a class model 800 associated with the set of resources 618 of the remote virtualization system 606 of FIG. 6. In FIG. 8, there is further shown relationships between the plurality of classes of the class model 800.

The class model 800 may include a first class 802 associated with a virtualization cluster, a second class 804 associated with a VM instance, a third class 806 associated with a virtualization server, a fourth class 808 associated with a virtualization object, and a fifth class 810 associated with a logical data center. The virtualization cluster, the VM instance, the virtualization server, the virtualization object, and the logical data center may be referred to as resources of the remote virtualization system 606. For example, as shown, the first class 802 may be a "virt_cluster" class, the second class 804 may be a "virt_vm_instance" class, the third class 806 may be a "virt_server" class, the fourth class 808 may be a "virt_object", and the fifth class 810 may be a "virt_ldc" class.

As shown, the first class 802 (i.e., "virt_cluster") may be a member of the third class 806 (i.e., "virt_server") and may extend the fourth class 808 (i.e., "virt_object"). The second class 804 (i.e., "virt_vm_instance") may be an independent class, the instance of which may be hosted on the first class 802 (i.e., "virt_cluster") and the fifth class 810 (i.e., "virt_ldc"). The second class 804 (i.e., "virt_vm_instance") may be registered on the third class 806 (i.e., "virt_server") and may further extend a base class "vm_instance" (denoted by 812). The third class 806 (i.e., "virt_server") may be an independent class that may extend a base class "virtualization server" (denoted by 814). The fourth class 808 (i.e., "virt_object") may extend a base class "vm object" (denoted by 816). The fifth class 810 (i.e., "virt_ldc") may contain the first class 802 (i.e., "virt_cluster") and may extend a base class "logical datacenter" (denoted by 818). Further, an instance of the fifth class 810 (i.e., "virt_ldc") may be hosted on a "cloud_service_account" class (denoted by 820), which may be an independent base class.

Each of the plurality of classes of the class model 800 may have an associated CI in the CMDB 614 to store data associated with objects of the class. For each CI, such data may include attributes of a respective resource and relations of the respective CI with other CIs in the CMDB 614.

As an example, information related to a datacenter of the remote virtualization system 606 may be stored in the CI "virt_ldc" (which may be associated with the fifth class 810). Exemplary attributes of the CI "virt_ldc" are presented in Table 22:

TABLE 22

Exemplary attributes of the "virt_ldc" CI table

| CI table attributes | Definition of attributes |
|---|---|
| Name | Name of the datacenter |
| Object ID | |
| Description | |
| Quota Mode | |
| URL | API URL of the datacenter |
| HREF ID | Hypertext Reference ID |

Examples of an attribute table and a relations table for the CI "virt_ldc" are presented in Tables 23 and 24, as follows.

TABLE 23

Attribute table for virt_ldc

| description | attribute | type |
|---|---|---|
| Quota Mode Policy | quota_mode | string |
| URL | url | API URL |
| HREF ID | href_id | |

TABLE 24

Relations table for virt_ldc

| Parent | Child | Relation Type |
|---|---|---|
| virt_ldc | virt_cluster | Contains::Contained by |

As another example, information related to a virtualization cluster of the remote virtualization system 606 may be stored in the CI "virt_cluster" (which may be associated with the first class 802). Exemplary attributes of the CI "virt_cluster" are presented in Table 25:

TABLE 25

Exemplary attributes of the CI "virt_cluster"

| CI attributes | Definition of attributes |
|---|---|
| Name | Name of the cluster |
| Object ID | |
| Description | |
| CPU Type | Example: x86_64 |
| CPU Architecture | Example Intel Broadwell IBRS SSBD MDS Family |
| KSM | Enabled/disabled |
| Fencing Policy | Enabled/disabled |
| Memory overcommitment | Allowed percentage of memory over-commitment |
| THP | Enabled/disabled |
| Ballooning | Enabled/disabled |
| Compatibility Version | |

TABLE 25-continued

Exemplary attributes of the CI "virt_cluster"

| CI attributes | Definition of attributes |
|---|---|
| URL | API URL of the cluster |
| HREF ID | |

For identification during the discovery, the "virt_cluster" class may be associated with a new identifier "Cluster identification—dependent—by 'object_id' attribute" and a new hosting rule as "virt_cluster contained by virt_ldc". Examples of an attribute table and a relations table for the CI "virt_cluster" are presented in Tables 26 and 27, as follows:

TABLE 26

Attribute table for of the CI "virt_cluster"

| description | attribute | type | length |
|---|---|---|---|
| CPU Type | cpu_type | string | 40 |
| CPU Architecture | cpu_architecture | string | 40 |
| KSM Memory Policy enabled/disabled | ksm | True/False | 40 |
| Fencing Policy | fencing_policy | True/False | 40 |
| Memory Overcommitment | memory_overcommitment | Integer | 40 |
| Transparent Huge Memory Pages policy | transparent_huge_pages | True/False | 40 |
| Ballooning | ballooning | True/False | 40 |
| Compatibilty Version | compatibility_version | string | 255 |

TABLE 27

Relations table for of the CI "virt_cluster"

| Parent | Child | Relation Type |
|---|---|---|
| virt_ldc | virt_cluster | Contains::Contained by |
| virt_cluster | virt_server | Members::Member of |
| virt_cluster | virt_vm_instance | Contains::Contained by |

As another example, information related to a virtualization server of the remote virtualization system 606 may be stored in the CI "virt_server" (which may be associated with the third class 806). Exemplary attributes of the CI "virt_server" are presented in Table 28:

TABLE 28

Exemplary attributes of the CI "virt_server"

| CI attributes | Definition of attributes |
|---|---|
| Name | Name of the server |
| Serial Number | Serial number of the server |
| Object ID | |
| CPU Cores | Total cores |
| CPU Count | Socket count |
| CPU Type | |
| CPU Speed | CPU Speed in MHz |
| Host Name | |
| IP Address | |
| Model ID | |
| OS | OS Family |
| OS Version | OS Version |
| RAM | |
| URL | API URL of the server |

For identification during the discovery, the "virt_server" class may be associated with a new identifier "server identification—independent—by 'serial_number' attribute".

Examples of an attribute table and a relations table for the CI "virt_server" are presented in Tables 29 and 30, as follows.

TABLE 29

Attribute table of the CI "virt_server"

| description | attribute | type | length |
|---|---|---|---|
| URL Used to access the Object | url | URL | 1024 |

TABLE 30

Relations table for of the CI "virt_server"

| Parent | Child | Relation Type |
|---|---|---|
| virt_cluster | virt_server | Members::Member of |
| virt_vm_instance | virt_server | Registered on::Has registered |

As another example, information related to a VM instance of the remote virtualization system 606 may be stored in the CI "virt_vm_instance" (which may be associated with the second class 804). Exemplary attributes of the CI "virt_vm_instance" are presented in Table 31:

TABLE 31

Exemplary attributes of the CI "virt_vm_instance"

| CI attributes | Definition of attributes |
|---|---|
| Name | Name of the VM instance |
| State | |
| Object ID | |
| IP Address | |
| Disks | Number of disks |
| MAC Address | |
| Management URL | API URL of the VM instance |
| Description | |
| FQDN | Fully Qualified Domain Name |
| CPU Architecture | Example: Intel Broadwell MRS SSBD MDS Family |
| RAM | |
| Delete Protected | Enabled/Disabled |
| CPU Cores | Number of CPU cores |
| HA Priority | |
| High Availability | Enabled/Disabled |
| Memory Guarantee (in MBs) | Guaranteed memory for the VM |
| Memory Max | Maximum memory possible for the VM |
| Multi-queues | Enabled/Disabled |
| Placement policy | Placement policy |
| CPU Sockets | Number of CPU sockets |
| Stateless | True/False |
| On storage error | Behavior of a virtual machine that is paused due to storage I/O error. For e.g., AUTO_RESUME, LEAVE_PAUSED, and KILL. |
| Start time | Start time of the VM in time zone of the discovery server 612 |
| Stop time | Stop time of the VM in time zone of the discovery server 612 |
| Threads | |
| Time zone | |
| USB | Enabled/Disabled |
| Run once | Enabled/Disabled |
| Remote Virtualization System Type | |

For identification during the discovery, the "virt_server" class may be associated with a new identifier "Virtual Machine server identification—independent—by 'object_id' attribute". Examples of an attribute table and a relations table for the CI "virt_vm_instance" are presented in Tables 32 and 33, as follows.

TABLE 32

Attribute table of the CI "virt_vm_instance"

| description | attribute | type | length |
|---|---|---|---|
| Management URL | mgmt_url | URL | 1024 |
| CPU Architecture | cpu_architecture | string | 255 |
| Delete Protected | delete_protected | true/false | 40 |
| HA Priority | ha_priority | integer | 40 |
| High Availability | high_availability | true/false | 40 |
| Memory Guarantee (mb) | memory_policy_guaranteed | integer | 40 |
| Memory MAX | memory_policy_max_mb | integer | 40 |
| Multi Queues | multi_queues | true/false | 40 |
| Placement Policy | placement_policy | string | 255 |
| CPU Sockets | cpu_sockets | integer | 40 |
| Stateless | stateless | true/false | 40 |
| On Storage Error | storage_error_resume_behaviour | string | 255 |
| Start Time | start_time | string | 255 |
| Stop Time | stop_time | string | 255 |
| Threads | threads | integer | 40 |
| Time Zone | time_zone | string | 255 |
| USB Attached | usb | true/false | 40 |
| Run Once | run_once | true/false | 40 |
| Remote Virtualization System Type | type | string | 255 |

TABLE 33

Relations table of the CI "virt_vm_instance"

| Parent | Child | Relation Type |
|---|---|---|
| virt_cluster | virt_vm_instance | Contains::Contained by |
| virt_vm_instance | virt_server | Registered on::Has registered |
| virt_server | virt_vm_instance | Virtualized by::Virtualizes |

As another example, information related to a virtualization object of the remote virtualization system 606 may be stored in the CI "virt_object" (which may be associated with the fourth class 808). Exemplary attributes of the CI "virt_object" are presented in Table 34:

TABLE 34

Exemplary attributes of the CI "virt_object"

| CI attributes | Definition of attributes |
|---|---|
| HREF ID | Hypertext Reference ID |
| Manager ID | Manager ID |
| URL | URL to access the object (that may be used in child classes) |

An example of an attribute table for the CI "virt_object" are presented in Table 35, as follows.

TABLE 35 attribute table for the CI "virt_object"

| description | attribute | type | length |
|---|---|---|---|
| Href ID | href_id | string | 255 |
| Manager ID | manager_id | reference | 32 |
| URL Used to access the Object (used in child classes) | url | URL | 1024 |

Figure 9:
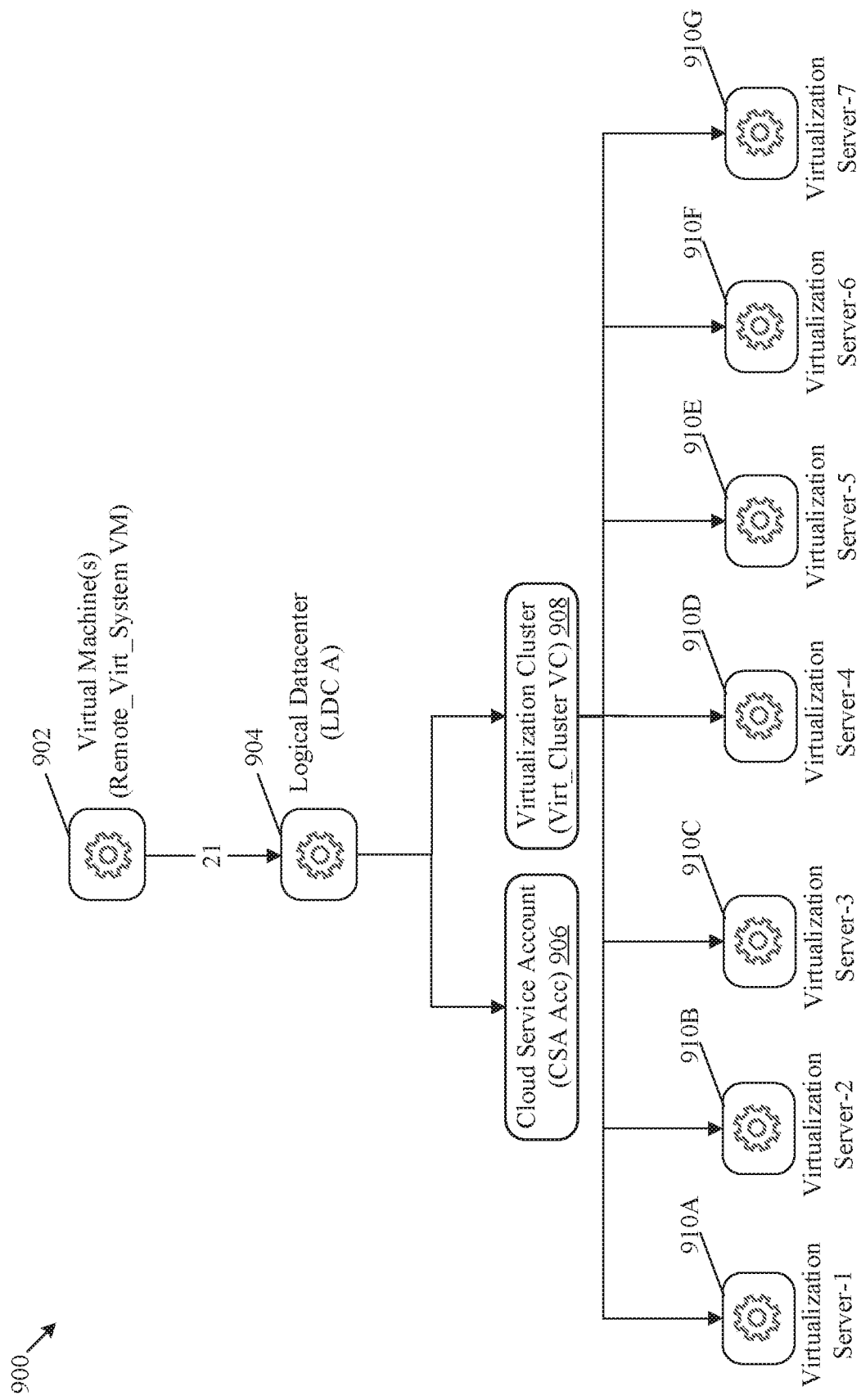
FIG. 9 is a diagram that illustrates an exemplary relationship among various discovered resources of the remote virtualization system of FIG. 6, in accordance with example embodiments.

An example of a relationship among the various discovered resources associated with the remote virtualization system 606 is explained further, for example, in FIG. 9.

The class model 800 is an exemplary class model associated with the set of resources 618 of the remote virtualization system 606 and should not be construed to limit the scope of the disclosure.

FIG. 9 is a diagram that illustrates an exemplary relationship between the various discovered resources associated with the remote virtualization system of FIG. 6, in accordance with example embodiments. FIG. 9 is described in conjunction with elements from FIG. 6, FIG. 7, and FIG. 8. With reference to FIG. 9, there is shown a diagram 900. The diagram 900 depicts an exemplary relationship between discovered resources associated with the remote virtualization system 606. The diagram 900 is merely shown as an exemplary relationship and should not be construed as limiting for the disclosure.

In the diagram 900 of FIG. 9, there is shown, a logical datacenter 904 (e.g., "LDC A") associated with 21 virtual machines (e.g., "Remote_Virt_System VMs") associated with the remote virtualization system 606 of FIG. 6. The logical datacenter 904 (e.g., "LDC A") may be further associated with a cloud service account 906 (e.g., "CSA Acc" that may be configured by the user 620) and a virtualization cluster 908 (e.g., "Virt_Cluster_VC") associated with the remote virtualization system 606. The virtualization cluster 908 (e.g., "Virt_Cluster_VC") may be further associated with 7 virtualization servers associated with the remote virtualization system 606. Examples of the virtualization servers may include, Virtualization Server-1 910A, Virtualization Server-2 910B, Virtualization Server-3 910C, Virtualization Server-4 910D, Virtualization Server-5 910E, Virtualization Server-6 910F, and Virtualization Server-7 910G.

Figure 10:
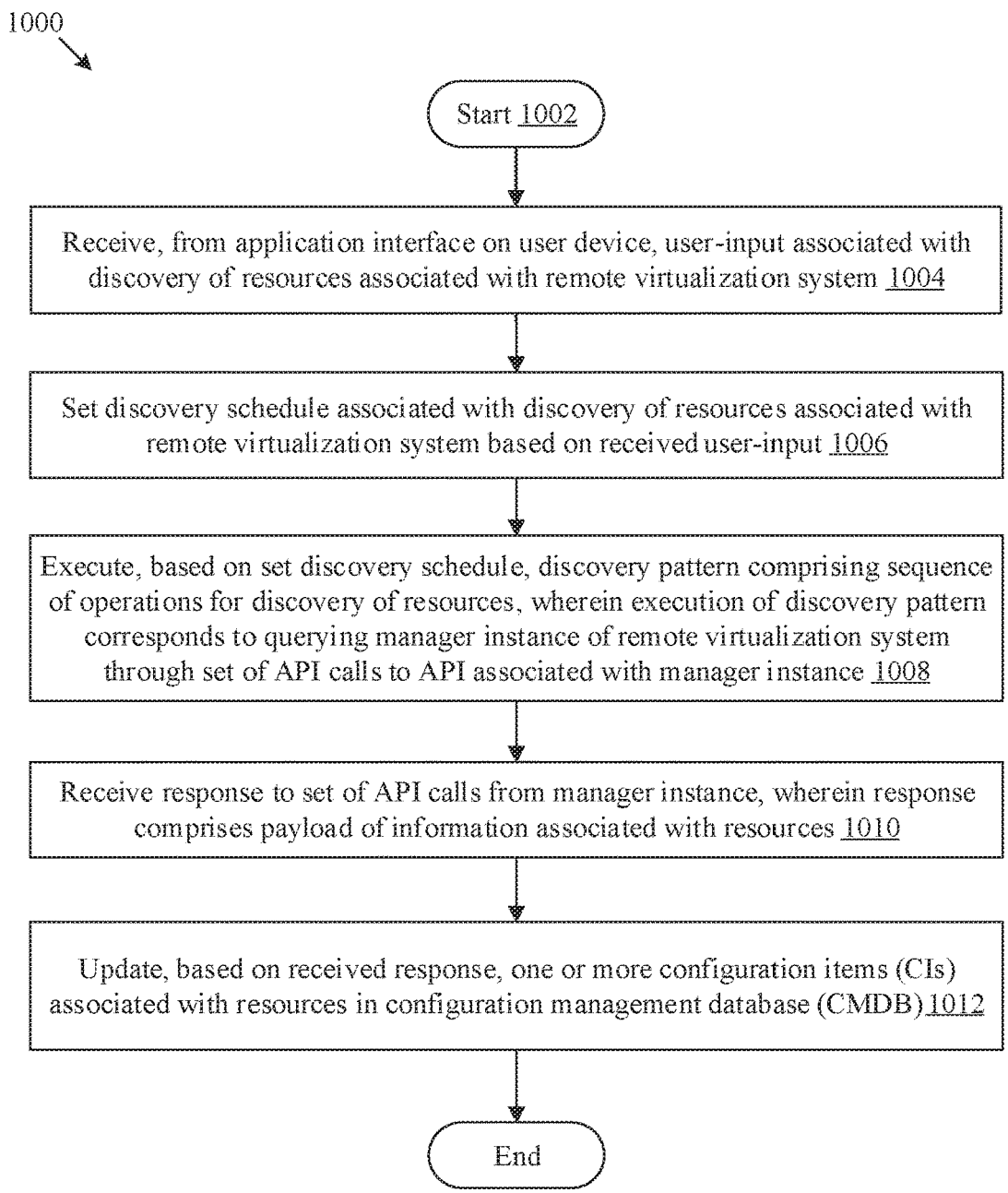
FIG. 10 is a flow chart that illustrates a method of discovering a set of resources of the remote virtualization system of FIG. 6, in accordance with example embodiments.

FIG. 10 is a flow chart that illustrates a method of discovery of a set of resources of the remote virtualization system of FIG. 6, in accordance with example embodiments. FIG. 10 is explained in conjunction with elements from FIGS. 6, 7, 8, and 9. With reference to FIG. 10, there is shown a flowchart 1000. The exemplary method of flowchart 1000 may be executed by any computing system, for example, by the computing system 602 of FIG. 6. The exemplary method of the flowchart 1000 may start at 1002 and proceed to 1004.

At 1004, a user input may be received from the application interface 604A (i.e. an instance) on the user device 604. In an embodiment, the discovery application 610 (through the discovery server 612) on the computing system 602 may be configured to receive the user input. The user input may be associated with the discovery of the set of resources 618 associated with the remote virtualization system 606. The user input may include a URL of an API associated with the manager instance 616 of the remote virtualization system 606. The reception of the user input is explained further, for example, in FIG. 6.

At 1006, a discovery schedule associated with the discovery of the set of resources 618 associated with the remote virtualization system 606 may be set. In an embodiment, the discovery application 610 (through the discovery server 612) may be configured to set a discovery schedule associated with the discovery of the set of resources 618 associated with the remote virtualization system 606 based on the received user input. Details related to the discovery schedule are described further, for example, in FIG. 6.

At 1008, based on the set discovery schedule, a discovery pattern may be executed. In an embodiment, the discovery application 610 (through the discovery server 612) may be configured to execute the discovery pattern based on the set discovery schedule. The discovery pattern may include a sequence of operations for the discovery of the set of resources 618. The execution of the discovery pattern may correspond to querying the manager instance 616 of the remote virtualization system 606 through a set of API calls to the API associated with the manager instance 616. The execution of the discovery pattern is described further, for example, in FIG. 6.

At 1010, a response to the set of API calls may be received from the manager instance 616. In an embodiment, the discovery application 610 (through the discovery server 612) may be configured to receive the response to the set of API calls from the manager instance 616. The response may include a payload of information associated with the discovered resources associated with the remote virtualization system 606. In an embodiment, the discovery application 610 (or the discovery server 612) may be configured to parse the received response to determine the information associated with the set of resources 618 of the remote virtualization system 606. The reception and parsing of the response are explained further, for example, in FIG. 6.

At 1012, one or more CIs associated with the set of resources 618 may be updated in the CMDB 614 based on the received response. In an embodiment, based on the received (or parsed) response, the discovery application 610 (through the discovery server 612) may be configured to update the one or more CIs associated with the discovered resources in the CMDB 614. Each configuration item may correspond to a logical representation of a resource associated with the remote virtualization system 606. Each configuration item may represent a presence, a status, attributes of a respective resource and relationships with other resources. As an example, the discovery application 610 (through the discovery server 612) may store the extracted information (from the parsed response) in CI tables on the CMDB 614. Examples of the CI tables are explained, for example, in FIG. 8. Control may pass to end.

Although the flowchart 1000 is illustrated as discrete operations, such as 1004, 1006, 1008, 1010, and 1012, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions executable by a machine and/or a computer to operate a computing system (e.g., the computing system 602). The computer-executable instructions may cause the machine and/or computer to perform operations that may include receiving, from an application interface (such as, the application interface 604A) on a user device (such as, the user device 604), a user input associated with a discovery of a set of resources (such as, the set of resources 618) of a remote virtualization system (such as, the remote virtualization system 606). The user input may include an API URL of a manager instance (such as, the manager instance 616) of the remote virtualization system 606. Also, in some instances, the user input may include authentication credentials associated with the remote virtualization system 606 and configuration of a cloud service account on a discovery server (such as, the discovery server 612). The cloud service account may securely store such credentials and may later on provide such credentials for running a discovery pattern on the discovery server 612. The operations may further include setting a discovery schedule for the discovery based on the received user input and further include executing, based on the set discovery schedule, a discovery pattern comprising a sequence of operations for the discovery of the set of resources 618 of the remote virtualization system 606. Execution of the discovery pattern may correspond to querying the manager instance 616 through a set of API calls to the API URL of the manager instance 616. The operations may further include receiving a response to the set of API calls from the manager instance 616. The response may include payload information associated with the set of resources 618. The operations may further include updating, based on the received response, one or more configuration items (CIs) associated with the set of resources 618 in a configuration management database (CMDB) (such as, the CMDB 614).

Detailed description for an application Load Balancer (LB) discovery is provided herein. A host system may host an application load balancer and may be communicatively coupled to a pool of servers. The pool of servers may include a set of back-end servers that may be configured to handle incoming client requests. The application load balancer may receive such incoming client requests from application services of various client applications and may intelligently route such requests to servers in the pool to balance a load on such application services and the pool of servers. Based on a load on a certain pool of servers and by use of defined load balancing algorithms, the application load balancer may select back-end server(s) from the pool and may distribute such client requests to the selected back-end server(s).

The application load balancer may be built on software-defined principles and may separate a data plane from a control plane to deliver application services beyond just load balancing. Examples of such application services may include, but are not limited to, application analytics, predictive autoscaling, micro-segmentation, and self-service for app owners in both on-premises or cloud environments. The application load balancer may include a dynamic pool of load balancing resources that may be centrally managed and hosted on at least one of, but not limited to, commodity servers (e.g., x86 servers), virtual machines (VMs), or containers. The load balancing resources may provide granular services to individual applications and may enable massive scaling of network services without the complexity associated with management of several separate appliances. Examples of the resources associated with the application load balancer may include, but are not limited to, a cluster of load balancer (LB) controllers, a controller, a service engine, an LB service, an LB pool, and an LB pool member.

The following described implementations may be found in the disclosed system and method for implementing a discovery of resources associated with the application load balancer. A discovery application may be configured to receive, via an application interface on a user device, a user input comprising a web address, or a network address associated with the application load balancer on a host system. The discovery application may execute, based on the received user input, a discovery pattern which includes a sequence of operations for a discovery of resources associated with the application load balancer. The application load balancer may include a group of service engines and a controller cluster configured to manage the group of service engines. The group of services engines may be configured to balance a load associated with incoming client requests to a pool of servers communicatively coupled to the host system. At least one of the sequence of operations corresponds to an Application Programming Interface (API) call to the web address or the network address. The discovery application may receive a response to the API call from the controller cluster. The response may include a payload of information associated with the resources. Thereafter, the discover application may update one or more configuration items (CIs) associated with the resources in a configuration management database (CMDB) based on the received response.

The discovery of the resources of the application load balancer may provide statistics related to the resources being used behind the scene to handle incoming client requests from application services of various client applications and route such requests to servers in the pool to balance a load on such application services and the pool of servers. The statistics may be used to deploy additional resources (such as, LB pools or service engines) or remove unneeded resources. The discovery of resources may also provide diagnostic information associated with the resources. The diagnostic information may be used to identify faulty resources (e.g., LB pools or service engines) and replace (or remove) the identified faulty resources associated with the application load balancer.

Figure 11:
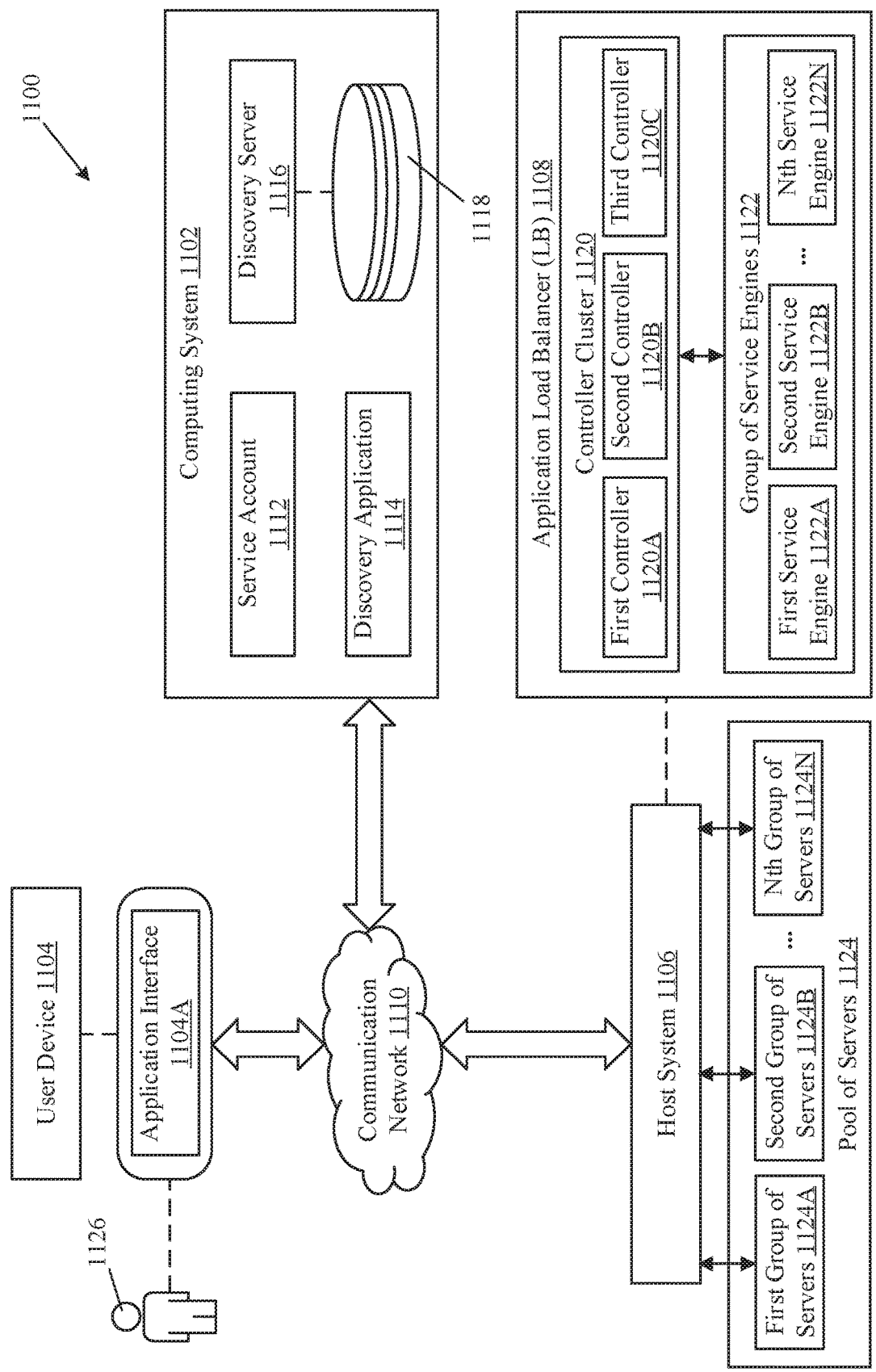
FIG. 11 illustrates an exemplary network environment for discovery of resources associated with an application load balancer on a host system, in accordance with example embodiments.

FIG. 11 illustrates an exemplary network environment for discovery of resources associated with an application load balancer on a host system, in accordance with example embodiments. With reference to FIG. 11, there is shown a computing system 1102, a user device 1104, and a host system 1106 on which an application load balancer may be deployed. The computing system 1102 may be communicatively coupled to the user device 1104 and the host system 1106, via a communication network 1110. The computing system 1102 may include a discovery server 1116, a discovery application 1114, and a configuration management database (CMDB) 1118, which may be managed by the discovery application 1114. In FIG. 11, there is further shown an application load balancer (LB) 1108 that may be deployed on the host system 1106. The application load balancer 1108 may include a controller cluster 1120 and a group of service engines 1122, which may be communicatively coupled to the controller cluster 1120. There is further shown, a pool of servers 1124, which may be communicatively coupled to the host system 1106.

The computing system 1102 may include suitable code, logic, circuitry and/or interfaces that may be configured to discover the resources associated with the application load balancer 1108 and maintain the CMDB 1118. For example, based on credentials for the application load balancer 1108 in the service account 1112, the computing system 1102 may execute one or more discovery patterns to collect information associated with resources associated with the application load balancer 1108. The one or more discovery patterns may be executed through the discovery server 1116. A discovery pattern may be referred to as a sequence of operations, which may allow the discovery application 1114 (and the discovery server 1116) to determine configuration items (CIs) to be updated based on the collected information, credentials to use for accessing the application load balancer 1108, and tables to populate in the CMDB 1118. The computing system 1102 may receive information related to the resources based on the discovery. The computing system 1102 may be configured to store the collected information related to the resources in the CMDB 1118. Example implementations of the computing system 1102 may include, but are not limited to, an application server, a database server, a mainframe server, a cloud server (e.g., a hybrid, a private, or a public cloud), or a web server.

The service account 1112 may include code, logic, circuitry, and/or interfaces that may be configured to store information of an account (e.g., a user account on the application load balancer 1108), including credentials necessary to access the account. A user (e.g., the user 1126) may be required to create the service account 1112 for the application load balancer 1108 before execution of a discovery pattern on the application load balancer 1108.

The discovery application 1114 may include code, logic, circuitry, and/or interfaces that may be configured to make use of the discovery server 1116 (also referred to as Management, Instrumentation, and Discovery (MID) Server) to discover and collect information associated with the resources associated with the application load balancer 1108. For example, the discovery application 1114 may be configured to discover, through the discovery server 1116, resources associated with the application load balancer 1108. Such resources may be discovered by execution of a discovery pattern, which may include a sequence of operations. By executing the discovery pattern, the discovery application 1114 may be querying the application load balancer 1108 through an Application Programming Interface (API) call to a web address (e.g., a Uniform Resource Locator (URL)) or a network address (such as Internet Protocol (IP) address) associated with the application load balancer 1108. For example, the discovery application 1114 may be querying a first controller 1120A in the controller cluster 1120 of the application load balancer 1108 through an API call to an IP address of the controller cluster 1120 (or the first controller 1120A).

Through the discovery server 1116, the discovery application 1114 may perform a discovery of the resources associated with the application load balancer 1108 by collecting a response to the API call from the application load balancer 1108. For example, the controller receiving the API call, may respond to the API call by sending the response to the discovery server 1116. Through the discovery server 1116, the discovery application 1114 may update one or more configuration items (CIs) associated with the discovered resources on the CMDB 1118. Herein, the CIs may correspond to load balancer resources such as, the controller cluster 1120, a controller, a service engine, a load balancer service, the pool of servers 1124, or an individual server in the pool of servers 1124. Each CI may include a logical representation of a resource, such that a presence, status, attributes of the resource and its relationships with other resources. The discovery application 1114 may be implemented as an agentless application, so that it may avoid the management complexity of having a permanent software installed on any computer, or device to be discovered.

The discovery server 1116 may include code, logic, circuitry, and/or interfaces that may be configured to facilitate communication and movement of data between the application interface 1104A (i.e., an instance) and external applications, data sources, and services. Multiple discovery servers, capable of handling thousands of devices each, may be deployed in different network segments to provide virtually unlimited scalability. The discovery server 1116 may be configured to execute the discovery pattern (i.e. a sequence of operations for discovery of the resources) for the discovery application 1114 and return results back to an associated instance (e.g., the application interface 1104A) for processing. In an embodiment, the discovery server 1116 may be configured to store the results including information associated with the discovered resources in the one or more CIs in the CMDB 1118. In some instances, the discovery server 1116 may use secure communication protocols (like HTTP-secure) to ensure all communications may be secure and initiated inside an enterprise's firewall. The discovery server 1116 may be implemented as an application (such as a Java application), which may run as a service or daemon on a server or a cluster node of the computing system 1102.

The CMDB 1118 may include code, logic, circuitry, and/or interfaces that may be configured to store information about the resources associated with the application load balancer 1108. The CMDB 1118 may be a database in which the information for each resource may be stored in a configuration item (CI) specific to that resource. The discovery application 1114, through the discovery server 1116, may collect the information associated with the resources and may update the respective CIs in the CMDB 1118. Example implementations of the CMDB 1118 may include, but are not limited to, a database server, a file server, a mainframe server, a cloud server, a storage device (e.g., a Redundant Array of Independent Disks (RAID) device), or any other computing device with data storage capability.

The CMDB 1118, and data and instructions associated with the discovery application 1114 may be stored in the persistent data storage of the computing system 1102. For example, the persistent data storage may be installed on the same node or cluster on which the discovery server 1116 may be hosted. The persistent data storage may include computer-readable storage media for carrying or having computer-executable instructions or data structures stored thereon. Such computer-readable storage media may include any available media that may be accessed by a general-purpose or special-purpose computer, such as a processor.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor to perform a certain operation or group of operations associated with the discovery server 1116.

The user device 1104 may host an application interface 1104A that may be configured to receive a user input (such as from a discovery admin). The user input may be associated with the discovery of resources associated with the application load balancer 1108. After the discovery is performed, the user device 1104 may be further configured to display a result of the discovery on a display device of the user device 1104. Examples of the user device 1104 may include, but are not limited to, a workstation, a server, a cluster of servers with a management panel, a laptop, a tablet, an internet-enabled device, a desktop computer, or any portable or non-portable device with a networking and display capability.

The application interface 1104A (also referred to as an Instance) may be implemented as an client-side application for a specific group of users who may access the application interface 1104A through a web client (such as a web browser) and a URL which may be customizable for the group of users. The application interface 1104A may host several applications and services, one or more of which may be associated with resource discovery. The application interface 1104A may support role-based access to different applications or services on the application interface 1104A. For example, one of the group of users may be a discovery admin who may be allowed to configure a discovery schedule for a discovery of the resources associated with the application load balancer 1108.

The host system 1106 may include suitable logic, circuitry, and interfaces that may be configured to host the application load balancer 1108 to handle a load of incoming client requests to the pool of servers 1124 communicatively coupled to the host system 1106. Example implementations of the host system 1106 may include, but are not limited to, a commodity server (such as an X86 server, a cloud server or a BareMetal), a VM or a group of VMs of a virtualization system, or a container on a server node with its own runtime environment.

The application load balancer 1108 may be associated with resources that may be configured to execute operations related to balancing of the load (associated with incoming client requests) on the pool of servers 1124. Such balancing may be based on selection of a determined load-balancing algorithm, such as round robin, least time, least-connections, or hash-based algorithms. The application load balancer 1108 may be built on software-defined principles and may separate a data plane from a control plane to deliver application services beyond just load balancing. Examples of such application services may include, but are not limited to, application analytics, predictive autoscaling, micro-segmentation, and self-service for app owners in both on-premises or cloud environments. The application load balancer 1108 may include a dynamic pool of load balancing resources that may be centrally managed and hosted on the host system 1106. The load balancing resources may provide granular services to individual applications and may enable massive scaling of network services without the complexity associated with management of several separate appliances. Examples of such resources associated with the application load balancer 1108 may include, but are not limited to, a controller cluster with several controllers, a service engine, a Load Balancer (LB) service, an LB pool, and an LB pool member. In an exemplary embodiment, the application load balancer 1108 may be an AVI Vantage® load balancer.

The application load balancer 1108 may include the controller cluster 1120 with several controllers, and the group of service engines 1122 associated with the controller cluster 1120. The pool of servers 1124 may be associated with each service engine of the group of service engines 1122. The controller cluster 1120 may include a plurality of controllers, such as a first controller 1120A, a second controller 1120B, and a third controller 1120C. The group of service engines 1122 may include a first service engine 1122A, a second service engine 1122B, . . . and an Nth service engine 1122N. The first service engine 1122A may be associated with a first group of servers 1124A, the second service engine 1122B may be associated with a second group of servers 1124B, . . . and the Nth service engine 1122N may be associated with an Nth group of servers 1124N. The first group of servers 1124A, the second group of servers 1124B . . . , and the Nth group of servers 1124N may be a part of the pool of servers 1124. For the sake of brevity, only three controllers have been shown as part of the controller cluster 1120 in FIG. 11. However, in some embodiments, there may be more than three controllers included in the controller cluster 1120, without limiting the scope of the disclosure.

In an embodiment, the controller cluster 1120 may include a main or master controller (for example, the first controller 1120A). Remaining controllers (e.g., secondary or slave controllers) in the controller cluster 1120 may provide high availability to the main controller. The main controller (e.g., the first controller 1120A) may be a central point of management and control (i.e., the control plane) for the application load balancer 1108. Further, the main controller may host Representation State Transfer (REST) APIs to enable discovery and monitoring of the resources associated with the application load balancer 1108. The main controller may launch a service engine on-demand based on requirements of the application load balancer 1108 and telemetry data of applications associated with the application load balancer 1108. In an embodiment, the main controller may be configured to place virtual services on each of the service engines in the group of service engines 1122. The placement of the virtual service may load balance new applications or increase capacity of running applications on back-end servers from the pools of servers associated with the Service engines. Each of the plurality of controllers may securely communicate with the service engines and the other controllers. The controllers (e.g., the secondary or slave controllers) may collect information related to health of servers, client connection statistics, and client-request logs from the service engines at regular intervals. The controllers may process the collected information and aggregate analytics. The controllers may also send commands and instructions, for example, configuration changes to the individual service engines.

Each service engine (e.g., the first service engine 1122A) in the group of service engines 1122 may be configured to receive and execute instructions from the controller (e.g., the first controller 1120A). A service engine (e.g., the first service engine 1122A) may implement the data plane of the application load balancer 1108. Like the controller cluster 1120, the service engine may also support high availability. The service engine may include one or more virtual services with associated IP addresses and ports to receive incoming client requests from various applications. The service engine may also include a pool module that may include a list of servers in a pool (e.g., the first group of servers 1124A, which may be a LB pool resource) associated with the service engine (e.g., the first service engine 1122A). The service engine may receive a load balancing request from a client at a virtual service (which may be an LB service resource) of the service engine and may validate the received load balancing request. Once validated, the virtual service may send the load balancing request to the pool module to choose a back-end server (which may be an LB pool member resource). The back-end server may belong to the pool of servers 1124 (e.g., the first group of servers 1124A) associated with the service engine (e.g., the first service engine 1122A) and may be selected based on a load balancing algorithm. Further, the service engine may collect real-time application telemetry data based on application traffic flow and may share the collected telemetry data with the main controller.

The pool of servers 1124 may include resources, such as Bare-metal servers, Virtual Machines (VMs), cloud servers, containers, or a combination thereof, to handle application service load. Each server in the pool of servers 1124 may include suitable logic, circuitry, and interfaces, and/or code that may be configured to perform a certain computing task associated with an incoming client request (routed by an associated service engine).

The application load balancer 1108 may be configured to receive the incoming client requests from application client-side applications and balance load associated with the incoming client requests. Based on a current load on the pool of servers 1124 and a defined load balancing algorithm, the application load balancer 1108 may select one or more servers from the pool of servers 1124 and may distribute such client requests to the selected one or more servers. The one or more servers may then process the client requests and run the tasks associated with the client-side application.

Though not shown in FIG. 11, the application load balancer 1108 may further include a management console interface. The management console interface may be a web-based user-interface that may provide a role-based access control (RBAC) to admin and developers. The management console interface may send REST API calls to the IP address of the main controller to control, manage, and monitor the applications and resources of the application load balancer 1108.

The communication network 1110 may represent a portion of the global Internet. However, the communication network 1110 may alternatively represent different types of network, such as a private wide-area or a local-area packet-switched network. The communication network 1110 may include a communication medium through which the computing system 602, the user device 604, and the remote virtualization system 606 may communicate with each other. The communication network 1110 may be one of a wired connection or a wireless connection. Examples of the communication network 1110 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 1100 may be configured to connect to the communication network 1110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT)® communication protocols.

In operation, the discovery application 1114 may be configured to receive a user input via the application interface 1104A on the user device 1104. The user input may be associated with a discovery of resources associated with the application load balancer 1108. As an example, the user input may include an authentication credential of an account (e.g., a user account) associated with the discovery application 1114. Examples of values in the authentication credential may be as illustrated in Table 36:

TABLE 36

Example credentials of the account

| Credential Attributes | Exemplary values |
| --- | --- |
| Name of the credential | Application_LB |
| User-name | my_user |
| Password | password_123 |

With reference to table 36, the authentication credential in the user input may include values of various credential attributes, such as a name of the credential (e.g., "Application_LB"), a user-name (e.g., "my_user") associated with the account, and a password (e.g., "password 123") for the account. To enable the user 1126 to request for the discovery, the discovery application 1114 may require a basic authentication for the user account. The basic authentication may use the username and the password (included in the authentication credential) for the user account. Further, to allow the discovery application 1114 to use the basic authentication and access the application load balancer 1108 for the discovery, the application load balancer 1108 may be configured with appropriate settings through the management console interface of the application load balancer 1108. For example, through an administration settings page of the management console interface, a user input may be provided to the application load balancer 1108 to enable a basic authentication setting (e.g., by checking a check box "Allow Basic Authentication"), and an HTTP access setting (e.g., by checking a check box "Allow HTTP Access to System").

In an embodiment, the user input may include a web address, or a network address associated with the application load balancer 1108. For example, the user input may include the network address as one of: an IP address of the main controller or an IP address of the management console of the application load balancer 1108.

In an embodiment, the user input may further include account information for creation and configuration of the service account 1112 on the computing system 1102. Based on the account information in the user input, the computing system 1102 may create the service account 1112 and may configure the created service account 1112 to include attributes, such as the credentials (as represented by Application LB) of Table 36 and the IP address of the controller (such as the main controller or the first controller 1120A) of the application load balancer 1108. An example of values that may be included in the service account 1112 is presented in Table 37, as follows:

TABLE 37

Exemplary values of service account attributes

| Service account Attributes | Exemplary values |
| --- | --- |
| Name of the service account 1112 | Application_LB Service account |
| IP Address | 192.168.1.1 |
| Discovery credentials | Application LB |

With reference to Table 37, the account information may include various service account attributes, such as a name of the service account 1112 (e.g., "Application LB Service account") and an IP Address (e.g., "192.168.1.1") of the main controller. In addition, the service account 1112 attributes may include discovery credentials (e.g., "Application LB"), which may be provided in the user input (as shown in Table 36).

To perform the discovery of the resources associated with the application load balancer 1108, sufficient permissions may be provided to the user account to send a set of API queries to the network address or the web address associated with the application load balancer 1108. For example, the set of API queries may be sent to the IP address of the main Controller or the IP address of the management console interface via the discovery server 1116. The set of API queries may include, but are not limited to, "/api/cluster", "/api/serviceengine", "/api/pool", "/api/vimgrvmruntime?controller vm=true", "/api/cloud", "/api/virtualservice", and "/api/serviceenginegroup".

In one or more embodiments, the user input may also include a user-selection (via the user device 1104) of an option to create a discovery schedule for the discovery of resources associated with the application load balancer 1108. For example, such an option may be presented after the service account 1112 may be created. Through the discovery server 1116, the discovery application 1114 may be configured to set a discovery schedule for the discovery of resources associated with the application load balancer 1108. The discovery schedule may be set based on the received user input. Information associated with the discovery schedule may specify a set of resources or resource types to be searched (i.e. CIs to be updated in the CMDB 1118) and a time schedule during which the discovery may be executed. In some cases, the discovery schedule may also select one discovery server 1116 (or multiple discovery servers) for the discovery. Based on the user input, the discovery may be scheduled to execute on a regular basis, a recurring basis, or on an on-demand basis. In some other cases, information associated with the discovery schedule may include a user selection of a quick discovery option. Based on such selection, a discovery operation may be performed immediately. As an example, through the discovery server 1116, the discovery application 1114 may create a discovery schedule for the application load balancer 1108 based on the user input (which also includes the selection of the quick discovery option). As an example, a quick discovery may be run on the IP address of the main controller (e.g., the first controller 1120A) of the application load balancer 1108 or the IP address of the management console interface of the application load balancer 1108. For example, the AVI Vantage® load balancer may support discovery of its resources when the AVI Vantage® load balancer resides on a VMware® or an AWS® infrastructure. To be able to create a relation with the VMware infrastructure, the discovery application 1114 may be required to discover a datacenter and VMs on which the controller cluster 1120 and controllers reside on. For the VMware® infrastructure, relations may be created to the datacenter and VMs. When the AVI Vantage® load balancer platform resides on the AWS® infrastructure, no relations may be created with the underlying infrastructure.

Through the discovery server 1116, the discovery application 1114 may be configured to execute a discovery pattern based on the user input (and/or the set discovery schedule). The discovery pattern may include a sequence of operations for the discovery of resources associated with the application load balancer 1108. At least one of the sequence of operations may correspond to an API call to the web address or the network address associated with the application load balancer 1108. For example, the API call may be made to the IP address of the controller (such as the main controller) of the controller cluster 1120.

In an embodiment, the sequence of operations may include a first set of operations to scan for the configuration items associated with the application load balancer 1108. In an example, the first set of operations may include probe and/or sensor-based instructions to determine open Internet Protocol (IP) address(es) and port(s) (e.g., Transmission Control Protocol (TCP) or User Datagram Protocol (UDP) ports) associated with the application load balancer 1108 to detect online devices and applications associated with the application load balancer 1108. As a result of the execution of the first set of operations, the discovery application 1114 may detect devices and applications associated with the application load balancer 1108 and create configuration items corresponding to such devices and applications. The sequence of operations may further include a second set of operations that may follow the first set of operations. The second set of operations may include classification of the detected devices and applications based on a determination of an Operating System (OS) version of the detected devices. For example, the second set of operations may include instructions to initiate a Secure Shell (SSH) connection with the detected device and retrieve the OS version from a predetermined file location on the device. The sequence of operations may further include a third set of operations that may follow the second set of operations. The third set of operations may include instructions to identify information related to the classified detected devices. Examples of such identified information may include, but is not limited to, basic input/output system (BIOS) information, serial numbers, network interface information, media access control address(es) assigned to the network interface(s), and IP address(es) associated with the device. The sequence of operations may further include a fourth set of operations that may follow the third set of operations. The fourth set of operations may include instructions to explore an operational state of the classified detected device. The operational state may include, but is not limited to, processor information, memory information, and information related to execution of processes or applications on the detected device.

The first set of operations may be referred to as operations of a scanning phase and the second set of operations may be referred to as operations of a classification phase of the discovery. The third set of operations may be referred to as operations of an identification phase and the fourth set of operations may be referred to as operations of an exploration phase of the discovery. The scenario where the discovery includes only the identification phase and the exploration phase may be referred to as a serverless discovery in which the resources (i.e., devices) may be pre-determined and the discovery application 1114 may directly discover applications hosted on the devices, while the discovery of the devices themselves through a scanning phase and a classification phase may be skipped. In certain scenarios, the discovery of resources associated with the application load balancer 1108 (e.g., the AVI Vantage® load balancer) may be based on a serverless discovery process.

In an embodiment, the discovery pattern may include one or more EVALs associated with certain operations (in the sequence of operations) of the discovery pattern. An EVAL may be a script-based code (e.g., a code written in JavaScript), such as a function or method that may be executed to supplement or complement an operation of the discovery pattern. Following are exemplary EVALs that may be executed to supplement the sequence of operations of a discovery pattern:

1. An EVAL that may be used to check if any LB pool does not have a Virtual IP (VIP) assigned to it, so that a relation may be created to the controller cluster 1120 instead of to the VIP.
2. An EVAL that may be used to checking if the VM name in the Controller result is a FQDN, (If the VM name is an FQDN, only the first part of the FQDN is kept, else if the VM name is an IP-address, the script may not do anything. It may be required to get the VM name in the controller result to look the same as the VM name in the VM result for the match.

Based on the execution of the discovery pattern, the discovery application 1114 may receive, through the discovery server 1116, a response to the sent API call from the main controller (e.g., the first controller 1120A) or the management console interface of the application load balancer 1108. The response may include a payload of information associated with the resources. The payload of information associated with the response may be stored, for example, as a JSON key-value pair in a "context" field of an HTTP response to the API call.

In an embodiment, the discovery application 1114 may be configured to parse the received response corresponding to the API call to determine the information associated with the resources. The received response (e.g., an HTTP response) may be parsed to extract the "context" field of the HTTP response. For example, the received response may be parsed to extract JSON key-value pair values as the information associated with the resources.

Based on the received response, the discovery application 1114 may be configured to update one or more CIs associated with the discovered resources on the CMDB 1118. Examples of the one or more CI tables and information associated with the discovered resources in the one or more CI tables are described further, for example, in FIG. 13.

The discovery application 1114 may be further configured to generate a class model associated with the discovered resources of the application load balancer 1108. The class model may be generated based on the updated one or more CIs. An example of the class model is explained further, for example, in FIG. 13.

The discovery application 1114 may host an Integrated Development Environment (IDE) to run pre-scripts and post-scripts associated with the discovery pattern. For example, the pre-scripts and postscripts may be JavaScript-based scripts. In an embodiment, the discovery application 1114, through the discovery server 1116, may execute a pre-script "Get all vCenter DataCenters" prior to the discovery pattern. The pre-script may be configured to bring all pre-discovered Vmware vCenters to the pattern context. In an embodiment, the discovery application 1114, through the discovery server 1116, may execute a post-script "Application Load Balancer Relationships". The post-script may be executed after the discovery pattern is run but prior to payload processing and execution of an identification and reconciliation (IRE) process of the discovery pattern. Herein, based on the payload processing and execution of the IRE, information may be extracted from the payload, duplicates may be removed (e.g., duplicate CIs created for the same resource may be removed), and other checks may be performed on de-duplicated information. The post-script "Application Load Balancer Relationships" may be a pre-sensor script that may be configured to create relations between the controllers and the host VMs on which they reside (for example, in case of the VMware® infrastructure).

Figure 12:
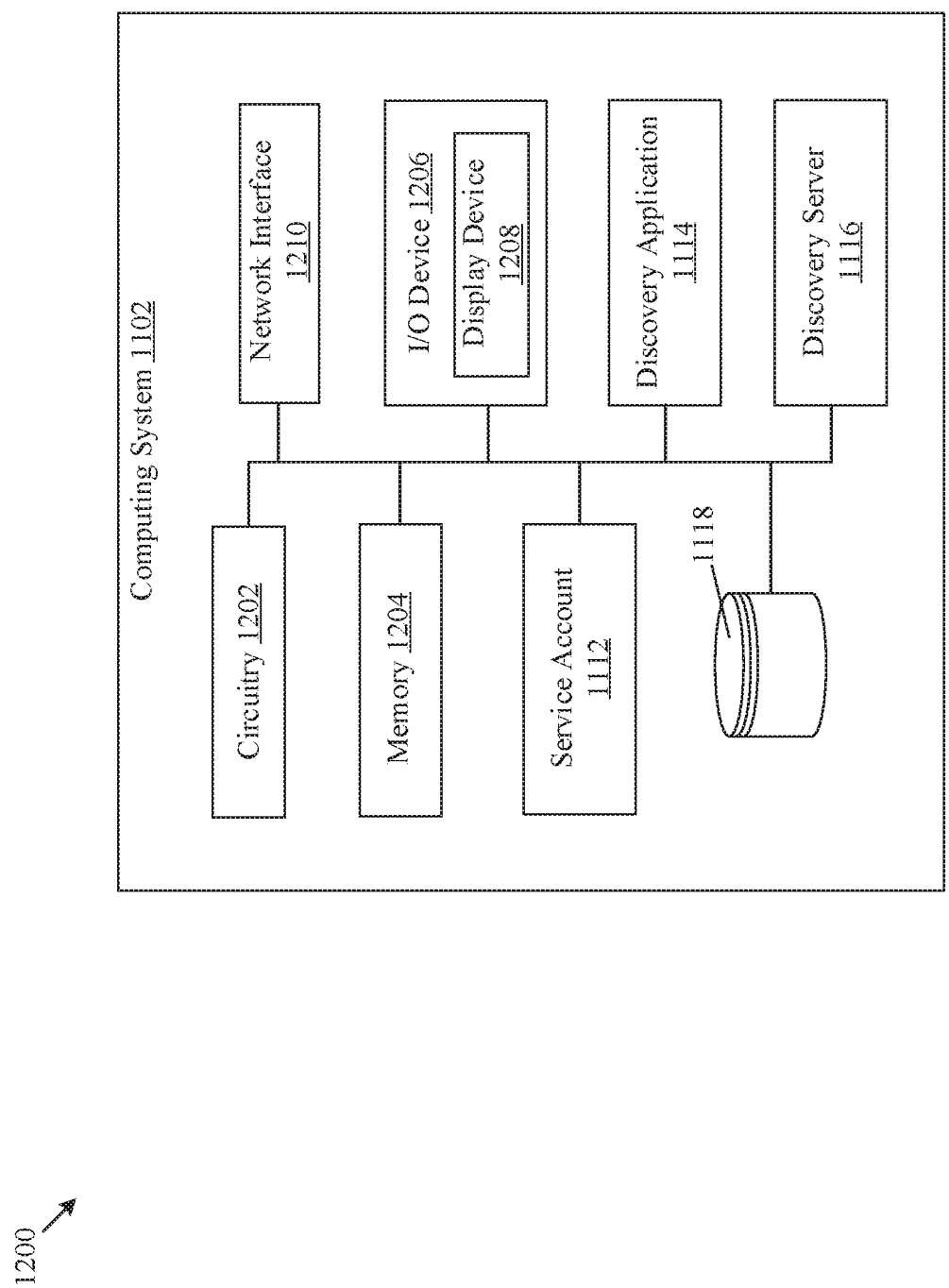
FIG. 12 is a block diagram of a system for implementing a discovery server for discovery of resources associated with an application load balancer on a host system, in accordance with an embodiment of the disclosure.

FIG. 12 is a block diagram of a system for implementing a discovery server for discovery of resources associated with an application load balancer, in accordance with an embodiment of the disclosure. FIG. 12 is explained in conjunction with elements from FIG. 11. With reference to FIG. 12, there is shown a block diagram 1200 of the computing system 1102. The computing system 1102 may include the discovery server 1116, the CMDB 1118, the discovery application 1114, and the service account 1112. The discovery server 1116 may communicate with the CMDB 1118 and the discovery application 1114. The discovery application 1114 may be associated with the service account 1112.

The computing system 1102 may include circuitry 1202, a memory 1204, an input/output (I/O) device 1206, a display device 1208, and a network interface 1210. In some embodiments, the CMDB 1118 may be separate from the discovery server 1116 and may communicate with the discovery server 1116 via the network interface 1210. In some other embodiments, the memory 1204 may include the CMDB 1118.

The circuitry 1202 may include suitable logic, circuitry, interfaces, and/or code that may be configured to execute instructions for operations to be executed by the computing system 1102. Examples of implementation of the circuitry 1202 may include a Central Processing Unit (CPU), x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), co-processors, other processors, and/or a combination thereof.

The memory 1204 may include suitable logic, circuitry, code, and/or interfaces that may be configured to store the instructions executable by the circuitry 1202. In some embodiments, the memory 1204 may store the configuration items associated with the resources of the application load balancer 1108. In such case, the CMDB 1118 may be implemented within the memory 1204. Examples of implementation of the memory 1204 may include, but are not limited to, Random Access Memory (RAM), Read Only Memory (ROM), Hard Disk Drive (HDD), Solid State Drive (SSD), and/or a Secure Digital (SD) card.

The I/O device 1206 may include suitable logic, circuitry, and/or interfaces that may be configured to receive an input and provide an output based on the received input. The I/O device 1206 may include various input and output devices, which may be configured to communicate with the circuitry 1202. Examples of the I/O device 1206 may include, but are not limited to, a touch screen, a keyboard, a mouse, a joystick, a display device (e.g., the display device 1208), a microphone, or a speaker.

The display device 1208 may include suitable logic, circuitry, and interfaces that may be configured to display output associated with the discovery server 1116. The display device 1208 may be a touch screen which may enable a user of the discovery server 1116 to provide a user-input via the display device 1208. The display device 1208 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 1208 may refer to a display screen of a head mounted device (HMD), a smart-glass device, a see-through display, a projection-based display, an electro-chromic display, or a transparent display.

The network interface 1210 may include suitable logic, circuitry, interfaces, and/or code that may be configured to enable communication among the controller cluster 1120 and different operational components, such as the discovery server 1116, the CMDB 1118, and the discovery application 1114, via one or more communication networks. The network interface 1210 may implement known technologies to support wired or wireless communication with the one or more communication networks.

The network interface 1210 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 1210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

Similar to the computing system 1102, the user device 1104 (though not shown in FIG. 12) may include one or more components including, but not limited to, circuitry, a memory, a I/O device, a display device, and a network interface with similar functions. The functions or operations executed by the discovery server 1116 and the discovery application 1114, as described in FIGS. 11, 13, 14, and 15, may be performed by the circuitry 1202. Operations executed by the circuitry 1202 are described in detail, for example, in FIGS. 11, 13, 14, and 15.

Figure 13:
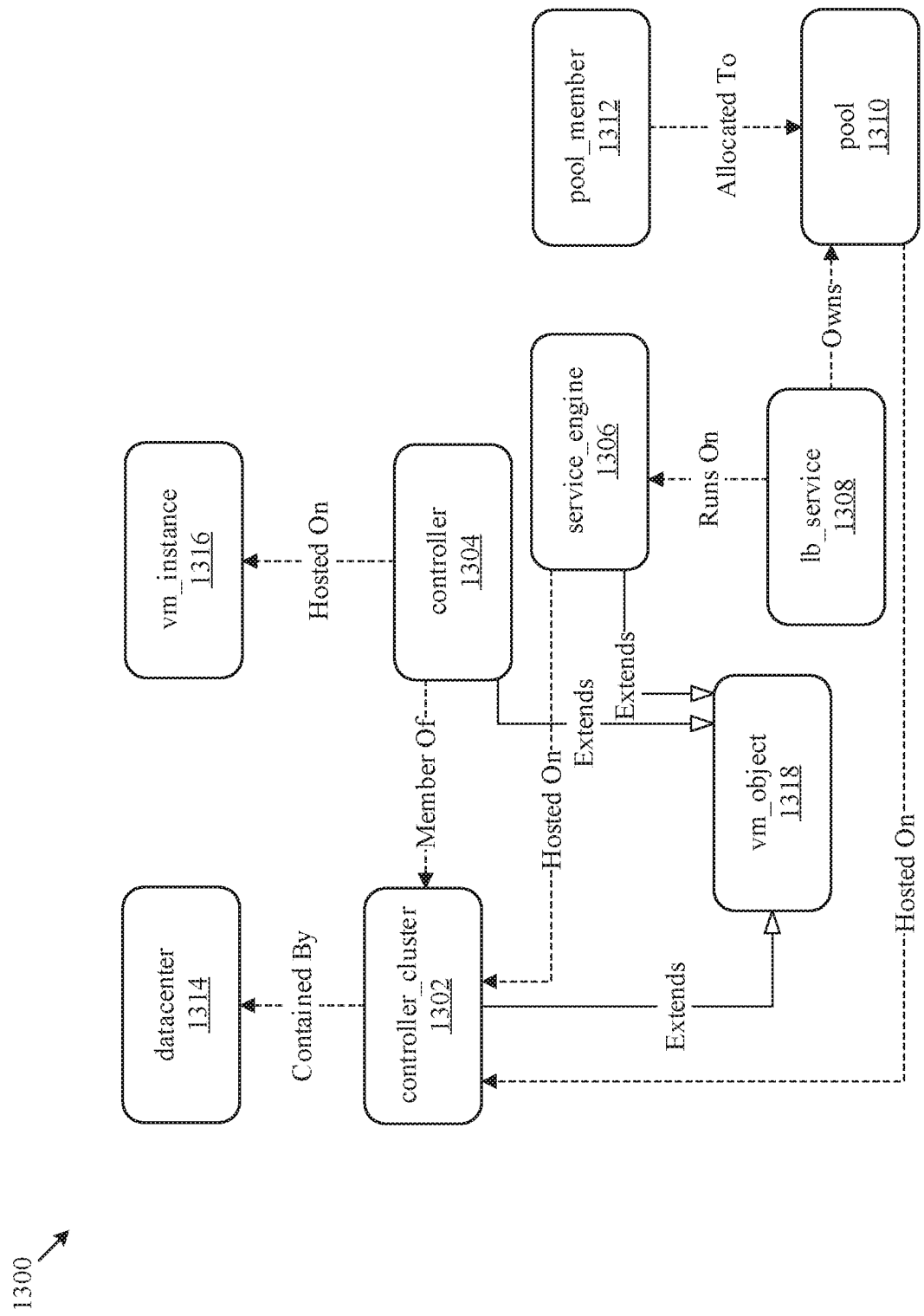
FIG. 13 is a diagram that illustrates a class model associated with discovered resources, in accordance with example embodiments.

FIG. 13 is a diagram that illustrates a class model associated with discovered resources of the application load balancer of FIG. 11, in accordance with example embodiments. FIG. 13 is explained in conjunction with elements from FIG. 11 and FIG. 12. With reference to FIG. 13, there is shown a plurality of classes of a class model 1300 associated with the resources (associated with the application load balancer 1108 of FIG. 11). In FIG. 13, there is further shown relationships among the classes of the class model 1300. The class model 1300 is merely shown as an example and should not be construed as limiting for the disclosure.

The class model 1300 may include a first class 1302 associated with the controller cluster 1120, a second class 1304 associated with a controller of the controller cluster 1120, and a third class 1306 associated with a service engine. The class model 1300 may further include a fourth class 1308 associated with a LB service, a fifth class 1310 associated with an LB pool, and a sixth class 1312 associated with an LB pool member. The controller cluster 1120, the controller, the service engine, the LB service, the LB pool, and the LB pool member may be referred to as the resources associated with the application load balancer 1108. For example, as shown, the first class 1302 may be a "controller_cluster" class, the second class 1304 may be a "controller" class, and the third class 1306 may be a "service engine" class. Further, the fourth class 1308 may be a "lb_service" class, the fifth class 1310 may be a "pool" class, and the sixth class 1312 may be a "pool_member" class. In addition, the class model 1300 may further include a "datacenter" class 1314, a "vm_instance" class 1316, and a "vm_object" class 1318.

As shown, the first class 1302 (i.e., "controller_cluster") may be contained by the "datacenter" class 1314 and may extend the "vm_object" class 1318. The second class 1304 (i.e., "controller") may be a member of the first class 1302, may be hosted on the "vm_instance" class 1316, and may also extend the "vm_object" class 1318. The third class 1306 (i.e., "service_engine") may be hosted on the first class 1302 and may also extend the "vm_object" class 1318. The "lb_service" class may run on the third class 1306 and may own the "pool" class, which may be hosted on the first class 1302. The "pool_member" class may be allocated to the "pool" class In an embodiment, the controller cluster 1120 may be implemented on datacenters or VMs associated with the VMware® infrastructure. The first class 1302, the second class 1304, and the third class 1306 may be independent classes of the class model 1300. Specifically, the first class 1302, the second class 1304, and the third class 1306 may not require the discovery of the underlying VMware® infrastructure to populate values of objects in such classes.

Each of the classes of the class model 1300 may have an associated CI in the CMDB 1118 to store data associated with objects of the respective class. For each CI, such data may include attributes of a respective resource and relations of the respective CI with other CIs in the CMDB 1118. As an example, information related to the controller (e.g., the main controller) of the application load balancer 1108 may be stored in the CI "controller" (which may be a main CI and may be associated with the second class 1304). Exemplary attributes of the CI "controller" are presented in Table 38, as follows:

TABLE 38

Exemplary attributes of the "controller" CI table

| CI table attributes | Definition of attributes |
|---|---|
| name | Name of the load balancer controller |
| fqdn (Fully Qualified Domain Name) | Host name of the virtual machine (VM) |
| ip_address | IP address of the FQDN |

An example of a relations table for the CI "controller" is presented in Table 39:

TABLE 39

Relations table for the CI "controller"

| Parent | Child | Relation Type |
|---|---|---|
| controller_cluster | controller | Cluster of::Cluster |
| controller | service_engine | Contains::Contained by |

As another example, information related to a service engine of the application load balancer 1108 may be stored in the CI "service engine" (which may be associated with the third class 1306). Exemplary attributes of the CI "service engine" are presented in Table 40, as follows:

TABLE 40

Exemplary attributes of the "service_engine" CI table

| CI attributes | Definition of attributes |
|---|---|
| name | Name of the Service engine |
| ip_address | IP address of the Service engine |
| version | A version of the Service engine |
| object_id | UUID of the Service engine |

An example of a relations table for the CI "service engine" is presented in Table 41, as follows:

TABLE 41

Relations table for the CI "service_engine"

| Parent | Child | Relation Type |
|---|---|---|
| service_engine | controller_cluster | Hosted on::Hosts |
| controller | service_engine | Contains::Contained by |
| lb_service | service_engine | Used by::Uses |

As another example, information related to the controller cluster 1120 of the application load balancer 1108 may be stored in the CI "controller_cluster" (which may be associated with the first class 1302). Exemplary attributes of the CI "controller_cluster" are presented in Table 42, as follows:

TABLE 42

Exemplary attributes of the CI "controller_cluster"

| CI attributes | Definition of attributes |
|---|---|
| cluster_id | UUID of the controller cluster 1120 |
| name | Name of the controller cluster 1120 |
| ip_address | IP address of the host of the controller cluster 1120 |

An exemplary relations table for the CI "controller_cluster" is presented in Table 43, as follows:

TABLE 43

Relations table for the CI "controller_cluster"

| Parent | Child | Relation Type |
|---|---|---|
| controller_cluster | controller | Cluster of::Cluster |
| pool | controller_cluster | Hosted on::Hosts |
| service_engine | controller_cluster | Hosted on::Hosts |
| lb_service | controller_cluster | Runs on::Runs |
| pool_member | controller_cluster | Reference only |

As another example, information related to an LB pool of the application load balancer 1108 may be stored in the CI "pool" (which may be associated with the fifth class 1310). Exemplary attributes of the CI "pool" are presented in Table 44, as follows:

TABLE 44

Exemplary attributes of the CI "pool"

| CI attributes | Definition of attributes |
|---|---|
| name | Name of the LB pool |
| server_id | UUID of LB pool |
| load_balancing_method | Method that may be used to make load balancing decision. The discovery pattern may translate the algorithms as follows: "LB_ALGORITHM_LEAST_CONNECTIONS": "least-connections", "LB_ALGORITHM_ROUND_ROBIN": "round-robin", "LB_ALGORITHM_FASTEST_RESPONSE": "fastest-response", "LB_ALGORITHM_CONSISTENT_HASH": "consistent-hash", "LB_ALGORITHM_LEAST_LOAD": "least-load", "LB_ALGORITHM_FEWEST_SERVERS": "fewest-servers", "LB_ALGORITHM_RANDOM": "random", "LB_ALGORITHM_FEWEST_TASKS": "fewest-tasks", "LB_ALGORITHM_NEAREST_SERVER": "nearest-server". |

An example of a relations table for the CI "pool" is presented in Table 45, as follows:

TABLE 45

Relations table for the CI "pool"

| Parent | Child | Relation Type |
|---|---|---|
| pool | lb_service | Used by::Uses |
| pool | controller_cluster | Hosted on::Hosts |
| pool | pool_member | Owns::Owned by |

As another example, information related to an LB pool member of the application load balancer 1108 may be stored in the CI "pool_member" (which may be associated with the sixth class 1312). Exemplary attributes of the CI "pool_member" are presented in Table 46, as follows:

TABLE 46

Exemplary attributes of the CI "pool_member"

| CI attributes | Definition of attributes |
|---|---|
| name | Name of the LB pool member @ name of the LB pool |
| ip_address | IP address of the host of the LB pool member |

An example of a relations table for the CI "pool_member" is presented in Table 47, as follows:

TABLE 47

Relations table for the CI "pool_member"

| Parent | Child | Relation Type |
|---|---|---|
| pool | pool_member | Owns::Owned by |

As another example, information related to an LB service of the application load balancer 1108 may be stored in the CI "lb_service" (which may be associated with the fourth class 1308). Exemplary attributes of the CI "lb_service" are presented in Table 48, as follows:

TABLE 48

Exemplary attributes of the CI "lb_service"

| CI attributes | Definition of attributes |
|---|---|
| name | Virtual IP (VIP) name |
| ip_address | IP address of the VIP |
| object_id | UUID of the VIP |
| port | Port of the host VM |

An example of a relations table for the CI "lb_service" is presented in Table 49, as follows:

TABLE 49

Relations table for the CI "lb_service"

| Parent | Child | Relation Type |
|---|---|---|
| pool | lb_service | Used by::Uses |
| lb_service | service_engine | Used by::Uses |

Figure 14:
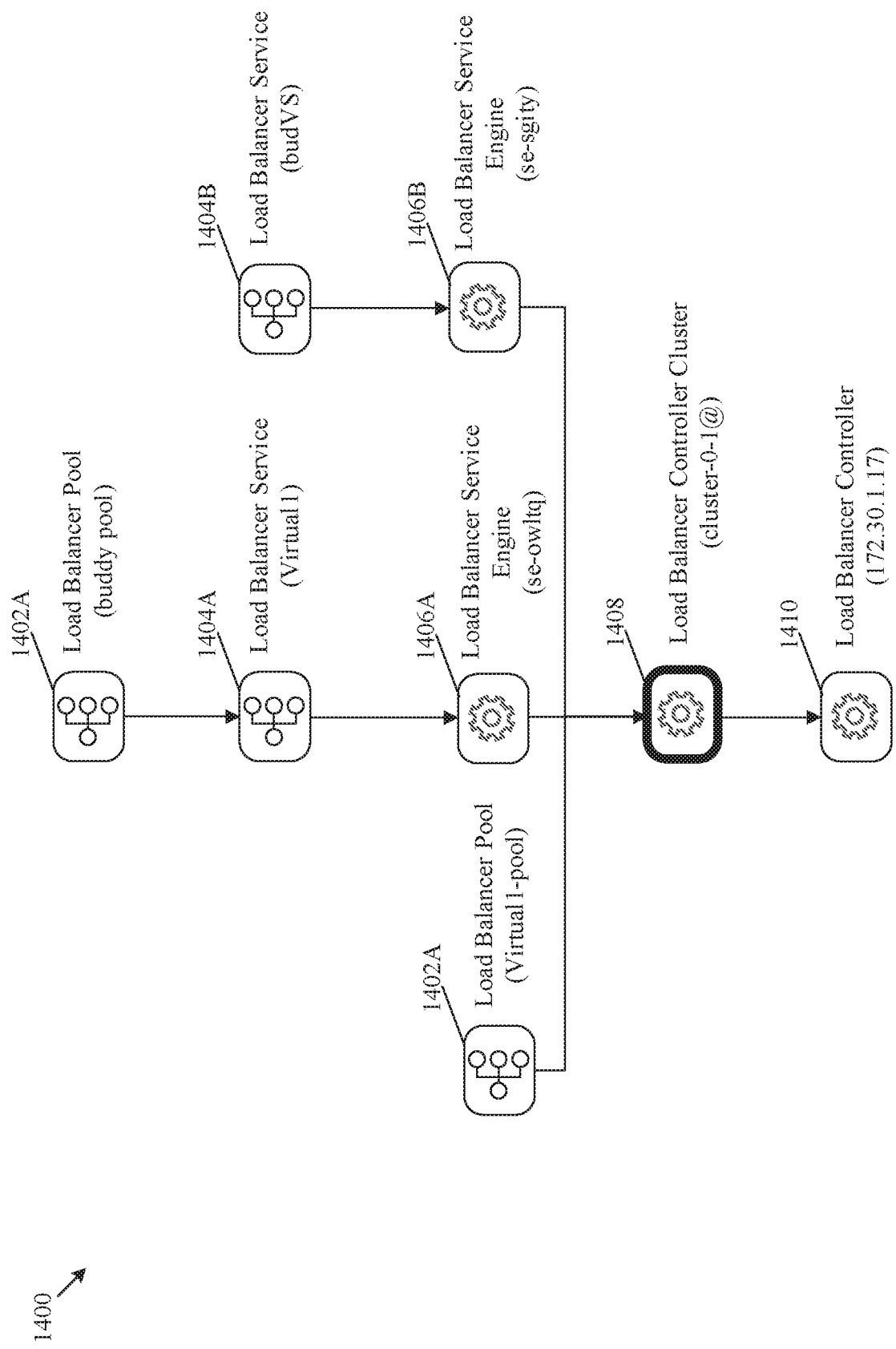
FIG. 14 is a diagram that illustrates exemplary relationships among various discovered resources associated with the application load balancer of FIG. 11, in accordance with example embodiments.

An example of relationships among the various discovered resources associated with the application load balancer 1108 is explained further, for example, in FIG. 14.

FIG. 14 is a diagram that illustrates exemplary relationships among various discovered resources associated with the application load balancer of FIG. 11, in accordance with example embodiments. FIG. 14 is described in conjunction with elements from FIG. 11, FIG. 12, and FIG. 13. With reference to FIG. 14, there is shown a diagram 1400. The diagram 1400 depicts an exemplary relationship between discovered resources associated with the application load balancer 1108. The exemplary relationship of the diagram 1400 is merely shown as an example and should not be construed as limiting for the disclosure.

In FIG. 14, there is shown a Load Balancer Pool 1402A (i.e., an LB pool, e.g., "buddy pool") associated with a Load Balancer Service 1404A (i.e., an LB service, e.g., "Virtual 1"). The Load Balancer service 1404A (i.e. an LB service, e.g., "Virtual 1") may be associated with a Load Balancer Service Engine 1406A (such as, "se-owltq"). In FIG. 14, there is further shown a Load Balancer Service 1404B (i.e., an LB service, e.g., "budVS") associated with a Load Balancer Service Engine 1406B (such as, "se-sgity"). There is further shown a Load Balancer Pool 1402B (i.e., an LB pool, e.g., "Virtual1-pool"), which along with the two Load Balancer Service Engines 1406A and 1406B (i.e., "se-owltq" and "se-sgity") may be associated with a Load Balancer Controller Cluster 1408 (such as, "cluster-0-1@"). The Load Balancer Controller Cluster 1408 (e.g., "cluster-0-1@") may be associated with a Load Balancer Controller 1410 that may be associated with an IP address (such as, "172.30.1.17").

Figure 15:
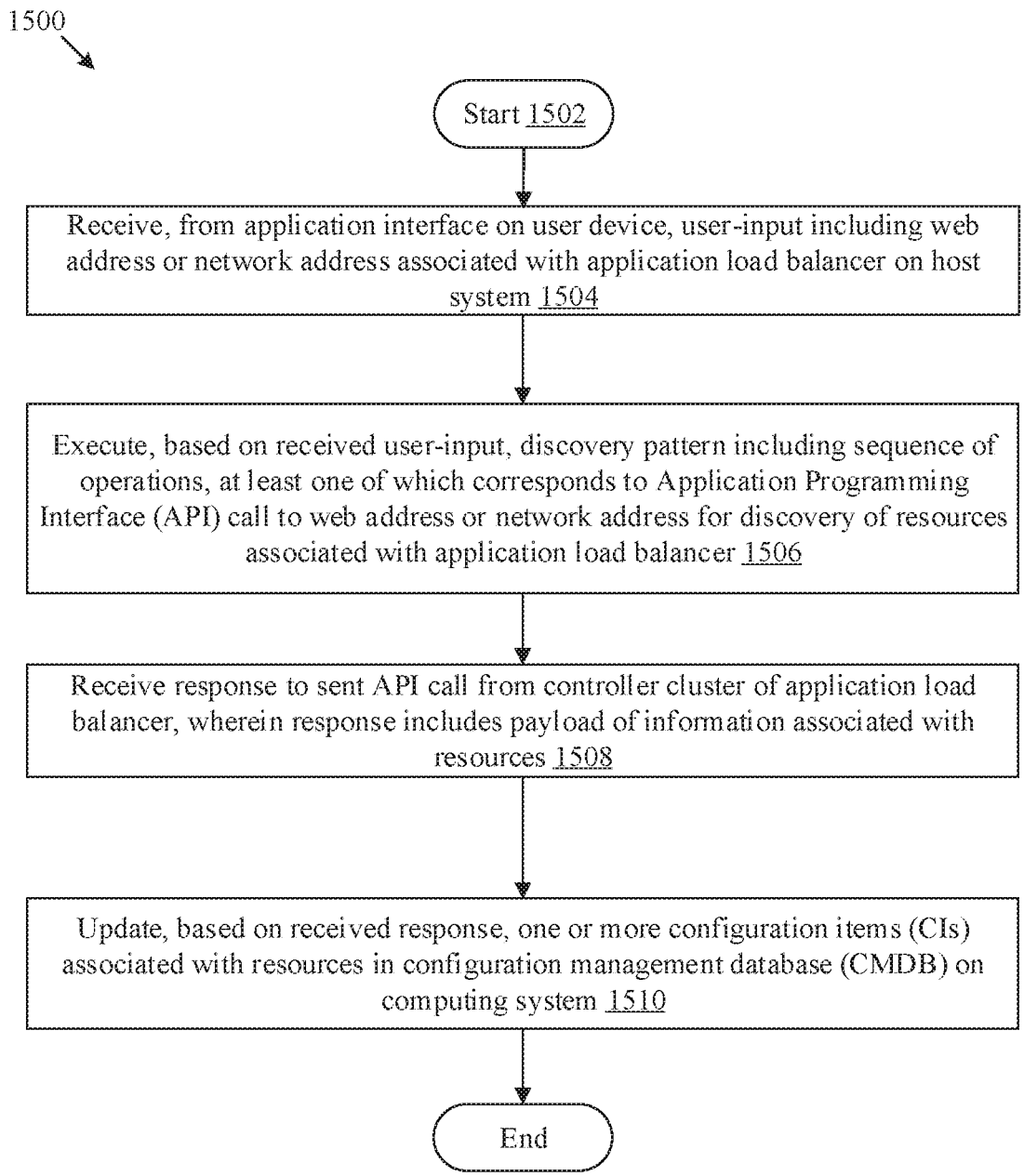
FIG. 15 is a flow chart that illustrates a method of discovering resources associated with the application load balancer of FIG. 11, in accordance with example embodiments.

FIG. 15 is a flow chart that illustrates a method of discovering resources associated with the application load balancer of FIG. 11, in accordance with example embodiments. FIG. 15 is explained in conjunction with elements from FIGS. 11, 12, 13, and 14. With reference to FIG. 15, there is shown a flowchart 1500. The exemplary method of flowchart 1500 may be executed by any computing system, for example, the computing system 1102 of FIG. 11 or FIG. 12. The exemplary method of the flowchart 1500 may start at 1502 and proceed to 1504.

At 1504, a user input may be received from the application interface 1104A (i.e. an instance) on the user device 1104. In an embodiment, the discovery application 1114 on the computing system 1102 may be configured to receive the user input. The user input may be associated with the discovery of resources associated with the application load balancer 1108. The user input may include a web address, or a network address associated with the application load balancer 1108. For example, the user input may include an IP address of a management console or a controller cluster 1120 of the application load balancer 1108. The reception of the user input is explained further, for example, in FIG. 11.

At 1506, a discovery pattern may be executed based on the user input. In an embodiment, the discovery application 1114 may be configured to execute the discovery pattern through the discovery server 1116. The discovery pattern may include a sequence of operations for the discovery of resources. At least one of the sequence of operations may correspond to an API call to the web address or the network address. For example, the API call may be sent to the IP address of the controller cluster 1120 of the application load balancer 1108. The execution of the discovery pattern is explained further, for example, in FIG. 11.

At 1508, a response to the sent API call may be received from the application load balancer 1108. In an embodiment, the discovery application 1114 may be configured to receive the response to the sent API call. The response may include a payload of information associated with the discovered resources (associated with the application load balancer 1108). In an embodiment, the discovery application 1114 may be configured to parse the received response to determine the information about the resources associated with application load balancer 1108. The reception and parsing of the response are explained further, for example, in FIG. 11.

At 1510, one or more CIs associated with the resources may be updated on the CMDB 1118 based on the received response. In an embodiment, based on the received (or parsed) response, the discovery application 1114 may be configured to update the one or more CIs associated with the discovered resources on the CMDB 1118. Each configuration item may correspond to a logical representation of a resource associated with the application load balancer 1108. Each configuration item may represent a presence, a status, attributes of a respective resource, and relationships with other resources. As an example, the discovery application 1114 may store the extracted information (from the parsed response) in CI tables on the CMDB 1118. Examples of the CI tables are explained, for example, in FIG. 13. Control may pass to end.

Although the flowchart 1500 is illustrated as discrete operations, such as 1504, 1506, 1508, and 1510, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions executable by a machine and/or a computer to operate a computing system (e.g., the computing system 1102). The computer-executable instructions may cause the machine and/or computer to perform operations that may include receiving, from an application interface (such as, the application interface 1104A) on a user device (such as, the user device 1104), a user input associated with a discovery of resources associated with an application load balancer (such as, the application load balancer 1108). The user input may include a web address, or a network address associated with the application load balancer 1108 on a host system (such as, the host system 1106). Also, in some instances, the user input may include authentication credentials associated with the application load balancer 1108 and configuration of a cloud service account on a discovery server (such as, the discovery server 1116). The cloud service account may securely store such credentials and may later on provide such credentials for running a discovery pattern on the discovery server 1116. The operations may further include executing, based on the user input, a discovery pattern comprising a sequence of operations for the discovery of resources associated with the application load balancer 1108. The application load balancer 1108 may include a group of service engines (such as, the group of service engines 1122) and a controller cluster (such as, the controller cluster 1120) configured to manage the group of service engines 1122. The group of services engines 1122 may be configured to balance a load associated with incoming client requests to a pool of servers (such as, the pool of servers 1124) communicatively coupled to the host system 1106. At least one of the sequence of operations may correspond to an API call to the web address or the network address. The operations may further include receiving a response to the API call from the controller cluster 1120. The response may include payload information associated with the resources. The operations may further include updating, based on the received response, one or more configuration items (CIs) associated with the resources in a configuration management database (CMDB) (such as, the CMDB 1118).

Detailed description for a load balancer system discovery is provided herein. The load balancing system may be associated with resources that may be configured to perform tasks related to balancing of a load on pools of servers associated with the load balancing system. Such balancing may be performed based on pre-determined load-balancing algorithms. The load balancing system may support high availability and may be configured to distribute network traffic amongst the various back-end servers in its pool of servers. The load balancing system may distribute incoming requests evenly amongst the back-end servers by implementation of an inline mode. In the inline mode, the load balancing system may deploy a load balancer (LB) inline to a traffic flow to destination back-end servers. Incoming traffic may be received from an external client at a virtual Internal Protocol (VIP) address of the load balancer. The load balancer may function as a centralized service gateway for the incoming traffic and may perform a destination network address translation (NAT) on the incoming traffic. Based on the destination NAT, the destination IP address of each packet in the incoming traffic may be replaced from the VIP address to an IP address of a back-end server selected by the load balancer. The back-end server may generate outgoing packets as a reply to the received packets and may send the outgoing packets to the external client, via the load balancer. The load balancer may perform a source NAT on the outgoing packets and send the outgoing packets to the external client by inserting its VIP address as the source IP address of the outgoing packets.

Load balancing may optimize resource utilization, maximize throughput, minimize response time, and avoid overloads associated with running applications on the back-end servers of the load balancing system. In an embodiment, the load balancing system may support load balancing up to a layer 7 (i.e., an application layer) of the Open Systems Interconnection model (OSI model) of a computer networking system. Examples of the resources associated with the load balancing system may include, but are not limited to, a controller cluster, a controller in the controller cluster, a load balancer, a virtual server hosted on the load balancer, a LB pool, a, LB pool member, and a server health monitor.

The following described implementations may be found in the disclosed system and method for implementing a discovery of resources associated with the load balancing system, by use of a discovery application. The discovery application may be configured to receive a user input associated with discovery of the resources of the load balancing system. The user input may include a network address associated with the load balancing system. The load balancing system may include a group of load balancers (LBs) to balance load on associated pools of servers, and the cluster of controllers to manage the group of LBs. Each LB of the group of LBs may be hosted on a virtual server associated with the pool of servers. A server health monitor may be associated with each pool of servers and may be configured to monitor an operational status of the pool of servers. Through the discovery server, the discovery application may execute a discovery pattern which includes a sequence of operations for the discovery. The discovery pattern may be executed based on the received user input. At least one of the sequence of operations may correspond to an Application Programming Interface (API) call to the network address (for example, an IP address of the controller cluster associated with the load balancing system). Through the discovery server, the discovery application may receive a response to the API call from the controller cluster and may update one or more configuration items (CIs) in a configuration management database (CMDB) based on the received response.

The discovery of the resources of the load balancing system may provide statistics related to the resources being used behind the scene by the load balancing system. The resources may be used to handle incoming client requests from application services of various client applications and to route such requests to servers in the pool to balance a load on such application services and the pool of servers. The statistics may be used to deploy additional resources (such as, LB pools or load balancers) or remove unneeded resources. The discovery may also provide diagnostic information associated with the resources. The diagnostic information may be used to identify faulty resources (e.g., LB pools or load balancers) and replace (or remove) the identified faulty resources associated with the load balancing system.

Figure 16:
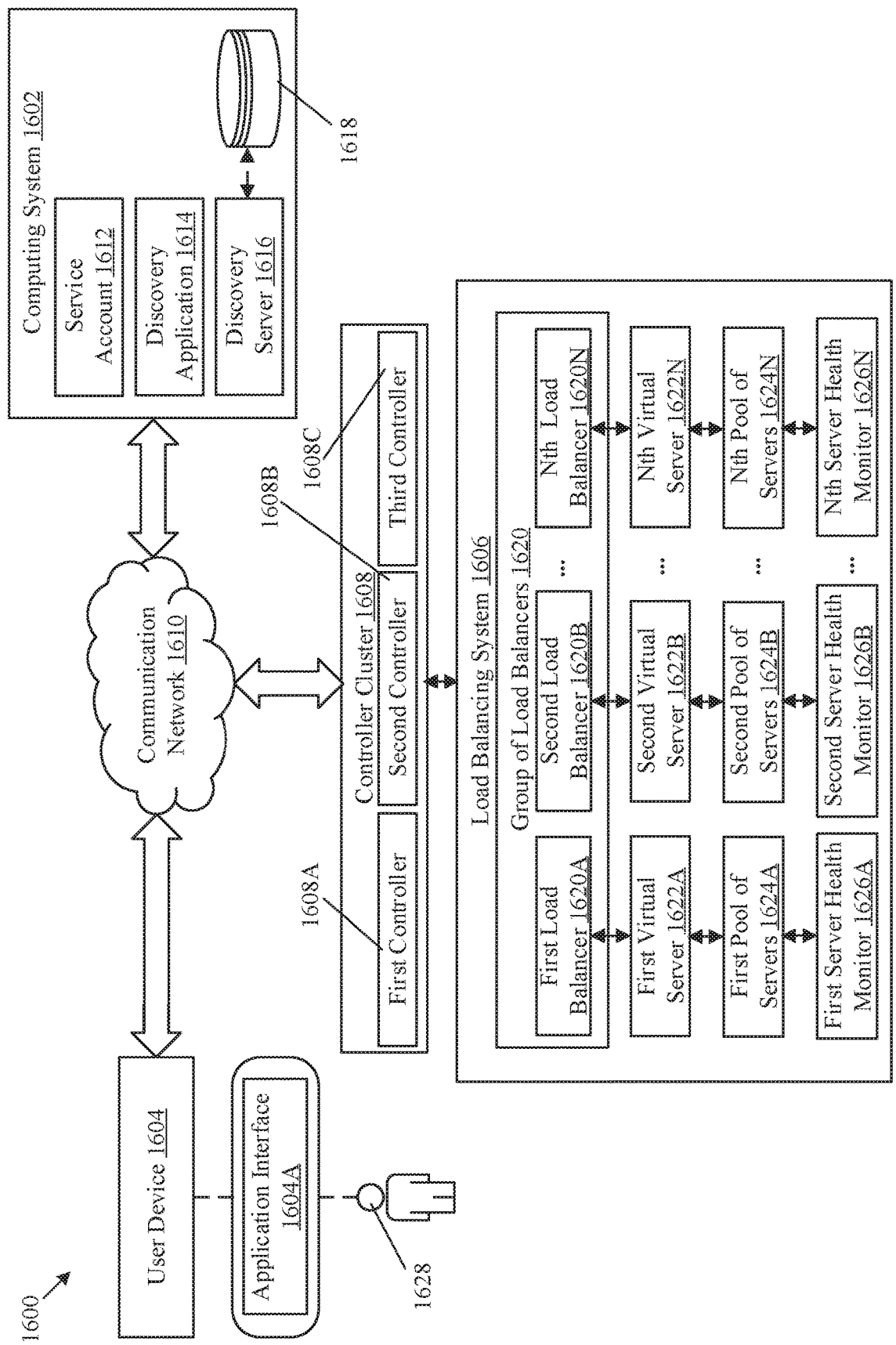
FIG. 16 illustrates an exemplary network environment for discovery of resources associated with a load balancing system, in accordance with example embodiments.

FIG. 16 illustrates an exemplary network environment for discovery of resources associated with a load balancing system, in accordance with example embodiments. With reference to FIG. 16, there is shown a block diagram of a network environment 1600 that includes a computing system 1602, a user device 1604, a load balancing system 1606, and a controller cluster 1608. The computing system 1602 may be communicatively coupled to the user device 1604 and the controller cluster 1608, via a communication network 1610. The computing system 1602 may include a service account 1612, a discovery application 1614, a discovery server 1616, and a configuration management database (CMDB) 1618, which may be managed by the discovery application 1614. The load balancing system 1606 may include a group of load balancers 1620 that may include a first load balancer 1620A, a second load balancer 1620B, . . . and an Nth load balancer 1620N. The load balancer system 1606 may further include a group of virtual servers that may include a first virtual server 1622A, a second virtual server 1622B, . . . and an Nth virtual server 1622N. The load balancing system 1606 may further include one or more pools of servers that may include a first pool of servers 1624A, a second pool of servers 1624B, . . . and an Nth pool of servers 1624N. Further, the load balancing system 1606 may include a group of server health monitors that may include a first server health monitor 1626A, a second server health monitor 1626B, . . . and an Nth server health monitor 1626N. The user device 1604 may include an application interface 1604A that may be accessible to a user 1628, such as an Information Technology (IT) admin.

The controller cluster 1608 may include a cluster of controllers, such as a first controller 1608A, a second controller 1608B, and a third controller 1608C. The cluster of controllers may include a master or main controller, such as the first controller 1608A. The controller cluster 1608

(through the master controller) may manage and control the resources of the load balancing system 1606 and implement a control plane associated with the load balancing system 1606. A controller (e.g., the main controller, such as the first controller 1608A) may configure multicast traffic on network devices of the load balancing system 1606, and may distribute Virtual Extensible Local Area Network (VXLAN) and logical routing information to host devices on which the group of virtual servers may be reside on. The controller (e.g., the first controller 1608A) may further maintain a VXLAN table, media access control (MAC) address table, and address resolution protocol (ARP) table associated with the resources of the load balancing system 1606.

For the sake of brevity, only three controllers have been shown as part of the controller cluster 1608 in FIG. 16. However, in some embodiments, there may be more than three controllers included in the controller cluster 1608, without limiting the scope of the disclosure.

The computing system 1602 may include suitable code, logic, circuitry and/or interfaces that may be configured to discover resources associated with the load balancing system 1606 and maintain the CMDB 1618. For example, based on credentials associated with the load balancing system 1606 in the service account 1612, the computing system 1602 may execute one or more discovery patterns to collect information associated with resources associated with the load balancing system 1606. The one or more discovery patterns may be executed by the discovery application 1614 on the computing system 1602 through the discovery server 1616. A discovery pattern may be referred to as a sequence of operations, which may allow the discovery application 1614 (and the discovery server 1616) to determine configuration items (CIs) to be updated based on collected information of the load balancing system 1606, credentials to use for accessing the load balancing system 1606 and tables to populate in the CMDB 1618. The computing system 1602 may be configured to store the collected information related to the resources in the CMDB 1618. Example implementations of the computing system 1602 may include, but are not limited to, an application server, a database server, a mainframe server, a cloud server (e.g., a hybrid, a private, or a public cloud), or a web server. In an embodiment, the computing system 1602 may be implemented as server nodes of an on-premise server.

The service account 1612 may include code, logic, circuitry, and/or interfaces that may be configured to store information of an account (e.g., a user account on the load balancing system 1606), including credentials necessary to access the account. A user may be required to create the service account 1612 before a discovery pattern is executed to collect information on resources associated with the load balancing system 1606. The service account 110 may securely store the information to be later used to execute the discovery pattern.

The discovery application 1614 may include code, logic, circuitry, and/or interfaces that may be configured to make use of the discovery server 1616 (also referred to as Management, Instrumentation, and Discovery (MID) Server) to discover and collect information associated with the resources of the load balancing system 1606. For example, through the discovery server 1616, the discovery application 1614 may be configured to discover resources associated with the load balancing system 1606. Such resources may be discovered by execution of a discovery pattern which includes a sequence of operations. By executing the discovery pattern, the discovery application 1614 may be querying the main controller (e.g., the first controller 1608A) through an Application Programming Interface (API) call to a network address associated with the load balancing system 1606. For example, the API call may be made to an Internet Protocol (IP) address of the main controller (such as the first controller 1608A)

Through the discovery server 1616, the discovery application 1614 may perform a discovery of the resources associated with the load balancing system 1606 by collecting a response to the API call from the main controller (such as the first controller 1608A). The discovery application 1614 may update one or more configuration items (CIs) associated with the discovered resources in the CMDB 1618 based on the response. Herein, the CIs may correspond to resources, such as a load balancer, a virtual server hosting on the load balancer, a pool of servers, one or more servers included in the pool of servers, or a server health monitor. In an embodiment, each CI may correspond to a logical representation of a resource, such that a presence, status, attributes of the resource and relationships with other resources is represented by the CIs. In an embodiment, the discovery application 1614 may be implemented as an agentless application, so that it may avoid the management complexity of having a permanent software installed on any computer, or device to be discovered.

The discovery server 1616 may include code, logic, circuitry, and/or interfaces that may be configured to facilitate communication and movement of data between the application interface 1604A (i.e., an instance) and external applications, data sources, and services. Multiple discovery servers, capable of handling thousands of devices each, may be deployed in different network segments to provide virtually unlimited scalability. The discovery server 1616 may be configured to execute the one or more discovery patterns (i.e. a sequence of operations for discovery of resources) for the discovery application 1614 and return results back to an associated instance (e.g., the application interface 1604A) for processing. In an embodiment, the discovery server 1616 may be configured to store the results including information associated with the discovered resources in the one or more CIs on the CMDB 1618. In some instances, the discovery server 1616 may use secure communication protocols (like HTTP-secure) to ensure all communications may be secure and initiated inside an enterprise's firewall. The discovery server 1616 may be implemented as an application (such as a Java application), which may run as a service or daemon on a server or a cluster node of the computing system 1602.

The CMDB 1618 may include code, logic, circuitry, and/or interfaces that may be configured to store information about resources associated with the load balancing system 1606. The CMDB 116 may be a database in which the information for each resource may be stored in a configuration item (CI) specific to that resource. The discovery application 1614, through the discovery server 1616, may collect the information associated with the resources and may update the respective CIs in the CMDB 1618. Example implementations of the CMDB 1618 may include, but are not limited to, a database server, a file server, a mainframe server, a cloud server, a storage device (e.g., a Redundant Array of Independent Disks (RAID) device), or any other computing device with data storage capability.

The CMDB 1618, and data and instructions associated with the discovery application 1614 may be stored in the persistent data storage of the computing system 1602. For example, the persistent data storage may be installed on the same node or cluster on which the discovery server 1616 may be hosted. The persistent data storage may include computer-readable storage media for carrying or having computer-executable instructions or data structures stored thereon. Such computer-readable storage media may include any available media that may be accessed by a general-purpose or special-purpose computer, such as a processor.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or a special-purpose computer. Combinations of the above may also be included within the scope of computer-readable storage media. Computer-executable instructions may include, for example, instructions and data configured to cause the processor to perform a certain operation or group of operations associated with the discovery server 1616.

The user device 1604 may host the application interface 1604A (also referred to as an instance) that may be configured to receive a user input (such as from a discovery admin). The user device 1604 may be configured to receive the user input associated with the discovery of resources associated with the load balancing system 1606. After the discovery is performed, the user device 1604 may be further configured to display a result of the discovery on a display device of the user device 1604. Examples of the user device 1604 may include, but are not limited to, a workstation, a server, a cluster of servers with a management panel, a laptop, a tablet, an internet-enabled device, a desktop computer, or any portable or non-portable device with a networking and display capability.

The application interface 1604A (also referred to as an Instance) may be implemented as an client-side application for a specific group of users who may access the application interface 1604A through a web client (such as a web browser) and a URL which may be customizable for the group of users. The application interface 1604A may host several applications and services, one or more of which may be associated with resource discovery. The application interface 1604A may support role-based access to different applications or services on the application interface 1604A. For example, one of the group of users may be a discovery admin who may be allowed to configure a discovery schedule for a discovery of resources associated with the load balancing system 1606.

The load balancing system 1606 may be associated with resources that may be configured to perform tasks related to balancing of a load associated with pools of servers based on determined load-balancing algorithms. The load balancing system 1606 may support high availability and may be configured to distribute network traffic amongst various back-end servers in the pools of servers. The load balancing system 1606 may distribute incoming requests evenly amongst the back-end servers by implementation of an inline mode. In the inline mode, the load balancing system 1606 may deploy a load balancer (LB) inline to a traffic flow to destination back-end servers. Incoming traffic may be received from an external client at a virtual Internal Protocol (VIP) address of the load balancer. The load balancer may function as a centralized service gateway for the incoming traffic and may perform a destination network address translation (NAT) on the incoming traffic. Based on the destination NAT, the destination IP address of each packet in the incoming traffic may be replaced from the VIP address to an IP address of a back-end server selected by the load balancer. The back-end server may generate outgoing packets as a reply to the received packets and may send the outgoing packets to the external client, via the load balancer. The load balancer may perform a source NAT on the outgoing packets and send the outgoing packets to the external client by inserting its VIP address as the source IP address of the outgoing packets.

Load balancing may optimize resource utilization, maximize throughput, minimize response time, and avoid overloads associated with running applications on the back-end servers. In an embodiment, the load balancing system 1606 may support load balancing up to a layer 7 (i.e., an application layer) of the Open Systems Interconnection model (OSI model). Examples of the resources associated with the load balancing system 1606 may include, but are not limited to, a load balancer, a group of virtual machines hosting the load balancer, an LB pool, a, LB pool member, or a server health monitor. In an exemplary embodiment, the load balancing system 1606 may be an NSX Edge® load balancer platform.

The load balancing system 1606 may include the group of load balancers 1620 communicatively coupled to the controller cluster 1608, and the group of virtual servers. Each of the group of load balancers may host a virtual server, which may be associated with a pool of servers. Each server of the pool may be associated with a server health monitor.

The group of load balancers 1620 may include the first load balancer 1620A, the second load balancer 1620B, . . . and the Nth load balancer 1620N. The first load balancer 1620A may host the first virtual server 1622A, the second load balancer 1620B may host the second virtual server 1622B, . . . and the Nth load balancer 1620N may host the Nth virtual server 1622N. The first virtual server 1622A may be associated with the first pool of servers 1624A, the second virtual server 1622B may be associated with the second pool of servers 1624B, . . . and the Nth virtual server 1622N may be associated with the Nth pool of servers 1624N. The first pool of servers 1624A may be associated with the first server health monitor 1626A, the second pool of servers 1624B may be associated with the second server health monitor 1626B, . . . and the Nth pool of servers 1624N may be associated with the Nth server health monitor 1626N.

The N number of load balancers, N number of virtual servers, N number of pool of servers, and N number of server health monitors shown in FIG. 16 are presented merely as examples. The exemplary network environment 1600 may include one or more than N number(s) of load balancers, virtual servers, pool of servers, and server health monitors, each, without a deviation from the scope of the disclosure.

In an embodiment, the controller cluster 1608 may include a main or master controller (for example, the first controller 1608A). The remaining of the plurality of controllers (e.g., secondary or slave controllers) in controller cluster 1608 may provide high availability to the main controller. The main controller (e.g., the first controller 1608A) may be a central point of management and control (e.g., a control plane) for the load balancing system 1606. Further, the main controller may host Representation State Transfer (REST) APIs to enable discovery and monitoring of the resources associated with the load balancing system 1606. The controllers may send commands and instructions, for example, configuration changes, to the individual load balancers. In an embodiment, each controller in the controller cluster 1608 may be hosted on one of, but not limited to, a commodity (x86) server, a virtual machine, or a container.

Each load balancer (e.g., the first load balancer 1620A) in the group of load balancers 1620 may be configured to receive and execute instructions from the controller (e.g., the first controller 1608A) and may implement a data plane of the load balancing system 1606. The load balancer may support both packet-based (layer 4) and socket-based (layer 7) load balancing to avoid distributed denial of service (DDOS) attacks on the back-end servers. The packet-based load balancing may be implemented on a TCP and UDP layer. Using the packet-based load balancing, the load balancer may send a packet directly to a selected back-end server after manipulation (e.g., destination NAT) of the packet. The load balancer may maintain the TCP and UDP layer sessions such that packets of a single session may be communicated to the same back-end server. The load balancer may implement the socket-based load balancing over a socket interface. For the socket-based load balancing, the load balancer may establish two connections for each single request, including a first connection that may face the external client and a second connection that may face a back-end server. After the load balancer selects a back-end server from the pool of servers to handle the request, the load balancer may establish the second connection with a back-end server.

Each virtual server (e.g., the first virtual server 1622A) may be an abstraction of an application service (also referred herein as an LB service resource) configured to perform load balancing tasks associated with the load balancing system 1606. The application service may be represented by a combination of an IP address, a port number, a communication protocol, and an application profile, such as TCP or UDP. The application profile may represent a TCP, UDP, persistence, and certificate configuration for a given application service. The load balancer may also include an application rule, including settings for traffic manipulation, such as matching of a Uniform Resource Locators (URLs) or host name to a pool of servers (such as the first pool of servers 1624A). The application rule may enable the load balancer to support layer 7 load balancing features, such as, but not limited to, content switching, header manipulation, security rules, and DOS protection.

Each pool of servers (e.g., the first pool of servers 1624A) may include a set of back-end servers of a corresponding load balancer (e.g., the first load balancer 1620A) that may be used by the load balancer to handle load balancing requests from clients. The load balancer (e.g., the first load balancer 1620A) may use a load balancing algorithm to select a back-end server from the pool of servers associated with the load balancer to handle each load balancing request received from the clients.

Each pool of servers (e.g., the first pool of servers 1624A) may include backend-resources, such as Bare-metal servers, Virtual Machines (VMs), cloud servers, containers, or a combination thereof, to handle application service load. Each server in the pool of servers may include suitable logic, circuitry, and interfaces, and/or code that may be configured to perform a certain computing task associated with an incoming client request (routed by an associated load balancer).

Though not shown in FIG. 16, the load balancing system 1606 may further include a management console interface. The management console interface may be a web-based user-interface that may provide a role-based access control (RBAC) to users. The management console interface may send REST API calls to the IP address of the main controller to control, manage, and monitor the applications and resources associated with the load balancing system 1606.

The communication network 1610 may represent a portion of the global Internet. However, the communication network 1610 may alternatively represent different types of network, such as a private wide-area or a local-area packet-switched network. The communication network 1610 may include a communication medium through which the computing system 1602, the user device 1604, and the controller cluster 1608 may communicate with each other. The communication network 1610 may be one of a wired connection or a wireless connection Examples of the communication network 1610 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 1600 may be configured to connect to the communication network 1610 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT)® communication protocols.

In operation, the discovery application 1614 may be configured to receive a user input via the application interface 1604A on the user device 1604. The user input may be associated with a discovery of resources associated with the load balancing system 1606. As an example, the user input may include an authentication credential of an account (e.g., a user account) associated with the discovery application 1614. Examples of values in the authentication credential may be as illustrated in Table 50:

TABLE 50

Example credentials of the account

| Credential Attributes | Exemplary values |
| --- | --- |
| Name of the credential | Load_bal_system |
| User-name | my_user |
| Password | password_123 |

With reference to Table 50, the authentication credential may include values of various credential attributes, such as a name of the credential (e.g., "Load_bal_system"), a user-name (e.g., "my_user") associated with the account, and a password (e.g., "password 123") for the account. To enable the user 1628 to request for the discovery, the discovery application 1614 may require a basic authentication for the user account. The basic authentication may use the user-name and the password (included in the authentication credential) for the user account. Further, to allow the discovery application 1614 to use the basic authentication and access the load balancing system 1606 for the discovery, the load balancing system 1606 may be configured with appropriate settings through the management console interface of the load balancing system 1606. For example, through an administration settings page of the management console interface, a user input may be provided to the load balancing system 1606 to enable a basic authentication setting (e.g., by checking a check box "Allow Basic Authentication").

In an embodiment, the user input may include a network address associated with the load balancing system 1606. For example, the user input may include the network address as one of: an IP address of the main controller of the controller cluster 1608 or an IP address of the management console interface of the load balancing system 1606.

In an embodiment, the user input may include account information for creation and configuration of the service account 1612 on the computing system 1602. Based on the account information in the user input, the computing system 1602 may create the service account 1612 may and configure the created service account 1612 to include attributes, such as the credentials (as represented by Load_bal_system) of Table 50 and an IP address of a controller (such as a main controller or the first controller 1608A) of the load balancing system 1606. An example of values that may be included in information associated with the service account 1612 is presented in Table 51:

TABLE 51

Exemplary values of service account attributes

| Service account Attributes | Exemplary values |
|---|---|
| Name of the service account 1612 | Load_bal_system Service account |
| IP Address | 192.168.1.1 |
| Discovery credentials | Load_bal_system |

With reference to Table 51, the information associated with the service account 1612 may include various service account attributes, such as a name of the service account 1612 (e.g., "Load_bal_system Service account") and an IP Address (such as "192.168.1.1" of the main controller of the load balancing system 1606). In addition, the service account attributes may include discovery credentials (e.g., "Load_bal_system"), which may be provided in the user input (as shown in Table 50).

To perform the discovery of resources associated with the load balancing system 1606, sufficient permissions may be provided to the user account to send a set of API queries to the network address associated with the load balancing system 1606. For example, the set of API queries may be sent via the discovery server 1616 to the IP address of the main controller or the IP address of the management console interface. The set of API queries may include, but are not limited to, "/api/4.0/edges", and "/api/4.0/edges/<edge_id>loadbalancer/config".

In one or more embodiments, the user input may also include a user-selection (via the user device 1604) of an option to create a discovery schedule for the discovery of resources associated with the load balancing system 1606. For example, such an option may be presented after the service account 1612 is created. Through the discovery server 1616, the discovery application 1614 may be configured to set a discovery schedule for the discovery of resources associated with the load balancing system 1606. The discovery schedule may be set based on the received user input. Information associated with discovery schedule may specify a set of resources or resource types to be searched (i.e. CIs to be updated in the CMDB 1618) and a time schedule during which the discovery may be executed. In one scenario, the discovery schedule may also select one discovery server or multiple discovery servers for the discovery. Based on the user input, the discovery may be scheduled to execute on a regular basis, a recurring basis, or on an on-demand basis. In another scenario, the information associated with the discovery schedule may include a user selection of a quick discovery option. Based on such selection of the quick discovery option, a discovery operation may be performed immediately. The discovery application 1614 may create a discovery schedule for the load balancing system 1606 based on the user input (which also includes the selection of the quick discovery option). As an example, a quick discovery may be run on the IP address of the main controller (such as the first controller 1608A) of the load balancing system 1606 or the IP address of the management console interface of the load balancing system 1606. For example, the discovery may be an HTTP discovery that may be triggered against the main controller (e.g., the first controller 1608A). As an example, the HTTP discovery may be triggered only if a Secure Socket (SSH) discovery or a Simple Network Management Protocol (SNMP) discovery is unsuccessful. In such a case, there should not be a valid SSH or SNMP discovery against the main controller as it may prevent the HTTP discovery to run.

Through the discovery server 1616, the discovery application 1614 may be configured to execute a discovery pattern based on the user input (and/or the set discovery schedule). The discovery pattern may include a sequence of operations for the discovery of resources associated with the load balancing system 1606. At least one of the sequence of operations may correspond to an API call to the network address associated with the load balancing system 1606. For example, the API call may be made to the IP address of the controller (such as the main controller) of the controller cluster 1608.

In an embodiment, the sequence of operations may include a first set of operations to scan for the configuration items associated with the load balancing system 1606. As an example, the first set of operations may include probe and/or sensor-based instructions to determine open Internet Protocol (IP) address(es) and port(s) (e.g., Transmission Control Protocol (TCP) or User Datagram Protocol (UDP) ports) associated with the load balancing system 1606 to detect online devices and applications associated with the load balancing system 1606. As a result of the execution of the first set of operations, the discovery application 1614 may detect devices and applications associated with the load balancing system 1606 and create configuration items corresponding to such devices and applications. The sequence of operations may further include a second set of operations that may follow the first set of operations. The second set of operations may include classification of the detected devices and applications based on a determination of an Operating System (OS) version of the detected devices. For example, the second set of operations may include instructions to initiate a Secure Shell (SSH) connection with the detected device and retrieve the OS version from a predetermined file location on the device. The sequence of operations may further include a third set of operations that may follow the second set of operations. The third set of operations may include instructions to identify information related to the classified detected devices. Examples of such identified information may include, but is not limited to, basic input/output system (BIOS) information, serial numbers, network interface information, media access control address(es) assigned to the network interface(s), and IP address(es) associated with the device. The sequence of operations may further include a fourth set of operations that may follow the third set of operations. The fourth set of operations may include instructions to explore an operational state of the classified detected device. The operational state may include, but is not limited to, processor information, memory information, and information related to execution of processes or applications on the detected device.

The first set of operations may be referred to as operations of a scanning phase and the second set of operations may be referred to as operations of a classification phase of the discovery. The third set of operations may be referred to as operations of an identification phase and the fourth set of operations may be referred to as operations of an exploration phase of the discovery. The scenario where the discovery includes only the identification phase and the exploration phase may be referred to as a serverless discovery in which the resources (i.e., devices) may be pre-determined and the discovery application 1614 may directly discover applications hosted on the devices, while the discovery of the devices themselves through the scanning phase and the classification phase may be skipped. In certain scenarios, the discovery of resources associated with the load balancing system 1606 (e.g., the NSX Edge® load balancer platform) may be based on the serverless discovery process.

In an embodiment, the discovery pattern may correspond to the HTTP discovery. The HTTP discovery may be triggered by an "HTTP" classifier that may be a response to an "HTTP-Classify" probe. By use of the HTTP discovery, the discovery application 1614, through the discovery server 1616, may find devices (e.g., the first group of servers 1124A) that use the HTTP protocol. The HTTP discovery may use an HTTP port probe which the discovery application 1614 may run after unsuccessful execution of SSH and SNMP port probes. The HTTP port probe may launch the "HTTP-Classify" probe, which may generate an HTTP GET request for each record in a user configurable HTTP classification table. The HTTP port probe may use mappings between a protocol and a port number in an IP Service table (e.g., an "ip_service" CI table). The port-to-protocol definitions in the IP Service table may be user configurable with an option to override the protocol used for a specific HTTP classifier. The discovery application 1614 may run the discovery pattern through a HTTP or secure-HTTP (HTTPS) REST call. As an example, the discovery pattern may classify devices through the HTTP or HTTPS protocol.

In an embodiment, the discovery pattern may include one or more EVALs associated with certain operations of the discovery pattern. An EVAL may be a script-based code (e.g., a code written in JavaScript), such as a function or a method that may be executed to supplement or complement an operation of the discovery pattern. Example EVALs for the load balancing system 1606 may include, but are not limited to, the following:

1. A first EVAL that may be used to get an IP address from the "computer_system.managementIP" variable and make an "HTTP" call to get the resources associated with the load balancing system 1606. Herein, the HTTP call may be split into pages, each of which may get 100 resources.
2. A second EVAL that may be used to get the resources associated with the load balancing system 1606 and make HTTP calls to get the LB configuration for these resources.
3. A third EVAL that may be used to transform a Load Balancer Boolean status field to values matching the operational_status field possible values for the resources associated with the load balancing system 1606.
4. A fourth EVAL that may be used to create a hashMap that may store the names and object_ids associated with the resources of the load balancing system 1606. The hashMap may be used to store relationships between the different resources of the load balancing system 1606.
5. A fifth EVAL that may be used to get the name of a load balancer by its object_id.

Based on the execution of the discovery pattern, the discovery application 1614 may receive, through the discovery server 1616, a response to the sent API call from the main controller of the controller cluster 1608 or the management console interface of the load balancing system 1606. The response may include a payload of information associated with the resources of the load balancing system 1606. The payload of information associated with the response may be stored, for example, as a JSON key-value pair in a "context" field of an HTTP response to the API call.

In an embodiment, the discovery application 1614 may be configured to parse the received response corresponding to the API call to determine the information associated with the resources. In an embodiment, the discovery application 1614 may parse the received response (e.g., an HTTP response) to extract the "context" field of the HTTP response. In an example, the discovery application 1614 may parse the received response to extract JSON key-value pair values as the information associated with the resources. Based on the received response, the discovery application 1614 may be configured to update one or more CIs associated with the discovered resources on the CMDB 1618. Examples of the one or more CI tables are described further, for example, in FIG. 18.

Through the discovery server 1616, the discovery application 1614 may be configured to generate a class model associated with the discovered resources. The class model may be generated based on the updated one or more CIs. An example of the class model is explained further, for example, in FIG. 18.

Figure 17:
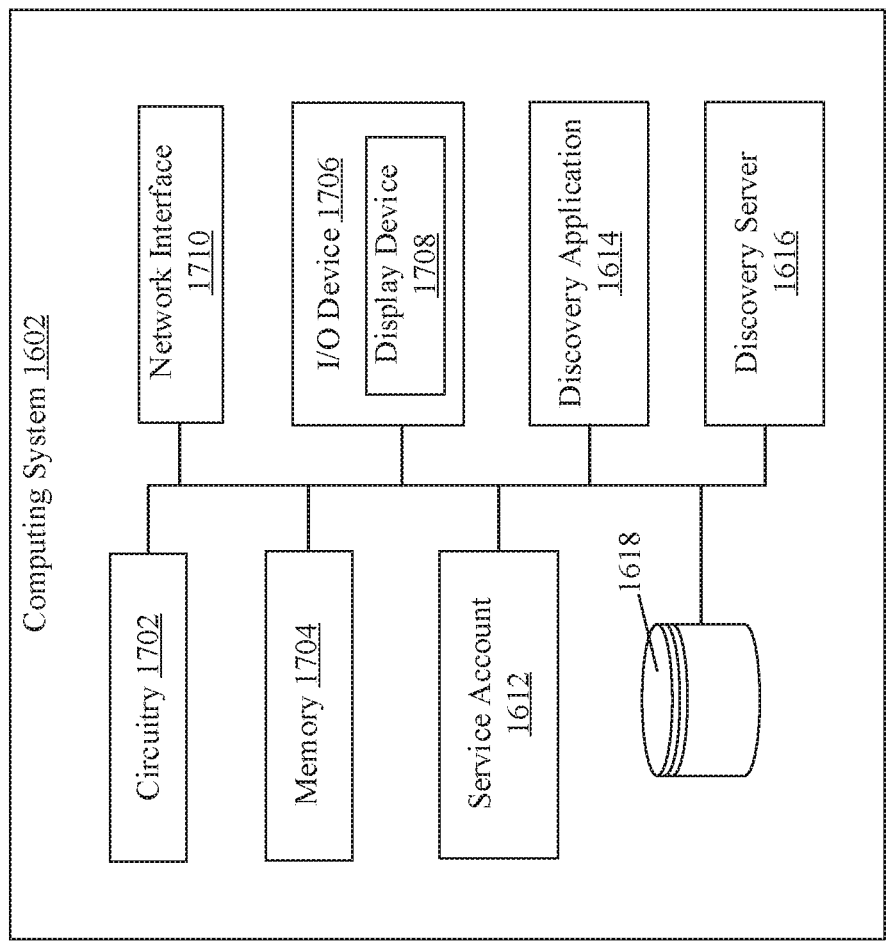
FIG. 17 is a block diagram of a system for implementing a discovery server for discovery of resources associated with a load balancing system, in accordance with an embodiment of the disclosure.

FIG. 17 is a block diagram of a system for implementing a discovery server for discovery of resources associated with a load balancing system, in accordance with an embodiment of the disclosure. FIG. 17 is explained in conjunction with elements from FIG. 16. With reference to FIG. 17, there is shown a block diagram 1700 of the computing system 1602. The computing system 1602 may include the service account 1612, the discovery application 1614, the discovery server 1616, and the CMDB 1618. The discovery server 1616 may be communicate with the discovery application 1614 and the CMDB 1618. The discovery application 1614 may be associated with the service account 1612.

The computing system 102 may also include circuitry 1702, a memory 1704, an input/output (I/O) device 1706, a display device 1708, and a network interface 1710. In some embodiments, the CMDB 1618 may be separate from the discovery server 1616 and may communicate with the discovery server 1616 via the network interface 1710. In some other embodiments, the memory 1704 may include the CMDB 1618.

The circuitry 1702 may include suitable logic, circuitry, interfaces, and/or code that may be configured to execute instructions for operations to be executed by the computing system 1602. Examples of implementation of the circuitry 1702 may include a Central Processing Unit (CPU), x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), co-processors, other processors, and/or a combination thereof.

The memory 1704 may include suitable logic, circuitry, code, and/or interfaces that may be configured to store the instructions executable by the circuitry 1702. In some embodiments, the memory 1704 may store the configuration items associated with the resources of load balancing system 1606. In such a case, the CMDB 1618 may be implemented as a database stored on the memory 1704. Examples of implementation of the memory 1704 may include, but are not limited to, Random Access Memory (RAM), Read Only Memory (ROM), Hard Disk Drive (HDD), Solid State Drive (SSD), and/or a Secure Digital (SD) card.

The I/O device 1706 may include suitable logic, circuitry, and/or interfaces that may be configured to receive an input and provide an output based on the received input. The I/O device 1706 may include various input and output devices, which may be configured to communicate with the circuitry 1702. Examples of the I/O device 1706 may include, but are not limited to, a touch screen, a keyboard, a mouse, a joystick, a display device (e.g., the display device 1708), a microphone, or a speaker.

The display device 1708 may include suitable logic, circuitry, and interfaces that may be configured to display output associated with the discovery server 1616. The display device 1708 may be a touch screen which may enable a user of the discovery server 1616 to provide a user-input via the display device 1708. The display device 1708 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 1708 may refer to a display screen of a head mounted device (HMD), a smart-glass device, a see-through display, a projection-based display, an electro-chromic display, or a transparent display.

The network interface 1710 may include suitable logic, circuitry, interfaces, and/or code that may be configured to enable communication among the controller cluster 1608 and different operational components, such as the discovery server 1616, the CMDB 1618, and the discovery application 1614 of computing system 1602, via one or more communication networks. The network interface 1710 may implement known technologies to support wired or wireless communication with the one or more communication networks.

The network interface 1710 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 1710 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

Similar to the computing system 1602, the user device 1604 (though not shown in FIG. 17) may include one or more components, including, but not limited to, circuitry, a memory, a I/O device, a display device, and a network interface with similar functions. The functions or operations executed by the discovery application 1614 and the discovery server 1616, as described in FIGS. 16, 18, 19, 20, and 21, may be performed by the circuitry 1702. Operations executed by the circuitry 1702 are described in detail, for example, in FIGS. 16, 18, 19, 20, and 21.

Figure 18:
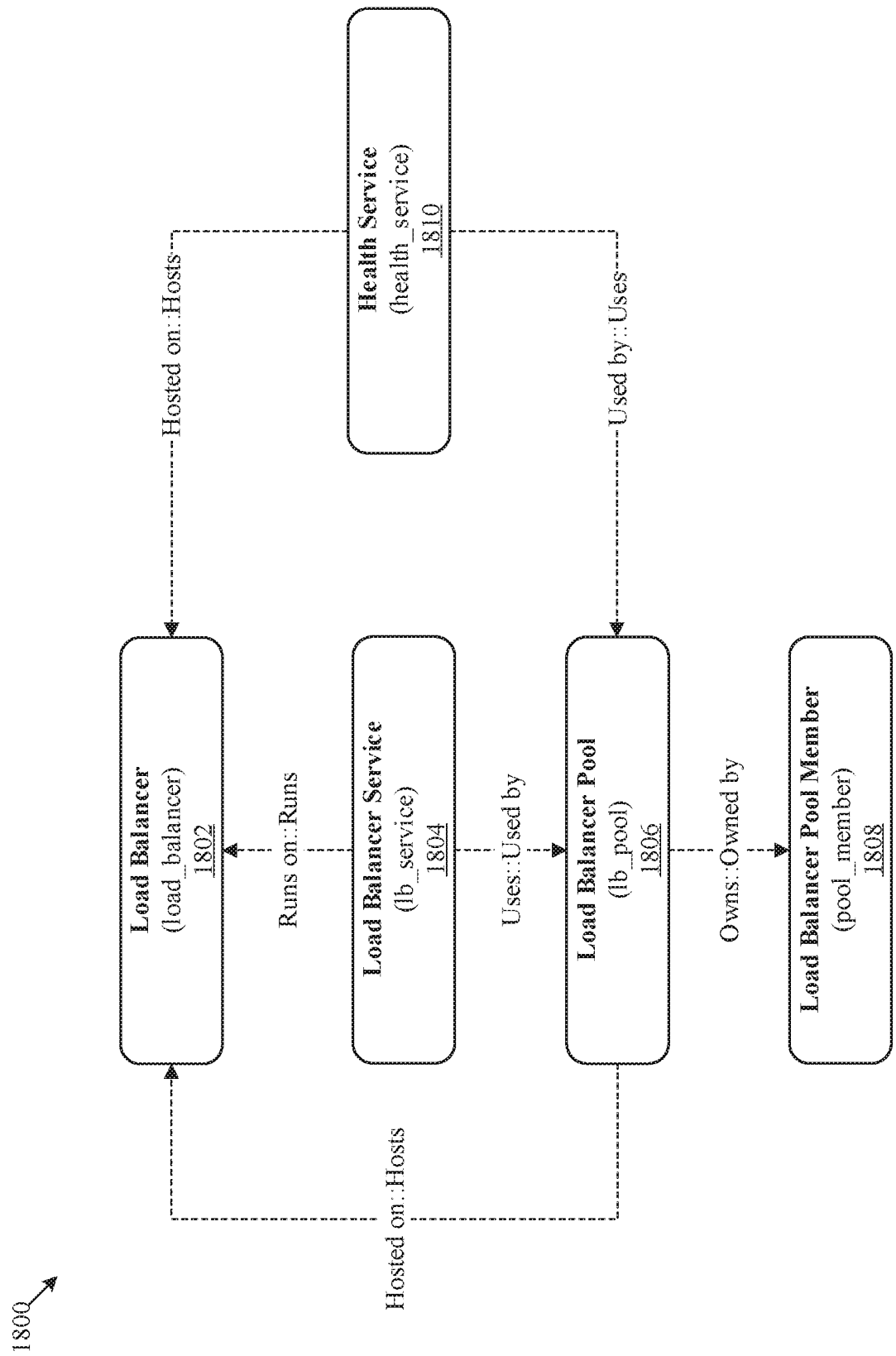
FIG. 18 is a diagram that illustrates a class model associated with various discovered resources of the load balancing system of FIG. 16, in accordance with example embodiments.

FIG. 18 is a diagram that illustrates a class model associated with various discovered resources of the load balancing system of FIG. 16, in accordance with example embodiments. FIG. 18 is explained in conjunction with elements from FIG. 16 and FIG. 17. With reference to FIG. 18, there is shown a class model 1800 for resources (as described in FIG. 16) associated with the load balancing system 1606. The class model 1800 includes a plurality of classes and relationships among two or more of the plurality of classes. The class model 1800 in FIG. 18 is merely shown as an example and should not be construed as limiting for the disclosure.

The class model 1800 may include a first class associated with a load balancer, a second class associated with an LB service (e.g., an application service of a load balancer) running on a virtual server, a third class associated with an LB pool, a fourth class associated with an LB pool member, and a fifth class associated with a server health monitor. The load balancer, the LB service, the LB pool, the LB pool member, and the server health monitor may be referred to as the resources associated with the load balancing system 1606. For example, as shown, the first class may be a Load Balancer class (denoted by a Load Balancer 1802) associated with a "load_balancer" CI table, the second class may be a Load Balancer Service class (denoted by a Load Balancer Service 1804) associated with a "lb_service" CI table, and the third class may be a Load Balancer Pool class (denoted by a Load Balancer Pool 1806) associated with a "lb_pool" CI table. Further, the fourth class may be a Load Balancer Pool Member class (denoted by a Load Balancer Pool Member 1808) associated with a "pool_member" CI table and the fifth class may be a Health Service class (denoted by a Health Service 1810) associated with a "health_service" CI table.

As shown, the second class (i.e., the Load Balancer Service class 1804) may run on the first class (i.e., the Load Balancer class 1802) and may use the third class (i.e., the Load Balancer Pool class 1806). The third class (i.e., the Load Balancer Pool class 1806) may be hosted on the first class (i.e., the Load Balancer class 1802) and may own the fourth class (i.e., the Load Balancer Pool Member class 1808). The fifth class (i.e., the Health Service class 1810) may be hosted on the first class (i.e., the Load Balancer class 1802) and may be used by the third class (i.e., the Load Balancer Pool class 1806).

Each of the plurality of classes of the class model 1800 may have an associated CI in the CMDB 1618 to store data associated with objects of the respective class. For each CI, such data may include attributes of a respective resource and relations of the respective CI with other CIs in the CMDB 1618. As an example, information related to a load balancer of the load balancing system 1606 may be stored in the CI "load_balancer" (which may be a main CI and may be associated with the first class, i.e., the Load Balancer class 1802). Exemplary attributes of the CI "load_balancer" are presented in Table 52, as follows:

TABLE 52

Exemplary attributes of the "load_balancer" CI table

| CI table attributes | Definition of attributes |
|---|---|
| name | Name of the load balancer |
| object_id | ID of the load balancer |
| ip_address | IP address of the main controller (e.g., the first controller 1608A) |
| operational_status | Status of the load balancer (which may be active or inactive) |

An example of a relations table for the CI "load_balancer" is presented in Table 53, as follows:

TABLE 53

Relations table for the CI "load_balancer"

| Parent | Child | Relation Type |
|---|---|---|
| lb_service | load_balancer | Runs on::Runs |
| lb_pool | load_balancer | Hosted on::Hosts |
| health_service | load_balancer | Hosted on::Hosts |

As another example, information related to an LB service of the load balancing system 1606 may be stored in the CI "lb_service" (which may be associated with the second class, i.e., the Load Balancer Service class 1804). Exemplary attributes of the CI "lb_service" are presented in Table 54, as follows:

TABLE 54

Exemplary attributes of the "lb_service" CI table

| CI attributes | Definition of attributes |
|---|---|
| name | Name of the virtual server |
| ip_address | IP address of the virtual server |
| object_id | Object ID of the virtual server |
| port | Port of the virtual server with which to communicate with |
| listener_protocol | Listener protocol (e.g., HTTP or HTTPS) |

An example of a relations table for the CI "lb_service" is presented in Table 55, as follows:

TABLE 55

Relations table for the CI "lb_service"

| Parent | Child | Relation Type |
|---|---|---|
| lb_service | load_balancer | Runs on::Runs |
| lb_service | lb_pool | Uses::Used by |

As another example, information related to an LB pool of the load balancing system 1606 may be stored in the CI "lb_pool" (which may be associated with the third class, i.e., the Load Balancer Pool class 1806). Exemplary attributes of the CI "lb_pool" are presented in Table 56, as follows:

TABLE 56

Exemplary attributes of the CI "lb_pool"

| CI attributes | Definition of attributes |
|---|---|
| name | Name of the LB pool |
| object_id | Object ID of the LB pool |

An exemplary relations table for the CI "lb_pool" is presented in Table 57, as follows:

TABLE 57

Relations table for the CI "lb_pool"

| Parent | Child | Relation Type |
|---|---|---|
| lb_service | lb_pool | Uses::Used by |
| lb_pool | load_balancer | Hosted on::Hosts |
| lb_pool | pool_member | Owns::Owned by |
| health_service | lb_pool | Used by::Uses |

As another example, information related to an LB pool of the load balancing system 1606 may be stored in the CI "pool_member" (which may be associated with the fourth class, i.e., the Load Balancer Pool Member class 1808). Exemplary attributes of the CI "pool_member" are presented in Table 58, as follows:

TABLE 58

Exemplary attributes of the CI "pool_member"

| CI attributes | Definition of attributes |
|---|---|
| name | Name of the LB pool member |
| ip_address | IP address of the LB pool member |
| object_id | Object ID of the LB pool member |
| service_port | Port of the LB pool member with which to communicate with |

An example of a relations table for the CI "pool_member" is presented in Table 59, as follows:

TABLE 59

Relations table for the CI "pool_member"

| Parent | Child | Relation Type |
|---|---|---|
| lb_pool | pool_member | Owns::Owned by |

As another example, information related to a server health monitor of the load balancing system 1606 may be stored in the CI "health_service" (which may be associated with the fifth class, i.e., the Health Service class 1810). Exemplary attributes of the CI "health_service" are presented in Table 60, as follows:

TABLE 60

Exemplary attributes of the CI "health_service"

| CI attributes | Definition of attributes |
|---|---|
| name | Name of the server health monitor |
| object_id | Object ID of the server heath monitor |
| timeout_sec | Time in seconds to wait for a response |
| check_interval_sec | Interval in seconds after which the server health monitor may send a request again |
| monitor_type | Type of the server health monitor. E.g., HTTP, HTTPS, TCP. |
| request_path | Path where the server health monitor may send a request |
| unhealthy_threshold | Amount of retries to retry and send requests |

An example of a relations table for the CI "health_service" is presented in Table 61, as follows:

TABLE 61

Relations table for the CI "health_service"

| Parent | Child | Relation Type |
| --- | --- | --- |
| health_service | load_balancer | Hosted on::Hosts |
| health_service | lb_pool | Used by::Uses |

Figure 19:
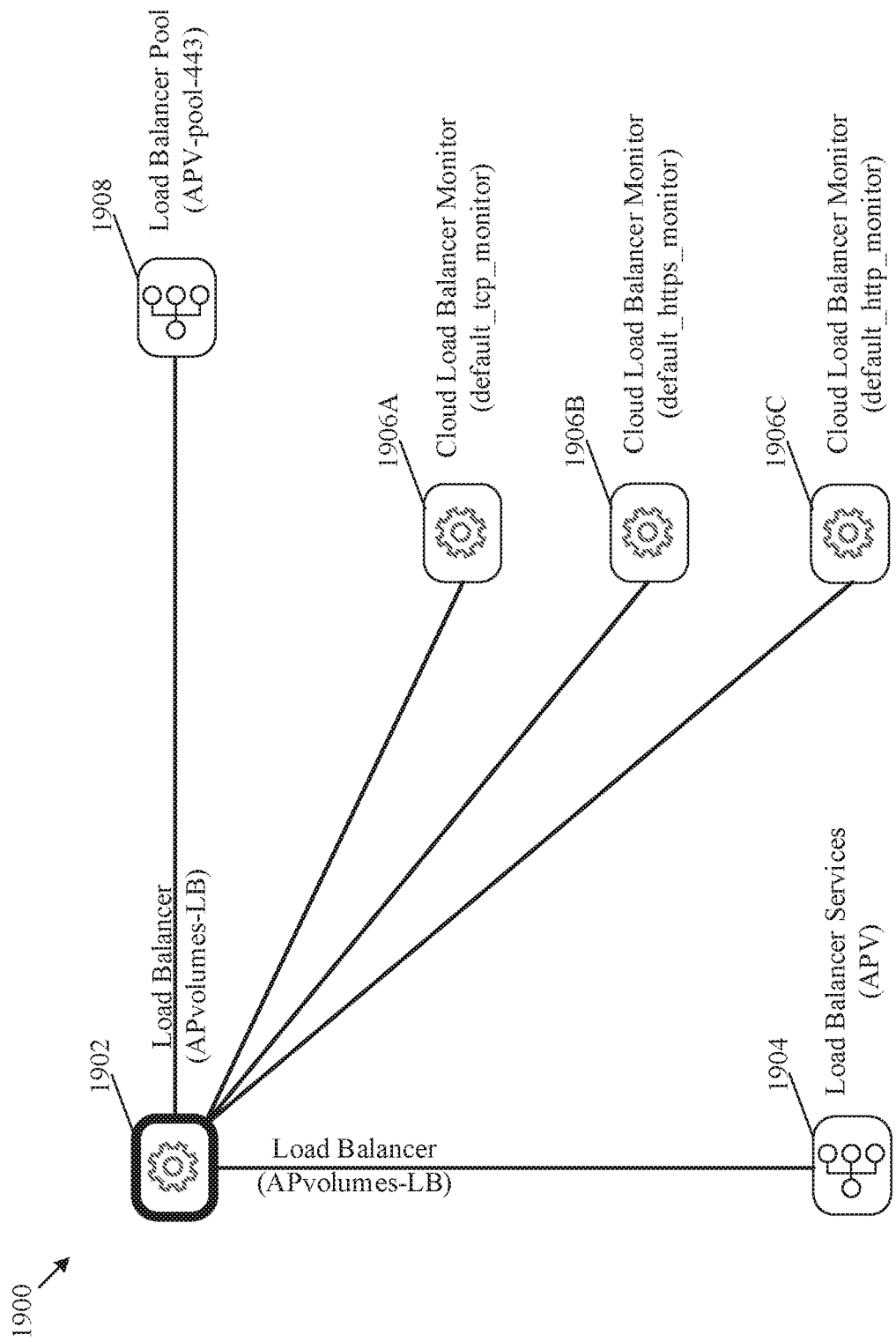
FIG. 19 is a diagram that illustrates an exemplary dependency view depicting a relationship among various discovered resources of the load balancing system of FIG. 16, in accordance with example embodiments.

An example of a dependency view of a load balancer of the load balancing system 1606 is provided, for example, in FIG. 19.

FIG. 19 is a diagram that illustrates an exemplary dependency view depicting a relationship among various discovered resources of the load balancing system of FIG. 16, in accordance with example embodiments. FIG. 19 is explained in conjunction with elements from FIGS. 16, 17, and 18. With reference to FIG. 19, there is shown an exemplary dependency view 1900. The dependency view 1900 may depict a relationship between a load balancer and other resources of the load balancing system 1606. The dependency view 1900 in FIG. 19 is merely shown as an example and should not be construed as limiting for the disclosure.

In the dependency view 1900 of FIG. 19, there is shown, a load balancer 1902 (such as, "APvolumes-LB"). The load balancer 1902 (such as, "APvolumes-LB") may be associated with one or more LB services (such as load balancer services 1904, "APV"). The load balancer 1902 (such as, "APvolumes-LB") may be further associated with one or more server health monitors (such as multiple cloud load balancer monitors 1906A-1906C, for e.g., "default_tcp_monitor", "default_https_monitor", and "default_http_monitor"). Further, the load balancer 1902 (such as, "APvolumes-LB") may be associated with an LB pool (such as, a load balancer pool 1908, for e.g., "APV-pool-443"). The discovery application 1614 may display the dependency view 1900 through the application interface 1604A of the user device 1604. The discovery application 1614 may receive a user input, through the application interface 1604A, to configure the discovered resources associated with the dependency view 1900. An exemplary map of one or more application services (i.e., LB services) associated with a load balancer of the load balancing system 1606 is described, for example, in FIG. 20.

Figure 20:
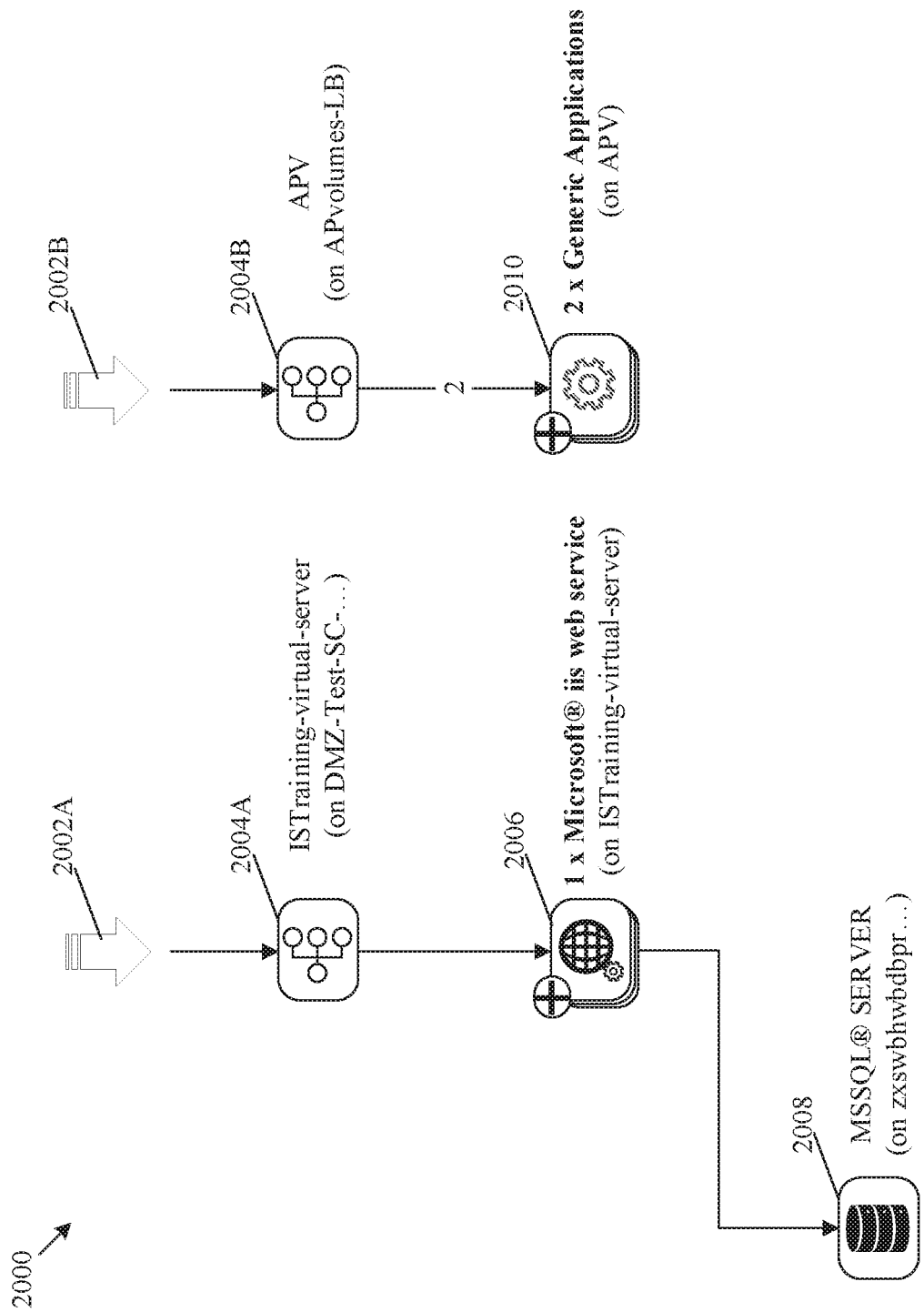
FIG. 20 is a diagram that illustrates an exemplary application service map associated with the load balancing system of FIG. 16, in accordance with example embodiments.

FIG. 20 is a diagram that illustrates an exemplary application service map associated with the load balancing system of FIG. 16, in accordance with example embodiments. FIG. 20 is explained in conjunction with elements from FIGS. 16, 17, 18, and 19. With reference to FIG. 20, there is shown an exemplary application service map 2000 that may be associated with the load balancing system 1606. The application service map 2000 in FIG. 20 is merely shown as an example and should not be construed as limiting for the disclosure.

In the application service map 2000 of FIG. 20, there are shown two entry points (e.g., a first entry point 2002A and a second entry point 2002B) associated with one or more application services (i.e., LB services) that may be associated with a discovered load balancer (for example, the first load balancer 1620A). To discover a relationship between the one or more application services and the discovered load balancer, the discovery application 1614 may receive information related to the entry points as a user input, through the application interface 1604A on the user device 1604. In an embodiment, an entry point of an application service may include a Uniform Resource Locators (URL) of the application service, an IP address of the application service, or a type of the application service.

As shown in FIG. 20, the first entry point 2002A may be associated with an application service 2004A (e.g., "Virtual server-1") that may run on a first server (e.g., "Server-1"). The application service 2004A (e.g., "Virtual server-1") may run a single instance of a web service 2006 (e.g., "Web service-1"). The instance of the web service 2006 (e.g., "Web service-1") may be associated with a database service 2008 (e.g., a Database server-1") on a second server (e.g., "Server-2"). The second entry point 2002B may be associated with an application service 2004B (such as, the load balancer service 1904 of FIG. 19, for example, "APV") that may run on a load balancer (such as, the load balancer 1902 of FIG. 19, for example, "APvolumes-LB"). The application service 2004B (for e.g., "APV') may run two instances of applications that may not support their discovery. These two instances of applications are referred herein as generic applications 2010. The discovery application 1614 may present the application service map 2000 of the one or more application services (e.g., the application service 2004B) associated with the load balancer (e.g., the load balancer 1902), onto the application interface 1604A of the user device 1604. The discovery application 1614 may receive a user input, through the application-interface, to configure the one or more application services associated with the load balancer.

Figure 21:
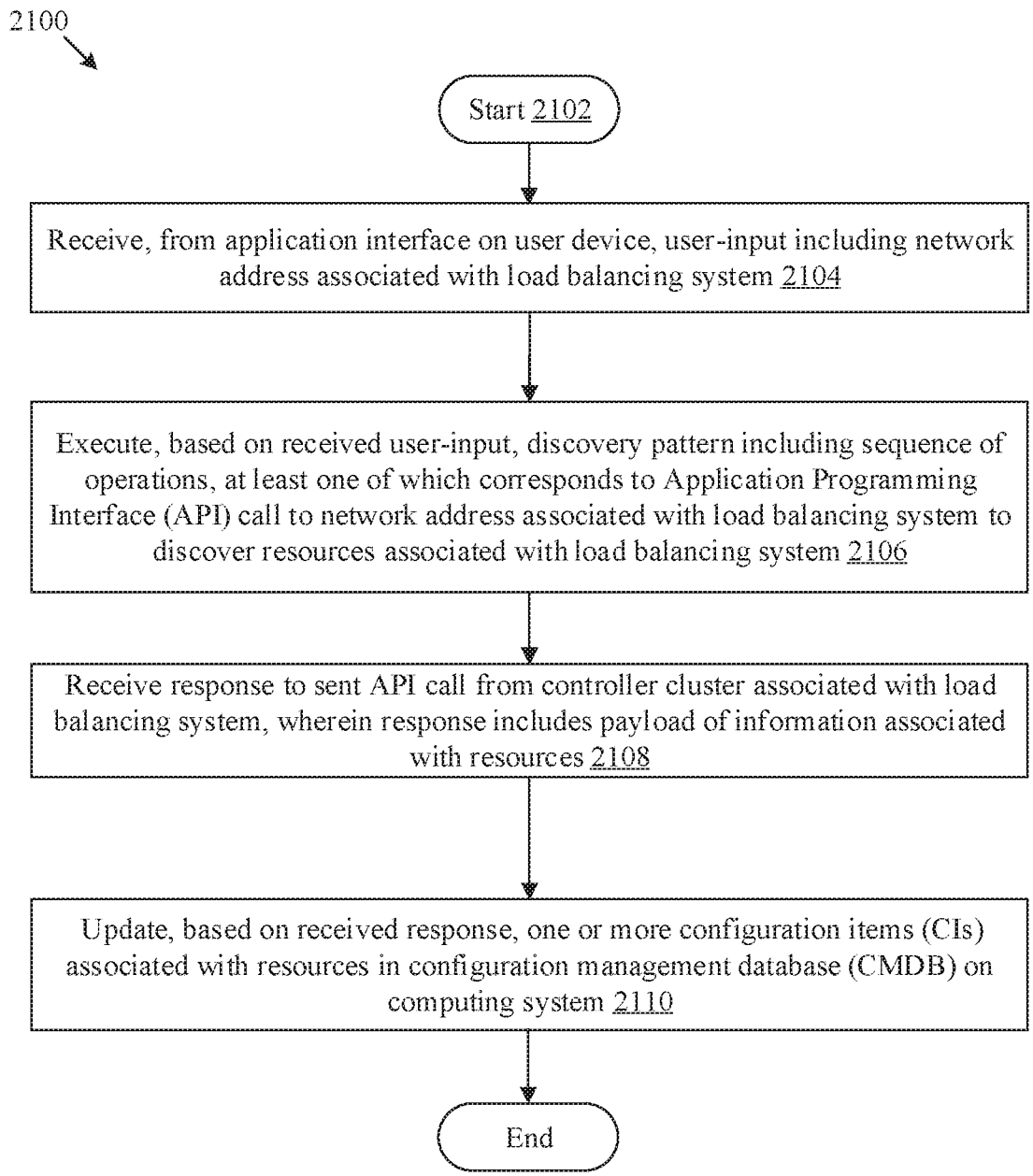
FIG. 21 is a flow chart that illustrates a method of discovering resources associated with the load balancing system of FIG. 16, in accordance with example embodiments.

FIG. 21 is a flow chart that illustrates a method of discovering resources associated with the load balancing system 1606 of FIG. 16, in accordance with example embodiments. FIG. 21 is explained in conjunction with elements from FIGS. 16, 17, 18, 19, and 20. With reference to FIG. 17, there is shown a flowchart 2100. The exemplary method of flowchart 2100 may be executed by any computing system, for example, the computing system 1602 of FIG. 16 or FIG. 17. The exemplary method of the flowchart 2100 may start at 2102 and proceed to 2104.

At 2104, a user input may be received via the application interface 1604A (i.e. the instance) on the user device 1604. In an embodiment, the discovery application 1614 on the computing system 1602 may be configured to receive the user input. The user input may be associated with the discovery of resources associated with the load balancing system 1606 and may include a network address associated with the load balancing system 1606. For example, the user input may include an IP address of the management console of the load balancing system 1606 or an IP address of the controller cluster 1608 associated with load balancing system 1606. The reception of the user input is explained further, for example, in FIG. 16.

At 2106, a discovery pattern may be executed based on the user input. In an embodiment, the discovery application 1614 may be configured to execute the discovery pattern through the discovery server 1616, based on the user input. The discovery pattern may include a sequence of operations for the discovery of resources. At least one of the sequence of operations may correspond to an API call to the network address. For example, the API call may be sent to the IP address of the controller cluster 1608. The execution of the discovery pattern is explained further, for example, in FIG. 16.

At 2108, a response to the sent API call may be received from controller cluster 1608. In an embodiment, the discovery application 1614 may be configured to receive the response to the sent API call. The response may include a payload of information associated with the discovered resources (associated with the load balancing system 1606).

In an embodiment, the discovery application 1614 may be configured to parse the received response to determine the information associated with the resources of the load balancing system 1606. The reception and parsing of the response are explained further, for example, in FIG. 16.

At 2110, one or more CIs associated with the resources may be updated on the CMDB 1618 based on the received response. In an embodiment, based on the received (or parsed) response, the discovery application 1614 may be configured to update the one or more CIs associated with the discovered resources on the CMDB 1618. Each configuration item may correspond to a logical representation of a resource associated with the load balancing system 1606. Each configuration item may represent a presence, a status, attributes of a respective resource and relationships with other resources. As an example, the discovery application 1614 may store the extracted information (from the parsed response) in CI tables on the CMDB 1618. Examples of the CI tables are explained, for example, in FIG. 16. Control may pass to end.

Although the flowchart 2100 is illustrated as discrete operations, such as 2104, 2106, 2108, and 2110, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions executable by a machine and/or a computer to operate a computing system (e.g., the computing system 1602). The computer-executable instructions may cause the machine and/or computer to perform operations that may include receiving, from an application interface (such as, the application interface 1604A) on a user device (such as, the user device 1604), a user input associated with a discovery of resources associated with a load balancing system (such as, the load balancing system 1606). The user input may include a network address associated with the load balancing system 1606. Also, in some instances, the user input may include authentication credentials associated with the load balancing system 1606 and configuration of a cloud service account on a discovery server (such as, the discovery server 1616). The cloud service account may securely store such credentials and may later on provide such credentials for running a discovery pattern on the discovery server 1616. The load balancing system 1606 may include a group of load balancers (such as, the group of load balancers 1620) to balance load on associated pools of servers (such as, the first pool of servers 1624A, the second pool of servers 1624B, . . . and Nth pool of servers 1624N). The load balancing system 1606 may further include a controller cluster (such as, the controller cluster 1608) to manage the group of load balancers 1620. Each load balancer (e.g., the first load balancer 1620A) of the group of load balancers 1620 may host on a virtual server (e.g., the first virtual server 1622A) which may be associated with the corresponding pool of servers (such as, the first pool of servers 1624A). A server health monitor (such as, the first server health monitor 1626A) may be associated with each pool of servers (e.g., the first pool of servers 1624A) and may be configured to monitor an operational status of the pool of servers (e.g., the first pool of servers 1624A). The operations may further include executing, based on the user input, a discovery pattern comprising a sequence of operations for the discovery of the resources associated with the load balancing system 1606. At least one of the sequence of operations may correspond to an API call to the network address (for example, an IP address of the controller cluster 1608 associated with the load balancing system 1606). The operations may further include receiving a response to the API call from the controller cluster 1608. The response may include payload information associated with the resources. The operations may further include updating, based on the received response, one or more configuration items (CIs) associated with the resources in a configuration management database (CMDB) (such as, the CMDB 1618).

Detailed description for resource cluster discovery is provided herein. The following described implementations may be found in a disclosed system and method for automatic discovery of a resource cluster. A discovery application may be hosted on a discovery server and may be configured to discover the resource cluster that may be deployed in a remote computing system. To discover the resource cluster in the remote computing system, the discovery application may be configured to call external Application Programming Interfaces (APIs) components of the remote computing system to determine a presence, components, and attributes of resource clusters in different regions and availability zones.

The remote computing system may provide services to host, deploy, and manage resource clusters in the remote computing system. The resource cluster may include, but not limited to, a set of nodes, and a set of resources. The resource cluster may be managed by a cluster resource manager (such as Pacemaker). The cluster resource manager may be responsible to provide maximum availability for the services/resources that may be provided by the resource cluster. The cluster resource manager may be further responsible for detection and/or recovery of node and resource-level failures in the resource cluster. In some embodiments, the cluster resource manager may utilize messaging and membership capabilities that may be provided by a messaging resource (such as CoroSync) to keep the resource available on any of the cluster nodes.

Due to dynamic nature of an organization, the organization may have multiple resource clusters that may be hosted in the remote computing system or in an on-premise network. Each of the multiple resource clusters may provide a specific service and/or resources to employees of the organization or to customers of the organization. The high availability of the cluster services may be crucial for overall operations within the organization as well as for the credibility of the customers. Therefore, there is a need to automatically detect each resource cluster of the multiple resource clusters associated with the organization. More specifically, there is a need to further discover and map the cluster, the cluster resource manager, the set of nodes in the resource cluster, and the set of resources in the resource cluster.

Exemplary aspects of the disclosure provide a computing system that may include a discovery server. The discovery server may receive a user-input from an application interface of a user device. The user-input may include secure shell (SSH) credentials associated with a first server. The discovery server may execute a discovery pattern based on the received user-input. The discovery pattern may include a sequence of operations for a discovery of a resource cluster managed by a cluster resource manager. At least one of the set of operations may include a first Application Programming Interface (API) call to an Internet Protocol (IP) address of the first server. The discovery server may further receive a first response from the first server. The first response may include first information associated with the resource cluster. The discovery server may further update one or more configuration items (CIs) associated with the resource cluster in a configuration management database (CMDB) stored on the discovery server based on the received first response.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized, and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways. Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Figure 22:
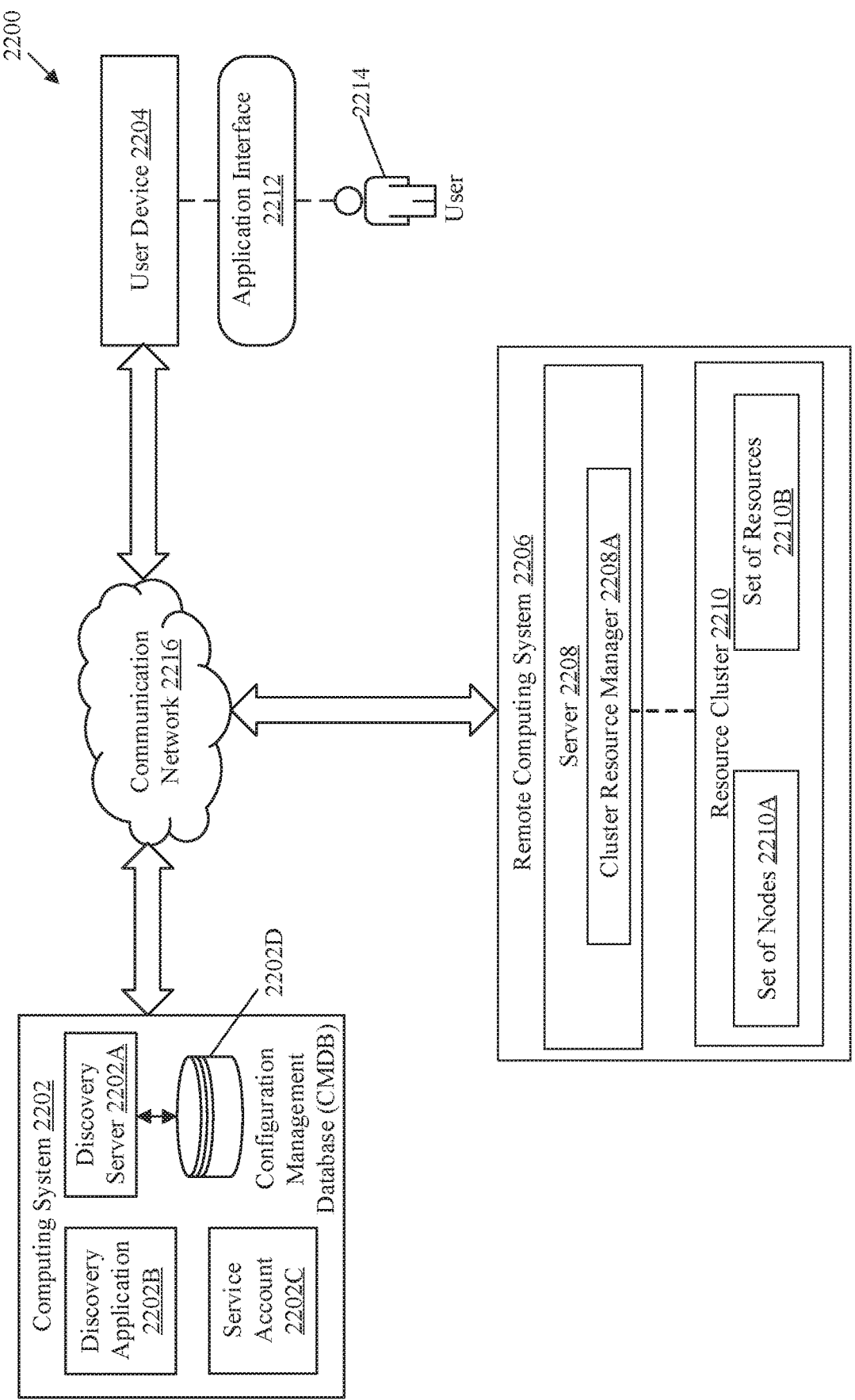
FIG. 22 is a diagram of an exemplary network environment for automatic discovery of resource cluster, in accordance with an embodiment of the disclosure.

FIG. 22 is a diagram of an exemplary network environment for automatic discovery of a resource cluster, in accordance with an embodiment of the disclosure. With reference to FIG. 22, there is shown a block diagram of a network environment 2200. The network environment 2200 may include a computing system 2202, a user device 2204, and a remote computing system 2206. The computing system 2202 may include a discovery server 2202A, a discovery application 2202B, a Service Account 2202C, and a configuration management database (CMDB) 2202D.

The remote computing system 2206 may include a resource cluster 2210. The resource cluster 2210 may be managed by a cluster resource manager 2208A that may be deployed in a server 2208 (for example a first server). The resource cluster 2210 may further include a set of nodes 2210A, and a set of resources 2210B. The user device 2204 may host an application interface 2212, through which a user 2214 may provide input(s) to the discovery server 2202A. The user 2214 may be an Information Technology (IT) administrator or a power user who may be tasked with monitoring, management, or administration of the resource cluster 2210. The computing system 2202 may be configured to communicate with the remote computing system 2206 and the user device 2204, through a communication network 2216.

The computing system 2202 may include suitable code, logic, circuitry and/or interfaces that may be configured to discover the resource cluster 2210 in the remote computing system 2206 and maintain the CMDB 2202D. The computing system 2202 may host the discovery server 2202A and the discovery application 2202B. Further, the computing system 2202 may maintain the Service Account 2202C. For example, based on secure shell (SSH) credentials (for the server 2208) that may be stored in the Service Account 2202C, the computing system 2202 may execute a discovery pattern for the discovery of the resource cluster 2210. The discovery pattern may be executed by the discovery server 2202A or the discovery application 2202B. The discovery pattern may be referred to as a sequence of operations, which may allow the discovery server 2202A (and the discovery application 2202B) to determine configuration items (CIs) to be updated based on collected information of the resource cluster 2210. In some embodiments, the CIs (to be updated) may be determined based on the credentials for accessing the server 2208, and tables to populate in the CMDB 2202D. The computing system 2202 may be configured to store the collected information (i.e. related to the resource cluster 2210), which may be received in response to the execution of the discovery pattern, in the CMDB 2202D. Example implementations of the computing system 2202 may include, but are not limited to, an application server, a database server, a mainframe server, a cloud server (e.g., a hybrid, a private, or a public cloud), or a web server.

The discovery server 2202A may include code, logic, circuitry, and/or interfaces that may be configured to facilitate communication and movement of data between the application interface 2212 (i.e., an instance) and external applications, data sources, and services. Multiple discovery servers, capable of handling thousands of devices, may be deployed in different network segments to provide virtually unlimited scalability. The discovery server 2202A may be configured to execute the one or more discovery patterns (i.e. a sequence of operations for discovery of resources) for the discovery application 2202B and return results back to an associated instance for processing. In an embodiment, the discovery server 2202A may be configured to store the results including information, associated with the discovered resource cluster 2210, in the one or more CIs in the CMDB 2202D, for the discovery application 2202B. In some instances, the discovery server 2202A may use secure communication protocols (like HTTP-secure) to ensure that all communications may be secure and initiated inside an enterprise's firewall. The discovery server 2202A may be implemented as an application (such as a Java application), which may run as a service or daemon on a server or a cluster node of the computing system 2202.

The discovery application 2202B may include code, logic, circuitry, and/or interfaces that may be configured to make use of the discovery server 2202A (also referred to as Management, Instrumentation, and Discovery (MID) Server) to discover and collect information associated with the resource cluster 2210. For example, the discovery application 2202B may receive a user-input through the application interface 2212 (i.e. an instance) on the user device 2204. The user-input may include an authentication credential and account information associated with an operating system of the server 2208 in the remote computing system 2206. The authentication credential and the account information may be included in the Service Account 2202C for the operating system of the server 2208. In an embodiment, through the discovery server 2202A, the discovery application 2202B may be configured to discover resource cluster 2210. The discovery application 2202B may execute the discovery pattern including a sequence of operations based on the user-input. At least one of the sequence of operations may correspond to an Application Programming Interface (API) call to an Internet Protocol (IP) address of the server 2208. The discovery application 2202B may receive a response of the API call from the server 2208, where the response may include first information associated with the resource cluster 2210. The discovery application 2202B may perform the communications (e.g., the transmission of the API call and the receipt the response) with the server 2208 through the discovery server 2202A. The discovery application 2202B may update one or more configuration items (CIs) associated with the discovered resource cluster 2210 in the CMDB 2202D (stored on the computing system 2202). Herein, the configuration items may correspond to, but are not limited to, physical devices, virtual devices, applications, and services associated with the resource cluster 2210. The discovery application 2202B may be implemented as an agentless application, so that it may avoid the management complexity of having a permanent software installed on any computer, or device to be discovered.

The Service Account 2202C may include code, logic, circuitry, and/or interfaces that may be configured to store credentials required to access the server 2208. The user 2214 may be required to create the Service Account 2202C for the server 2208 before execution of the discovery pattern on the server 2208. Example implementations of the Service Account 2202C may include, but are not limited to, a relational database (RDB), a comma separated values (CSV) file, or a set of JavaScript Object Notation (JSON) key value pairs.

The CMDB 2202D may include code, logic, circuitry, and/or interfaces that may be configured to store information about the resource cluster 2210. The stored information may also include information about the set of nodes 2210A and the set of resources 2210B associated with the resource cluster 2210. The CMDB 2202D may be a database in which the information for each node and each resource may be stored in a configuration item (CI) specific to the corresponding node and the corresponding resource. The discovery application 2202B, through the discovery server 2202A, may collect the information associated with the resource cluster 2210 and may update the respective CIs in the CMDB 2202D. Example implementations of the CMDB 2202D may include, but are not limited to, a database server, a file server, a mainframe server, a cloud server, a storage device (e.g., a Redundant Array of Independent Disks (RAID) device), or any other computing device with data storage capability.

The user device 2204 may host the application interface 2212 (i.e. an instance) that may be configured to receive a user-input (such as from a discover admin). The user device 2204 may be configured to receive, from the user 2214, the user-input associated with the discovery of the resource cluster 2210. After the discovery is performed, the user device 2204 may be further configured to display a result of the discovery of the resources on a display device of the user device 2204, through the application interface 2212. Examples of the user device 2204 may include, but are not limited to, a workstation, a server, a cluster of servers with a management panel, a laptop, a tablet, an internet-enabled device, a desktop computer, a computing device or any portable or non-portable device with a networking and display capability.

The remote computing system 2206 may include suitable logic, circuitry, and interfaces that may be configured to provide computing resources on behalf of the user 2214. These computing resources may be hosted on physical hardware and may include, but not limited to, one or more virtual machines, one or more load balancers, and one or more storage volumes distributed across one or more availability zones (e.g., datacenters) that may be disposed within one or more geographic regions. These and other computing resources (if any) may collectively define a cloud-based computing environment that may allow the user 2214 to deploy resource clusters, host software application(s), store data, and otherwise utilize the computing resources. The cloud-based computing environment may be provided atop an infrastructure of various computing resources that allow the computing environment to be defined, modified, and otherwise tailored according to the needs of the user 2214. In some embodiments, the remote computing system 2206 may correspond to an on-premise network. In some other embodiments, the remote computing system may correspond to a cloud network.

The server 2208 may include suitable logic, circuitry, code and/or interfaces that may be configured to provide a deployment environment for one or more resource managers. The server 2208 may be provided by the remote computing system 2206. For example, the cluster resource manager 2208A may be deployed in the server 2208. In some embodiments, the resource cluster 2210 may be deployed in the server 2208. The server 2208 may have its own operating system and memory. Examples of the server 2208 may include, but are not limited to, an application server, a cloud server, a mainframe server, a database server, a web server, or other type of servers.

The resource cluster 2210 may include the set of nodes 2210A and the set of resources 2210B that maybe managed by the cluster resource manager 2208A. The cluster resource manager 2208A may be responsible for achieving maximum availability for one or more services (also known as resources) provided by the resource cluster 2210. By way of example, the cluster resource manager 2208A may create one or more new nodes, shut down one or more nodes, scale up and/or scale down one or more nodes for achieving the maximum availability for one or more services (also known as resources) provided by the resource cluster 2210. The cluster resource manager 2208A may achieve the maximum availability for the one or more services by detecting and recovering from nodes and resource-level failures. The cluster resource manager 2208A may detect and recover from the nodes and the resource-level failures by making use of the messaging and membership capabilities (such as provided by Corosync or Heartbeat). The cluster resource manager 2208A may define a relationship between the set of nodes 2210A with the set of resources 2210B. The resource cluster 2210 may support one or more redundancy configurations based on the remote computing system 2206. Examples of the one or more redundancy configurations may include, but is not limited to, Active/Active, Active/Passive, N+1, N+M, N-to-1, and N-to-N.

The set of nodes 2210A and the set of resources 2210B may be managed by the cluster resource manager 2208A. This management of the resource cluster 2210 may include managing each of the one or more nodes of the set of nodes 2210A that may contain the one or more resources of the set of resources 2210B. The management of the resource cluster 2210 may further include specifying one or more nodes of the set of nodes 2210A that currently have the one or more resources of the set of resources 2210B. The management of the resource cluster 2210 may further include specifying one or more nodes of the set of nodes 2210A that may have the one or more resources of the set of resources 2210B in case of resource-level or node-level failures.

Each of the set of nodes 2210A may correspond to a management unit in the resource cluster 2210 that may be managed by the cluster resource manager 2208A. Each of the set of nodes 2210A may be a physical computer or a virtual machine (VM) that may be responsible for processing and storing the data to achieve the maximum availability of the resource cluster 2210.

Each resource of the set of resources 2210B may correspond to a service that may be made available by the resource cluster 2210. Each of the set of resources 2210B may be either moved or replicated to one or more nodes of the set of nodes 2210A within the resource cluster 2210. A resource may be as simple as an IP address that may float between one or more nodes of the set of nodes 2210A, or something as complex as a database instance with a very intricate configuration. Examples of the set of resources 2210B may include, but is not limited to, an IP address, an application, a server, a I/O operation, a data library, or a disk unit.

The application interface 2212 (also referred to as an Instance) may be implemented as an client-side application for a specific group of users who may access the application interface 2212 through a web client (such as a web browser) and a URL which may be customizable for the group of users. The application interface 2212 may host several applications and services, one or more of which may be associated with the discovery of the resource cluster 2210. The application interface 2212 may support role-based access to different applications or services on the application interface 2212. For example, one of the group of users (such as user 2214) may be a discovery admin who may be allowed to configure a discovery schedule for a discovery of resources cluster 2210.

The communication network 2216 may represent a portion of the global Internet. However, the communication network 2216 may alternatively represent different types of network, such as a private wide-area or local-area packet-switched networks. The communication network 2216 may include a communication medium through which the computing system 2202, the user device 2204, and the remote computing system 2206 may communicate with each other. The communication network 2216 may be one of a wired connection or a wireless connection Examples of the communication network 2216 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 2200 may be configured to connect to the communication network 2216 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT)® communication protocols.

In operation, the discovery server 2202A may receive a discovery request via the application interface 2212 of the user device 2204 associated with the user 2214. The discovery request may correspond to a request for discovery of the resource cluster 2210, the set of nodes 2210A, and the set of resources 2210B included in the resource cluster 2210. The discovery server 2202A may be configured to control the application interface 2212 of the user device 2204 to display a plurality of User interface (UI) elements. The discovery server 2202A may further control the application interface 2212 to display a message for the user 2214, to provide credentials to access the server 2208 via the displayed plurality of UI elements. The cluster resource manager 2208A may be deployed in the server 2208.

In some embodiments, the server 2208 may be a Linux® server. In the Linux® server, the operating system of the server 2208 may be Linux®. The discovery server 2202A may be configured to receive a user-input via the plurality of UI elements displayed on the application interface 2212 of the user device 2204. The user-input may include, but not limited to, secure shell (SSH) credentials that may be associated with the server 2208. The received SSH credentials may include a username and password to access the server 2208 and may be associated with a first set of permissions and a second set of permissions.

The first set of permissions may be to access a set of files on the server 2208. The set of files may include, but not limited to, a first file, a second file and a third file. By way of example and not limitation, the first file may be "/etc/hosts" file, the second file may be "/etc/corosync/corosync.conf" file, and the third file may be either "/var/lib/heartbeat/crm/cib.xml" file or "/var/lib/pacemaker/cib/cib.xml" file. The third file may be based on different versions of the server 2208 or the cluster resource manager.

In an embodiment, the "/etc/hosts" file may also be referred as a host file and may be an operating system file that may translate one or more hostnames or domain names to corresponding IP addresses. The host file may be a plain text file. The "/etc/corosync/corosync.conf" file may also be referred as a corosync executive configuration file. The corosync executive configuration file may be responsible for authenticity and privacy of the messages communicated between the set of nodes 2210A and/or the set of resources 2210B. The "/var/lib/heartbeat/crm/cib.xml" file or "/var/lib/pacemaker/cib/cib.xml" may also be referred as a cluster information base file and may represent configuration of the resource cluster 2210 and current state information of each of the set of resources 2210B in the resource cluster 2210.

The second set of permissions may be to execute a set of commands on the server 2208. The set of commands may include, but not limited to, a first command, a second command, a third command, a fourth command, and a fifth command. The first command may be, for example, "ps -ef|grep corosync|grep -v grep". The 'ps' utility command in the first command may be used to display or view information related to processes running on the server 2208. The 'grep' utility command may also be referred as, for example, "global regular expression print" utility command and may be used for searching plain-text data in lines matching a regular expression. The second command may be, for example, "ps -ef|grep pacemaker|grep -v grep". The third command may be, for example, "ifconfig|grep 'inet addr:'|awk '{print $1, $2}'". The "ifconfig" utility command may also be referred as "interface configuration" utility command and may be used for system/network administration in the server 2208 to configure, manage and query network interface parameters. The 'awk' utility command may be used for data manipulation with using file and generating the specified reports. The fourth command may be, for example, "hostname -s" which may be used to view hostname of the server 2208. The fifth command may be, for example, "hostname -f" which may be used to display the fully qualified domain name of the server 2208.

The discovery server 2202A may be configured to execute the discovery pattern based on the received user-input. The discovery pattern may include a sequence of operations for discovery of the resource cluster 2210 managed by the cluster resource manager 2208A. A first operation of the sequence of operations may include an initial API call to an Internet Protocol (IP) address of the server 2208. The initial API call may be for a confirmation for the presence of the cluster resource manager 2208A in the server 2208. The initial API call may include instructions to execute one or more commands of the set of commands on the server 2208. The one or more commands may include the first command and the second command. The server 2208 may receive the one or more commands from the discovery server 2202A and may further execute the one or more commands on the server 2208. The server 2208 may further generate an initial response for the initial API call based on a result of the execution of the one or more commands in the server 2208, and may further transmit the generated initial response to the discovery server 2202A. The discovery server 2202A may receive the initial response from the server 2208 based on the initial API call. The initial response may include initial information that may indicate a presence of the cluster resource manager 2208A in the server 2208. The cluster resource manager 2208A may be manage the resource cluster 2210.

The discovery server 2202A may be further configured to execute a second operation of the sequence of operations. The second operation may correspond to a first API call to the IP address of the server 2208. The first API call may include instructions to access the third file of the set of files on the server 2208. The discovery server 2202A may receive a first response from the server 2208 based on the first API call. The discovery server 2202A may be further configured to parse the received first response to extract first information associated with the resource cluster 2210. The extracted first information may include information associated with the resource cluster 2210. Specifically, the first information may be related to the cluster resource manager 2208A, the resource cluster 2210, the set of nodes 2210A, the set of resources 2210B, and a plurality of resource groups.

The discovery server 2202A may be further configured to execute a third operation of the sequence of operations. The third operation may correspond to a second API call to the IP address of the server 2208. The second API call may include instructions to access the second file of the set of files on the server 2208 and retrieve the second information associated with the resource cluster from the accessed second file. The discovery server 2202A may be further configured to receive a second response from the server 2208 based on the second API call. The discovery server 2202A may be further configured to parse the received second response to extract second information associated with the resource cluster 2210. The extracted second information may include information associated with a network interface of the resource cluster 2210. The second information may include, but not limited to, a virtual IP address of the server 2208.

The discovery server 2202A may be further configured to update one or more configuration items (CIs) associated with the resource cluster 2210 in the CMDB 2202D stored on the discovery server 2202A based on the first information and the second information. The updated one or more CIs may be further associated with the set of nodes 2210A, the set of resources 2210B, and the server 2208. The discovery server 2202A may be further configured to generate a class model associated with the resource cluster 2210 based on the updated one or more Cis. The discovery server 2202A may be further configured to transmit the generated class model associated with the resource cluster 2210 to the user device 2204 to be further displayed on the application interface 2212. The details about the one or more CIs and the generated class model are further provided, for example, in FIG. 24.

In some embodiments, the received user-input may further include information related to discovery schedule for the discovery of resource cluster 2210. The information may include a periodic time interval (e.g., monthly, weekly, daily, every 12 hours, etc.) based on which the discovery server 2202A may be configured to re-execute one or more operations of the sequence of the operations to discover the resource cluster 2210. The discovery server 2202A may be further configured to set the discovery schedule for the discovery of the resource cluster 2210 based on the information indicating the discovery schedule in the user-input.

Figure 23:
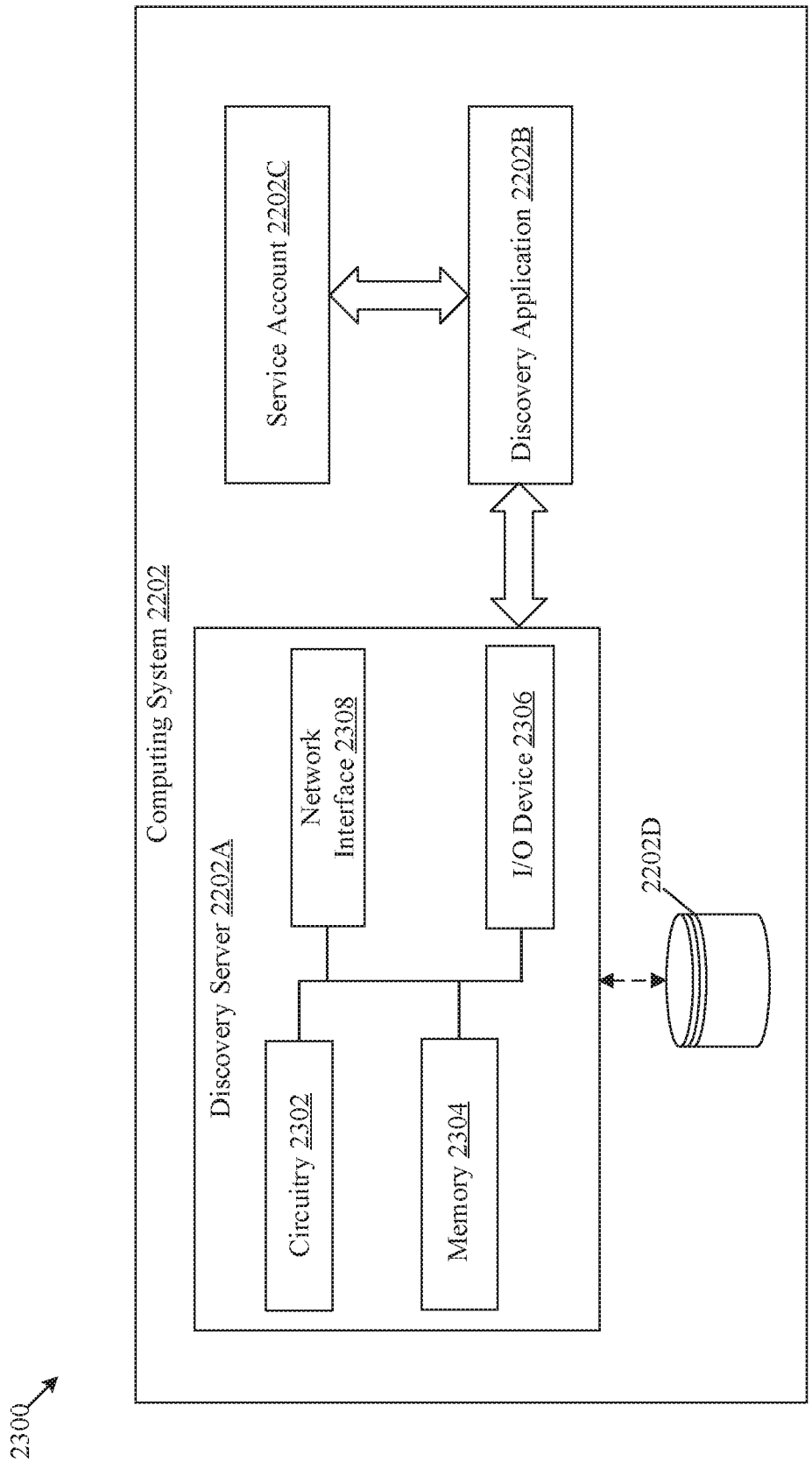
FIG. 23 is a block diagram of a computing system for automatic discovery of resource cluster, in accordance with an embodiment of the disclosure.

FIG. 23 is a block diagram of a computing system for automatic discovery of resource cluster, in accordance with an embodiment of the disclosure. FIG. 23 is explained in conjunction with elements from FIG. 22. With reference to FIG. 23, there is shown a block diagram 2300 of the computing system 2202. The computing system 2202 may include the discovery server 2202A, the discovery application 2202B, the Service Account 2202C, and the CMDB 2202D. The discovery server 2202A may be coupled to the discovery application 2202B and the CMDB 2202D. The discovery application 2202B may be associated with the Service Account 2202C. The discovery server 2202A may include circuitry 2302, a memory 2304, an input/output (I/O) device 2306, and a network interface 2308. In some embodiments, the CMDB 2202D may be separate from the discovery server 2202A and may further communicate with the discovery server 2202A via the network interface 2308. In some other embodiments, the memory 2304 may include the CMDB 2202D.

The circuitry 2302 may be configured to communicate with the discovery server 2202A and the CMDB 2202D by use of the network interface 2308. The circuitry 2302 may include suitable logic, circuitry, interfaces, and/or code that may be configured to execute instructions for operations to be executed by the discovery server 2202A to discover the resource cluster 2210. Examples of implementation of the circuitry 2302 may include a Central Processing Unit (CPU), x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), co-processors, other processors, and/or a combination thereof.

The memory 2304 may include suitable logic, circuitry, code, and/or interfaces that may be configured to store the instructions executable by the circuitry 2302. The memory 2304 may store the one or more configuration items associated with the resource cluster 2210. In such case, the CMDB 2202D may be implemented within the memory 2304. Examples of implementation of the memory 2304 may include, but are not limited to, Random Access Memory (RAM), Read Only Memory (ROM), Hard Disk Drive (HDD), and/or a Secure Digital (SD) card.

The I/O device 2306 may include suitable logic, circuitry, and/or interfaces that may be configured to receive an input and provide an output based on the received input. The I/O device 2306 may include various input and output devices, which may be configured to communicate with the circuitry 2302. Examples of the I/O device 2306 may include, but are not limited to, a touch screen, a keyboard, a mouse, a joystick, a display device (e.g., the display device), a microphone, or a speaker.

The network interface 2308 may include suitable logic, circuitry, interfaces, and/or code that may be configured to enable communication between the discovery server 2202A, the discovery application 2202B, the Service Account 2202C, and the CMDB 2202D via one or more communication networks. The network interface 2308 may implement known technologies to support wired or wireless communication with the one or more communication networks.

The network interface 2308 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 2308 may communicate via wireless communication with networks, such as the Internet, an Intranet, and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

Similar to the discovery server 2202A, the user device 2204 (though not shown in FIG. 23) may include one or more components including, but not limited to, circuitry, a memory, a I/O device, a display device, and a network interface with similar functions. The functions or operations executed by the discovery server 2202A, as described in FIGS. 22, 24, 25, and 26, may be performed by the circuitry 2302. Operations executed by the circuitry 2302 are described in detail, for example, in FIGS. 22, 24, 25, and 26.

Figure 24:
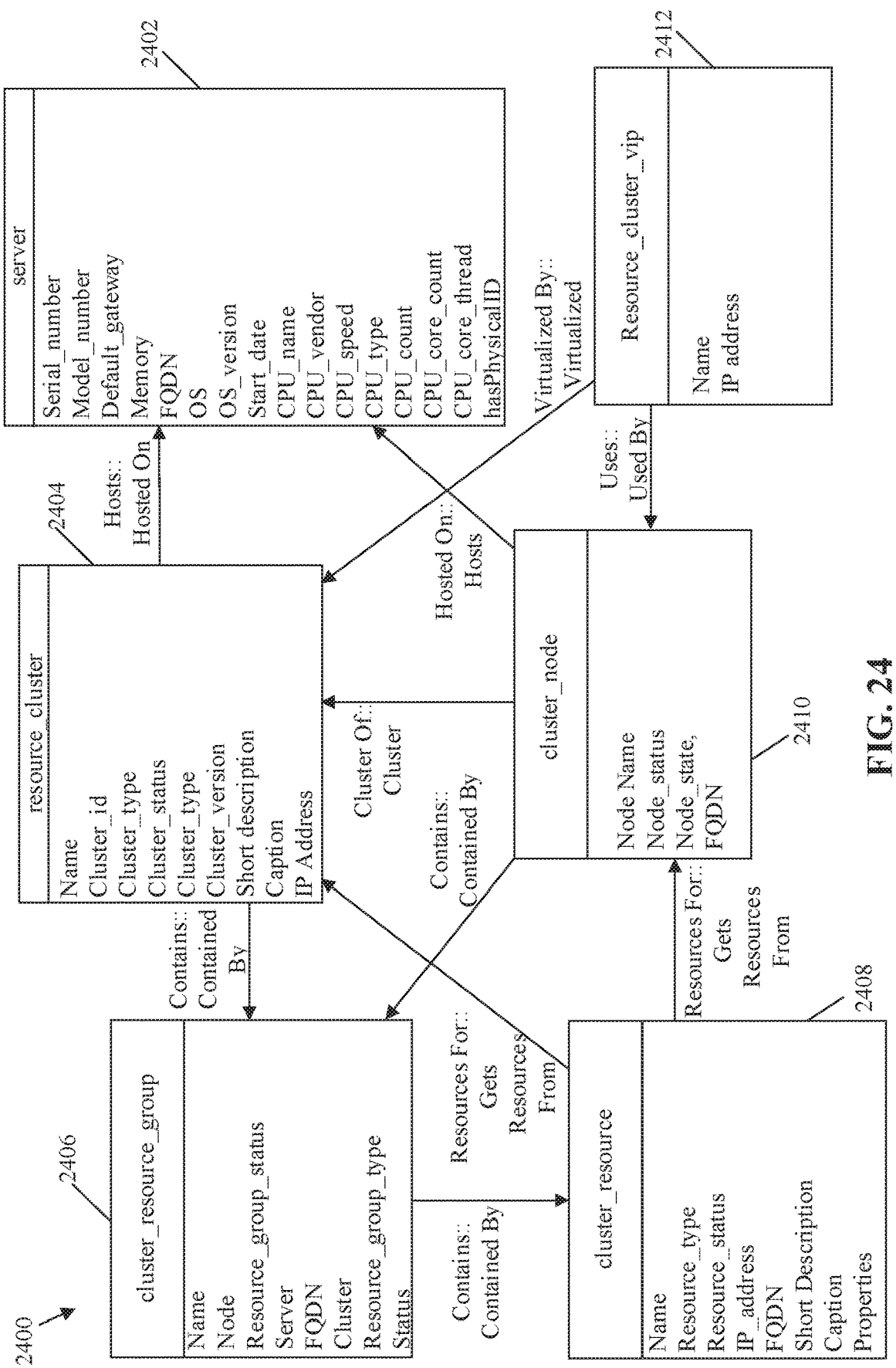
FIG. 24 is a scenario diagram illustrates an exemplary class model of a resource cluster, in accordance with example embodiments.

FIG. 24 is a scenario diagram illustrates an exemplary class model of a resource cluster, in accordance with example embodiments. FIG. 24 is explained in conjunction with elements from FIG. 22 and FIG. 23. With reference to FIG. 24, there is shown a class model 2400 for the resource cluster 2210 (as described in FIG. 22). The class model 2400 may include a plurality of classes and relationships among two or more of the plurality of classes. Each of the plurality of classes may correspond to a configuration item (CI) and may include information about a corresponding CI. The class model 2400 in FIG. 24 is merely shown as an example and should not be construed as limiting for the disclosure.

The class model 2400 may include at least one of a first class associated with the server 2208, a second class associated with the resource cluster 2210, a third class associated with a resource group of the set of resources 2210B, a fourth class associated with the set of resources 2210B, a fifth class associated with the set of nodes 2210A, and a sixth class associated with the network interface of the resource cluster 2210.

As shown, the first class may be a "server" class (denoted by 2402), the second class may be a "resource_cluster" class (denoted by 2404), the third class may be a "cluster_resource_group" class (denoted by 2406), the fourth class may be a "cluster_resource" class (denoted by 2408), the fifth class may be a "cluster_node" class (denoted by 2410), and the sixth class may be a "resource_cluster_vip" class (denoted by 2412).

The first class 2402 may be associated with the server 2208 where the cluster resource manager 2208A may be deployed. The first class 2402 may further include one or more fields that may store information associated with the server 2208. By way of example and not limitation, exemplary one or more fields of the first class 2402 may be presented in Table 62:

TABLE 62

Exemplary fields of the "server" class.

| First Class Fields | Field description |
| --- | --- |
| Serial_number | The serial number of the server 2208. |
| Model_number | The model number of the server 2208. |
| Default_gateway | The default gateway of the server 2208. |
| Memory | The memory of the server 2208. |
| FQDN | The fully qualified domain name of the server 2208. |
| OS | The operating system of the server 2208. |
| OS_version | The version of the operating system of the server 2208. |
| Start_date | The uptime of the server 2208. |
| CPU_name | The name of the CPU of the server 2208. |
| CPU_vendor | The name/ID of vendor of the CPU. |
| CPU_speed | The speed of the CPU. |
| CPU_type | The type of CPU. |
| CPU_count | The number of CPU's in the server 2208. |
| CPU_core_count | The number of cores of the CPU in the server 2208. |
| CPU_core_thread | The number of threads per core. |
| hasPhysicalID | Whether server has a physical identifier? |

The second class 2404 may be associated with the resource cluster 2210. The second class 2404 may further include one or more fields that may store information associated with the resource cluster 2210. In some embodiments, the second class 2404 may be associated with the cluster resource manager 2208A. By way of example and not limitation, exemplary one or more fields of the second class 2404 may be presented in Table 63:

TABLE 63

Exemplary fields of the "resource_cluster" class.

| Second Class Fields | Field description |
| --- | --- |
| name | The name of the resource cluster 2210. |
| Cluster_id | The ID of the resource cluster 2210. This may contain the identifier of each of the set of nodes 2210A. |
| Cluster_type | The type of the resource cluster 2210. |
| Cluster_status | The status of the resource cluster 2210. The value may be enabled or disabled. |
| Cluster_version | The version of the resource cluster 2210. |
| Short_description | Short Description for the resource cluster 2210. |
| Caption | Caption Information related to the resource cluster 2210. |
| IP Address | The IP address of the resource cluster 2210. |

The third class 2406 may be associated with the resource group of the set of resources 2210B. The set of resources 2210B in the resource cluster 2210 may be classified into one or more groups based on a type of the resource. The type of the resource may be, for example, but is not limited to, network resources, web server resources, database resources, and application server resources. The third class 2406 may further include one or more fields that may store information associated with the resource group. By way of example and not limitation, exemplary one or more fields of the third class 2406 may be presented in Table 64:

TABLE 64

Exemplary fields of the "cluster_resource_group" class.

| Third Class Fields | Field description |
| --- | --- |
| Name | The name of the resource group. |
| Node | The name/ID of the node where the resource group is running. |
| Resource_group_status | The status of the resource group. (started/stopped) |
| Resource_group_type | The type of resource group. |
| Server | The server of the resource group. |
| FQDN | The fully qualified domain name of the node where the resource group is running. |
| Cluster | The cluster in which the resource group belongs. |
| Short_description | Short Description for the resource group. |

The fourth class 2408 may be associated with each of the set of resources 2210B in the resource cluster 2210. The fourth class 2408 may further include one or more fields that may store information associated with the set of resources 2210B in the resource cluster 2210. By way of example and not limitation, exemplary one or more fields of the fourth class 2408 may be presented in Table 65:

TABLE 65

Exemplary fields of the "cluster_resource" class.

| Fourth Class Fields | Field description |
| --- | --- |
| Name | The name of the resource. |
| Resource_type | The type of the resource. |
| Resource_status | The status of the resource. |
| IP Address | The IP address of the node where the resource is running. |
| FQDN | The fully qualified domain name of the node where the resource is running. |
| Short description | Short Description of the resource. |
| caption | Caption Information related to the resource. |
| properties | The properties of the resource. |

The fifth class 2410 may be associated with each of the set of nodes 2210A in the resource cluster 2210. The fifth class 2410 may further include one or more fields that may store information associated with the set of nodes 2210A in the resource cluster 2210. By way of example and not limitation, exemplary one or more fields of the fifth class 2410 may be presented in Table 66:

TABLE 66

Exemplary fields of the "cluster_node" class.

| Fifth Class Fields | Field description |
| --- | --- |
| Name | The name and the identifier of a node in the set of nodes 2210A. |
| Node_status | The status of a node. This may include the redundancy configuration of the node. |
| Node_state | The state of a node |
| FQDN | The fully qualified domain name of a machine node where the node is running |

The sixth class 2412 may be associated with the network interface of the resource cluster 2210. The sixth class 2412 may further include one or more fields that may store information associated with the network interface of the resource cluster 2210. Specifically, the sixth class may include a virtual Internet Protocol (IP) address of the resource cluster 2210. In some embodiments, Specifically the sixth class may include a virtual Internet Protocol (IP) address of the cluster resource manager 2208A. The virtual IP address may be required for communication among the set of nodes 2210A and the set of resources 2210B in the resource cluster 2210. By way of example and not limitation, exemplary one or more fields of the sixth class 2412 may be presented in Table 67:

TABLE 67

Exemplary fields of the "resource_cluster_vip" class.

| Sixth Class Fields | Field description |
| --- | --- |
| Name | An alias name of the resource cluster 2210. |
| IP Address | The virtual IP address of the resource cluster 2210. |

The discovery server 2202A may be further configured to determine a relationship between each of the plurality of classes that may correspond to the configuration item. The discovery server 2202A may be configured to determine the relationship between each of the plurality of classes based on the first information and the second information. The type of relationship may correspond to, but is not limited to, "exposes", "hosted on", "contain", "virtualizes", "member of", "uses", "extends", "Defines resources for", "Cluster of", and "registered on". By way of example and not limitation, if a Server1 is being managed by Server2, then the parent CI is Server2, the type of relationship is "Managed by".

An example of the relationships between the plurality of classes is presented in Table 68, as follows:

TABLE 68

Example of relationships between plurality of classes.

| Class | Relationship | Class |
| --- | --- | --- |
| Resource cluster | Hosts::Hosted on | server |
| Cluster_node | Hosted on::Hosts | server |
| resource_cluster_vip | Virtualized by:: Virtualized | Resource cluster |
| resource_cluster_vip | Uses::Used by | cluster_node |
| cluster_node | Cluster of::Cluster | Resource cluster |
| cluster_resource | Defines resources for:: Gets resources from | cluster_node |
| cluster_resource | Defines resources for:: Gets resources from | Resource cluster |
| resource_cluster | Contains::Contained by | cluster_resource_group |
| cluster_node | Contains::Contained by | cluster_resource_group |
| cluster_resource_group | Contains::Contained by | cluster_resource |

Figure 25:
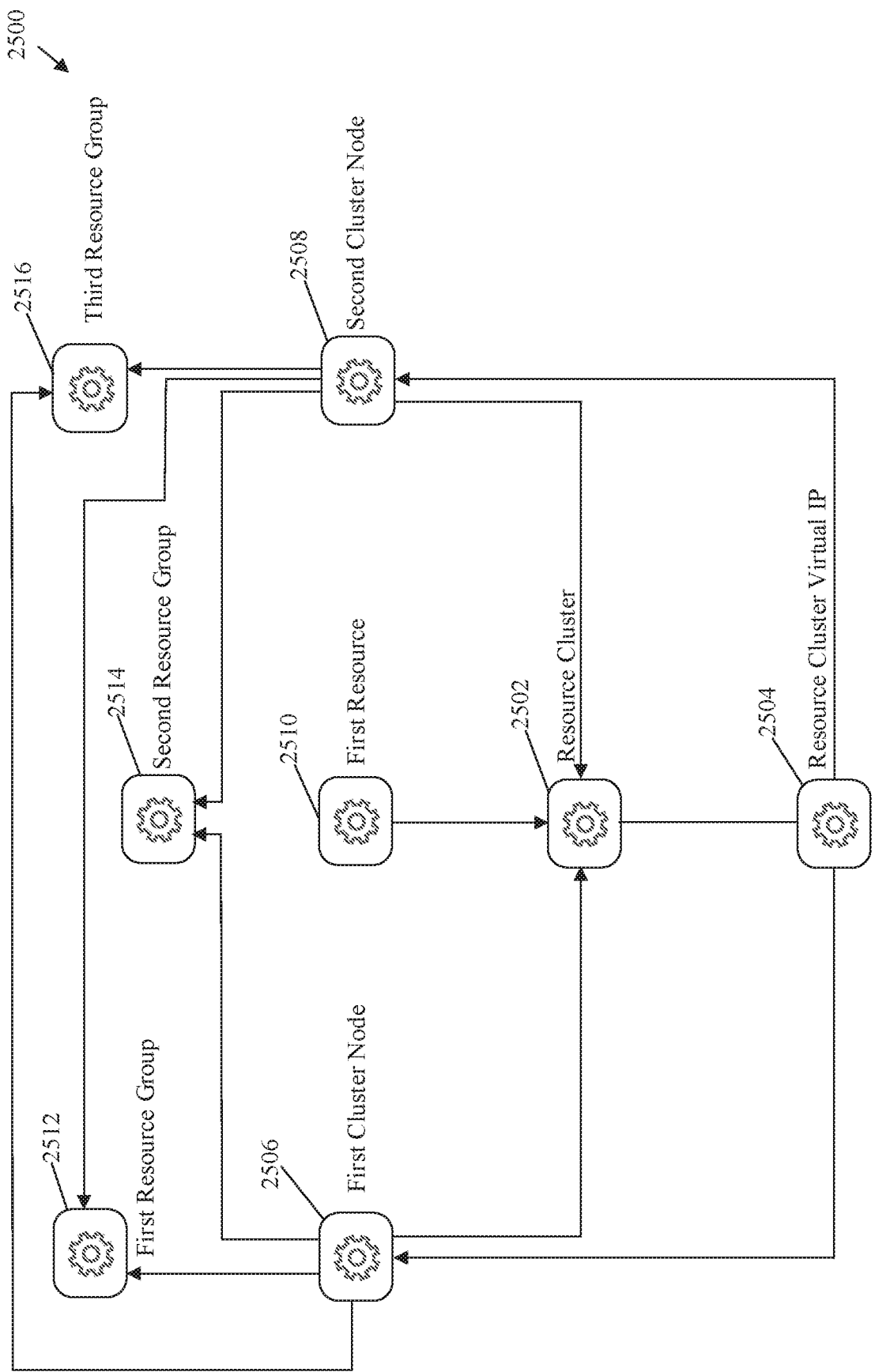
FIG. 25 is a scenario diagram that illustrates an exemplary dependency map of the resource cluster of FIG. 22, in accordance with example embodiments.

FIG. 25 is a scenario diagram that illustrates an exemplary dependency map of the resource cluster of FIG. 22, in accordance with example embodiments. With reference to FIG. 25, there is shown a dependency map 2500 including set of map icons. The set of map icons may include, but not limited to, a first map icon 2502, a second map icon 2504, a third map icon 2506, a fourth map icon 2508, a fifth map icon 2510, a sixth map icon 2512, a seventh map icon 2514, and an eighth map icon 2516.

The first map icon 2502 may to the resource cluster 2210 of FIG. 22. The second map icon 2504 may represent the virtual IP of the resource cluster 2210. The third map icon 2506 may represent a first node of the set of nodes 2210A.

The fourth map icon 2508 may represent a second node of the set of nodes 2210A. The fifth map icon 2510 may represent a first resource of the set of resources 2210B. The sixth map icon 2512 may represent a first resource group. The seventh map icon 2514 may represent a second resource group and the eighth map icon 2516 may represent a third resource group. In some embodiments, the first map icon 2502 may be associated with the cluster resource manager 2208A.

Each of the set of map icons may be associated with one or more map icon of the set of map icons. The association between the map icons may be based on the relation between the corresponding classes as described, for example, in Table 7. By way of example and not limitation, the first map icon 2502 may be root node of the dependency map. The first map icon may be associated with the second map icon 2504, the third map icon 2506, the fourth map icon 2508, and the fifth map icon 2510. The second map icon 2504 may be associated with the third map icon 2506 and the fourth map icon 2508.

In some embodiments, the first node represented by the third map icon 2506 and the second node may be represented by the fourth map icon 2508 may be part of the first resource group, the second resource group, and the third resource group. Therefore, the third map icon 2506 may be associated with the sixth map icon 2512, the seventh map icon 2514, and the eighth map icon 2516. Similarly, the fourth map icon 2508 may be associated with the sixth map icon 2512, the seventh map icon 2514, and the eighth map icon 2516.

The discovery server 2202A may be further configured to display the generated dependency map on the application interface 2212 of the user device 2204 associated with the user 2214. The discovery server 2202A may display the generated dependency map to provide better visibility and to monitor or to modify the resource cluster 2210 to the user 2214.

Figure 26:
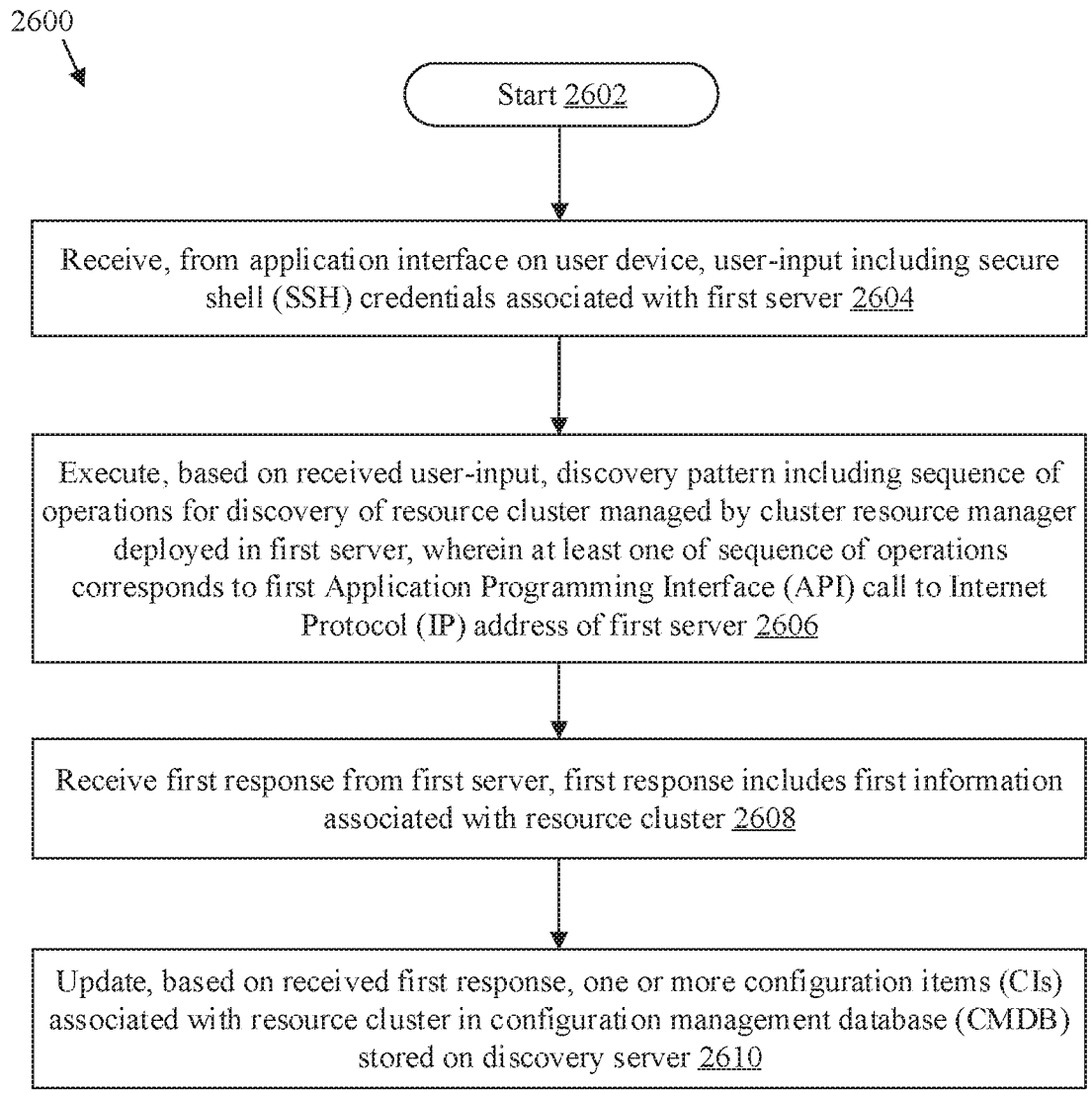
FIG. 26 is a flowchart that illustrates an exemplary method for automatic discovery of resource cluster, in accordance with an embodiment of the disclosure.

FIG. 26 is a flowchart that illustrates an exemplary method for automatic discovery of resource cluster, in accordance with an embodiment of the disclosure. FIG. 26 is described in conjunction with elements from FIGS. 22, 23, 24, and 25. With reference to FIG. 26, there is shown a flowchart 2600. The exemplary method of the flowchart 2600 may be executed by any computing system, for example, by the discovery server 2202A of FIG. 22 or the circuitry 2302 of FIG. 23. The exemplary method of the flowchart 2600 may start at 2602 and proceed to 2604.

At 2604, a user-input may be received. The user-input may include secure shell (SSH) credentials associated with the server 2208 (i.e. first server) and may be received from the application interface 2212 on the user device 2204. In one or more embodiments, the discovery server 2202A may be configured to receive the user-input from the application interface 2212 on the user device 2204. The user-input may include secure shell (SSH) credentials associated with the server 2208. The details about receiving the user-input are provided, for example, in FIG. 22.

At 2606, a discovery pattern may be executed. The discovery pattern may include a sequence of operations for a discovery of the resource cluster 2210 managed by the cluster resource manager 2208A that may be deployed in the server 2208 (i.e. first server). One of the sequence of operations may correspond to a first Application Programming Interface (API) call to an Internet Protocol (IP) address of the server 2208. In one or more embodiments, the discovery server 2202A may be configured to execute the discovery pattern including the sequence of operations for the discovery of the resource cluster 2210 managed by the cluster resource manager 2208A deployed in the server 2208, where one of the sequence of operations may correspond to the first API call to the IP address of the server 2208. The details about execution of discovery pattern are provided, for example, in FIG. 22 and FIG. 24.

At 2608, a first response may be received from the server 2208 (i.e. first server). The first response may be associated with the resource cluster 2210. In one or more embodiments, the discovery server 2202A may be configured to receive the first response from the server 2208, where the first response may be associated with the resource cluster 2210.

At 2610, one or more configuration items (CIs) may be associated with the resource cluster 2210 in the CMDB 2202D stored on the discovery server 2202A. The one or more CIs may be updated based on the received first response. In one or more embodiments, the discovery server 2202A may be configured to update the CIs associated with the resource cluster 2210 in the CMDB 2202D stored on the discovery server 2202A based on the received first response. The details about one or more Cis are provided, for example, in FIG. 24. Control may pass to end.

Although the flowchart 2600 is illustrated as discrete operations, such as 2604, 2606, 2608, and 2610, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions executable by a machine and/or a computer to operate a computing system (e.g., the computing system 2202) for automatic discovery of resource cluster. The computer-executable instructions may cause the machine and/or computer to perform operations that include receiving, from an application interface (e.g., the application interface 2212) on a user device (e.g., the user device 2204), a user-input including secure shell (SSH) credentials associated with a first server (e.g., the server 2208). The operations further include executing, based on the received user-input, a discovery pattern comprising a sequence of operations for a discovery of a resource cluster (e.g., the resource cluster 2210) managed by a cluster resource manager deployed in the first server. One of the sequence of operations may correspond to a first Application Programming Interface (API) call to an Internet Protocol (IP) address of the first server. The operations further include receiving a first response from the first server, the first response including first information associated with the resource cluster. The operations may further include updating, based on the received first response, one or more configuration items (CIs) associated with the resource cluster in a configuration management database (CMDB) (e.g., the CMDB 2202D) stored on the discovery server (e.g., the discovery server 2202A).

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively, or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long-term storage, like ROM, optical or magnetic disks, Solid State Drive (SSD)s, compact disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures. While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A method for resource discovery, comprising:
in a computing system:
receiving, from an application interface on a user device, a user input including an authentication credential and account information associated with a cloud operating system of a cloud computing system;
executing, based on the received user input, a discovery pattern comprising a sequence of operations for a discovery of resources associated with the cloud operating system, wherein
the cloud operating system includes a group of services to access the resources, and
at least one of the sequence of operations corresponds to an Application Programming Interface (API) call to an API endpoint associated with a service of the group of services;
receiving a response to the sent API call from the cloud operating system, the response comprising a payload of information associated with the resources; and
updating, based on the received response, one or more configuration items (CIs) associated with the resources in a configuration management database (CMDB).

2. The method according to claim 1, further comprising generating a class model associated with the resources based on the updated one or more CIs.

3. The method according to claim 2, wherein the class model comprises at least one of:
   a first class associated with a domain associated with the cloud operating system;
   a second class associated a service associated with the cloud operating system; or
   a third class associated with an endpoint associated with the cloud operating system.

4. The method according to claim 1, wherein the resources comprise at least one of: a computing resource, a networking resource, and a storage resource.

5. The method according to claim 1, wherein the group of services comprises at least one of: an identity service, a compute service, an image service, a block storage service, a networking service, a load balancer service, or a dashboard service.

6. The method according to claim 5, wherein the user input further comprises a web address of an endpoint associated with the identity service of the cloud operating system.

7. The method according to claim 1, further comprising parsing the received response to determine the information associated with the resources.

8. A computing system, comprising
   circuitry configured to:
      receive, from an application interface on a user device, a user input including an authentication credential and account information associated with a cloud operating system of a cloud computing system;
      execute, based on the received user input, a discovery pattern comprising a sequence of operations for a discovery of resources associated with the cloud operating system, wherein
         the cloud operating system includes a group of services to access the resources, and
         at least one of the sequence of operations corresponds to an Application Programming Interface (API) call to an API endpoint associated with a service of the group of services;
      receive a response to the sent API call from the cloud operating system, the response comprising a payload of information associated with the resources; and
      update, based on the received response, one or more configuration items (CIs) associated with the resources in a configuration management database (CMDB).

9. The computing system according to claim 8, wherein the discovery application is further configured to generate a class model associated with the resources based on the updated one or more CIs.

10. The computing system according to claim 9, wherein the class model comprises at least one of:
   a first class associated with a domain associated with the cloud operating system;
   a second class associated a service associated with the cloud operating system; or
   a third class associated with an endpoint associated with the cloud operating system.

11. The computing system according to claim 8, wherein the resources comprise at least one of: a computing resource, a networking resource, and a storage resource.

12. The computing system according to claim 8, wherein the group of services comprises at least one of: an identity service, a compute service, an image service, a block storage service, a networking service, a load balancer service, or a dashboard service.

13. The computing system according to claim 12, wherein the user input further comprises a web address of an endpoint associated with the identity service of the cloud operating system.

14. The computing system according to claim 8, wherein the discovery application is further configured to parse the received response to determine the information associated with the resources.

15. A non-transitory computer-readable medium having stored thereon, computer-executable instructions which, when executed by a computing system, causes the computing system to execute operations, the operations comprising:
   receiving from an application interface on a user device, a user input including an authentication credential and account information associated with a cloud operating system of a cloud computing system;
   executing, based on the received user input, a discovery pattern comprising a sequence of operations for a discovery of resources associated with the cloud operating system, wherein
      the cloud operating system includes a group of services to access the resources, and
      at least one of the sequence of operations corresponds to an Application Programming Interface (API) call to an API endpoint associated with a service of the group of services;
   receiving a response to the sent API call from the cloud operating system, the response comprising a payload of information associated with the resources; and
   updating, based on the received response, one or more configuration items (CIs) associated with the resources in a configuration management database (CMDB).

16. The non-transitory computer-readable medium according to claim 15, wherein the operations further comprising generating a class model associated with the resources based on the updated one or more CIs.

17. The non-transitory computer-readable medium according to claim 16, wherein the class model comprises at least one of:
   a first class associated with a domain associated with the cloud operating system;
   a second class associated a service associated with the cloud operating system; or
   a third class associated with an endpoint associated with the cloud operating system.

18. The non-transitory computer-readable medium according to claim 15, wherein the resources comprise at least one of: a computing resource, a networking resource, and a storage resource.

19. The non-transitory computer-readable medium according to claim 15, wherein the group of services comprises at least one of: an identity service, a compute service, an image service, a block storage service, a networking service, a load balancer service, or a dashboard service.

20. The non-transitory computer-readable medium according to claim 15, wherein the operations further comprising parsing the received response to determine the information associated with the resources.

* * * * *